(12) United States Patent
Kasaini

(10) Patent No.: US 11,345,977 B2
(45) Date of Patent: May 31, 2022

(54) PROCESSING FOR THE EXTRACTION OF RARE EARTH ELEMENTS

(71) Applicant: Rare Element Resources, Ltd., Littleton, CO (US)

(72) Inventor: Henry Kasaini, Littleton, CO (US)

(73) Assignee: Rare Element Resources Ltd., Littleton, CO (US)

(*) Notice: Subject to any disclaimer, the term of this patent is extended or adjusted under 35 U.S.C. 154(b) by 370 days.

(21) Appl. No.: 15/517,884

(22) PCT Filed: Oct. 13, 2015

(86) PCT No.: PCT/US2015/055403
§ 371 (c)(1),
(2) Date: Apr. 7, 2017

(87) PCT Pub. No.: WO2016/058007
PCT Pub. Date: Apr. 14, 2016

(65) Prior Publication Data
US 2017/0260606 A1  Sep. 14, 2017

Related U.S. Application Data

(60) Provisional application No. 62/062,705, filed on Oct. 10, 2014, provisional application No. 62/074,608,
(Continued)

(51) Int. Cl.
*C22B 59/00* (2006.01)
*C22B 3/16* (2006.01)
(Continued)

(52) U.S. Cl.
CPC .............. *C22B 59/00* (2013.01); *C22B 3/065* (2013.01); *C22B 3/10* (2013.01); *C22B 3/165* (2013.01);
(Continued)

(58) Field of Classification Search
CPC .......... C22B 59/00; C22B 3/10; C22B 3/165; C22B 3/20; C22B 60/0239; C22B 60/0278; C22B 60/0291; C22B 3/065; C22B 3/44
(Continued)

(56) References Cited

U.S. PATENT DOCUMENTS 3,505,433 A * 4/1970 Baranauckas ......... C22B 60/026
558/202
3,678,100 A * 7/1972 Frank ..................... C01F 15/00
562/25

(Continued)

FOREIGN PATENT DOCUMENTS

CN  103540740 A   1/2014
WO  WO-2013138900 A1 * 9/2013 .............. C22B 3/20
(Continued)

OTHER PUBLICATIONS

Karve et al.; "Solvent Extraction Separation of Thorium (IV) from Nitric Acid with Cyanex 272"; Indian Journal of Chemistry, vol. 45A; pp. 406-408; Feb. 2006.
(Continued)

*Primary Examiner* — Melissa S Swain
(74) *Attorney, Agent, or Firm* — David F. Dockery; The Navitas Intellectual Property Group LLC

(57) ABSTRACT

Processing schemes for the extraction and/or separation of rare earth elements (REEs) from rare earth containing products such as rare earth mineral ore bodies and intermediate products derived from rare earth mineral ore bodies. The processing schemes may be applied independently or in various combinations to produce end-products that have a very high purity with respect to REEs, including high value critical REEs. The processes may include acid digestion, formation of rare earth oxalate compounds, metathesizing of (Continued)

rare earth oxalate compounds, selective precipitation and/or solvent extraction to form the high purity REE end products.

13 Claims, 36 Drawing Sheets

Related U.S. Application Data filed on Nov. 3, 2014, provisional application No. 62/165,155, filed on May 21, 2015.

(51) Int. Cl.
*C22B 3/10* (2006.01)
*C22B 3/44* (2006.01)
*C22B 3/20* (2006.01)
*C22B 3/06* (2006.01)
*C22B 60/02* (2006.01)

(52) U.S. Cl.
CPC .................. *C22B 3/20* (2013.01); *C22B 3/44* (2013.01); *C22B 60/0239* (2013.01); *C22B 60/0278* (2013.01); *C22B 60/0291* (2013.01); *Y02P 10/20* (2015.11)

(58) Field of Classification Search
USPC .......................................................... 75/395
See application file for complete search history.

(56) References Cited

U.S. PATENT DOCUMENTS

| 4,461,748 | A | | 7/1984 | Sabot et al. |
| 5,074,910 | A | | 12/1991 | Dubrovsky |
| 7,282,187 | B1 | * | 10/2007 | Brown ................... C22B 3/001 |
| | | | | 423/10 |
| 2009/0272230 | A1 | | 11/2009 | Mackowski et al. |
| 2011/0005354 | A1 | | 1/2011 | Bednarski et al. |
| 2013/0283977 | A1 | | 10/2013 | Lakshmanan et al. |
| 2014/0170039 | A1 | * | 6/2014 | Li ....................... C22B 60/0291 |
| | | | | 423/10 |
| 2015/0307598 | A1 | * | 10/2015 | Emery ................. A61K 39/025 |
| | | | | 424/139.1 |
| 2016/0177420 | A1 | * | 6/2016 | Duyvesteyn ............. C22B 3/26 |
| | | | | 423/21.5 |

FOREIGN PATENT DOCUMENTS

| WO | 2014082113 A1 | 6/2014 |
| WO | 2014113742 A2 | 7/2014 |

OTHER PUBLICATIONS

Nasab et al.; Determination of Optimum Process Conditions for the Separation of Thorium and Rare Earth Elements by Solvent Extraction; Hydrometallurgy; 106.3-4; pp. 141-147; 2011.
International Search Report and Written Opinion dated Apr. 29, 2016 for Intl. Patent Application No. PCT/US2015/055403.
Office Action dated Jul. 4, 2018 for Canadian Patent Application No. 2,964,306.
International Search Report and Written Opinion dated Apr. 29, 2016 in connection with International Application No. PCT/US2015/055403.
Office Action for Canadian Patent Application No. 2,964,306 dated Apr. 15, 2019.
Office Action dated Mar. 24, 2020 for Australian Patent Application No. 2015329723.

* cited by examiner

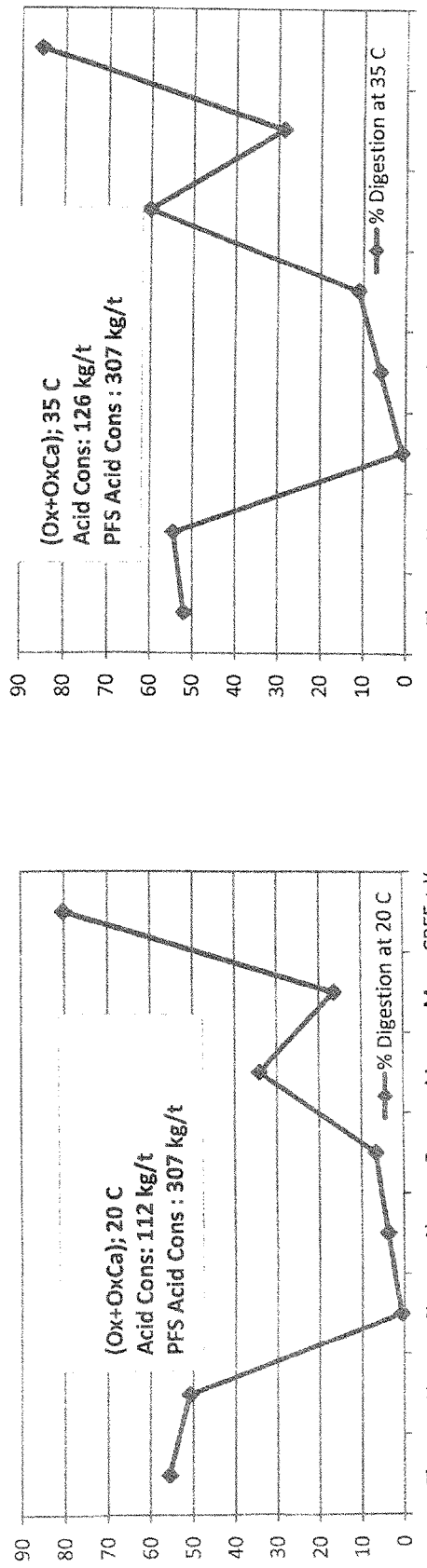
Fig. 25
Fig. 26
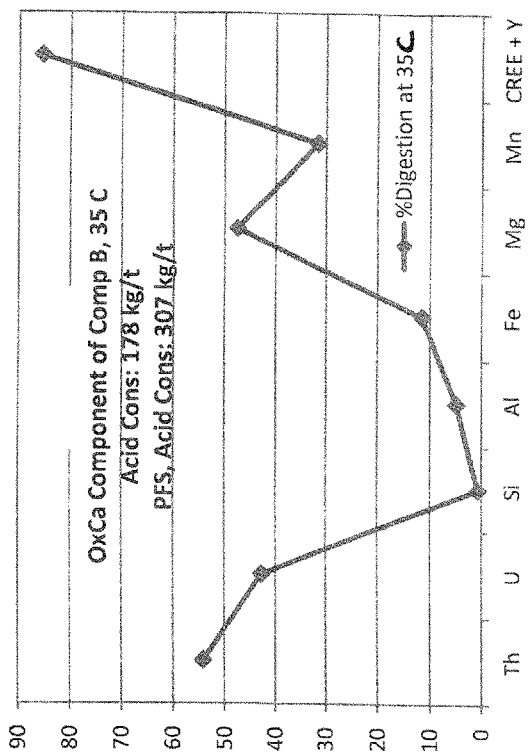
Fig. 28
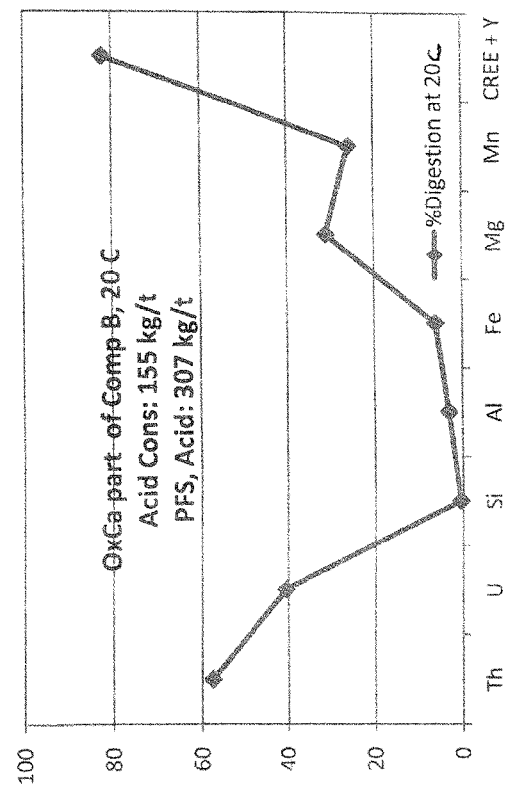
Fig. 27

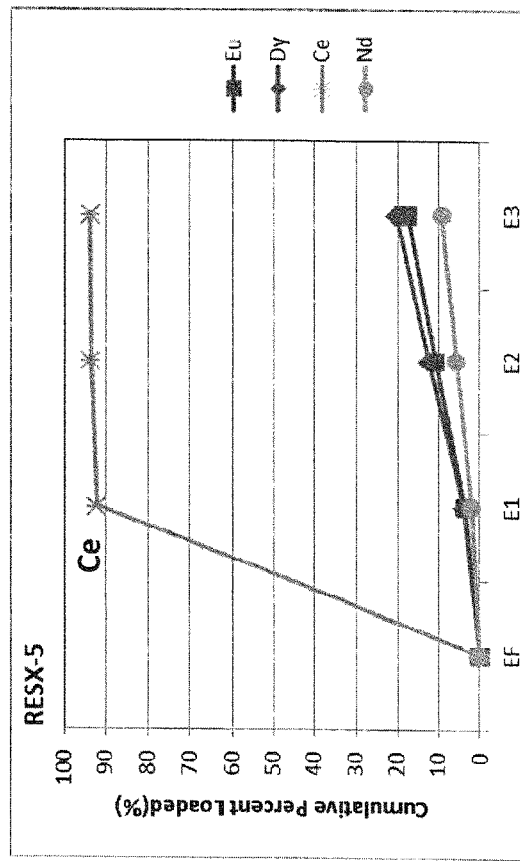
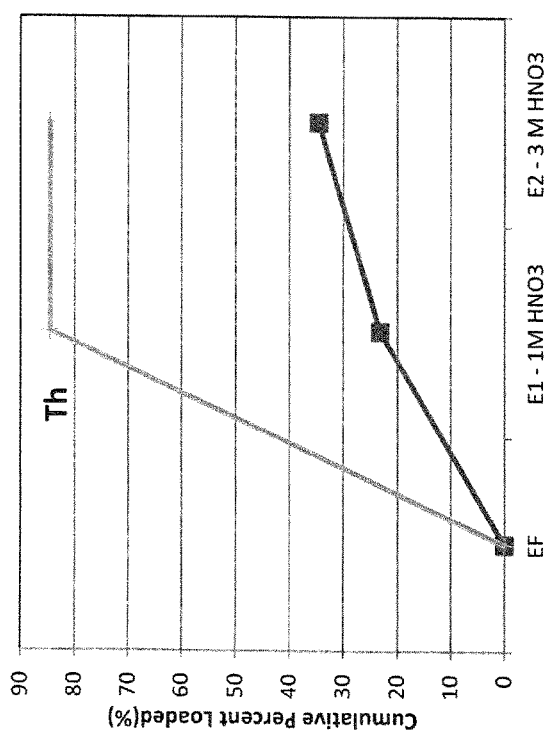
Fig. 36B
Fig. 36A

Percent Loaded (Cumulative)

| | EF | E1 | E2 |
|---|---|---|---|
| HNO3 | 0 | | |
| La | 0 | 1.96 | 3.23 |
| Ce | 0 | 4.14 | 8.05 |
| Pr | 0 | 9.09 | 13.03 |
| Nd | 0 | 6.98 | 17.43 |
| Sm | 0 | 25.90 | 57.26 |
| Eu | 0 | 43.25 | 79.60 |
| Gd | 0 | 59.53 | 90.90 |
| Tb | 0 | 87.65 | 97.30 |
| Dy | 0 | 96.23 | 99.26 |
| Ho | 0 | 97.97 | 99.29 |
| Y | 0 | 99.64 | 99.98 |
| Er | 0 | 97.12 | 97.87 |
| Tm | 0 | 95.32 | 97.03 |
| Yb | 0 | 99.26 | 99.26 |

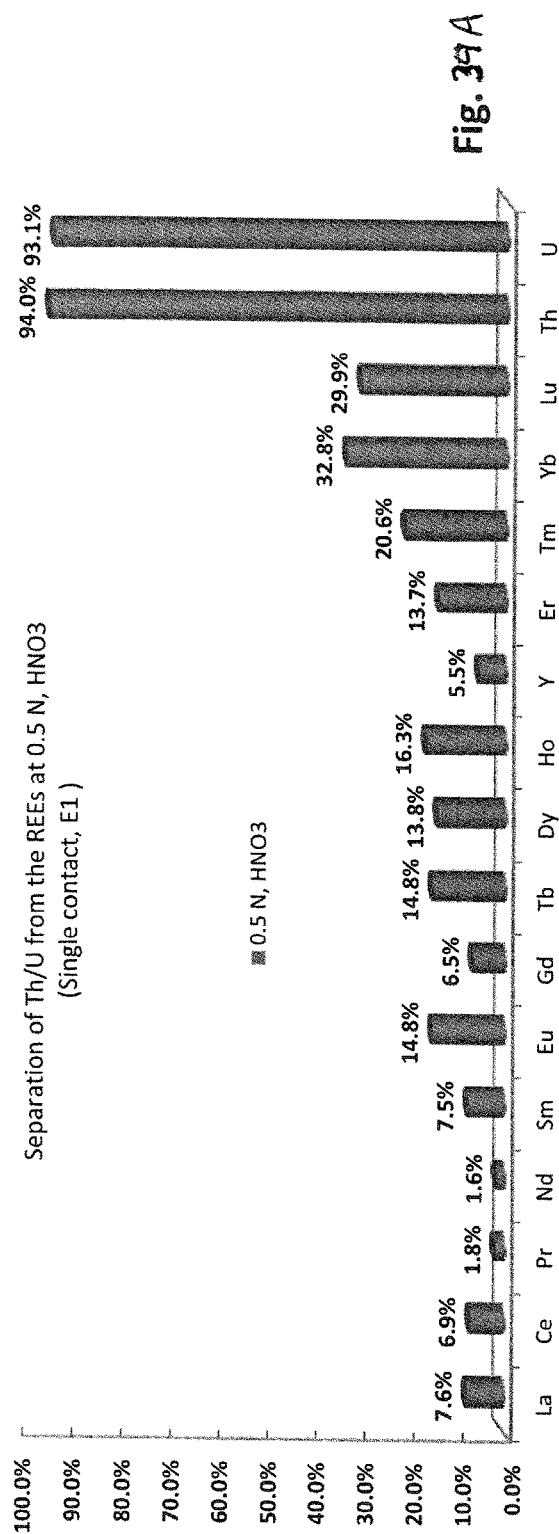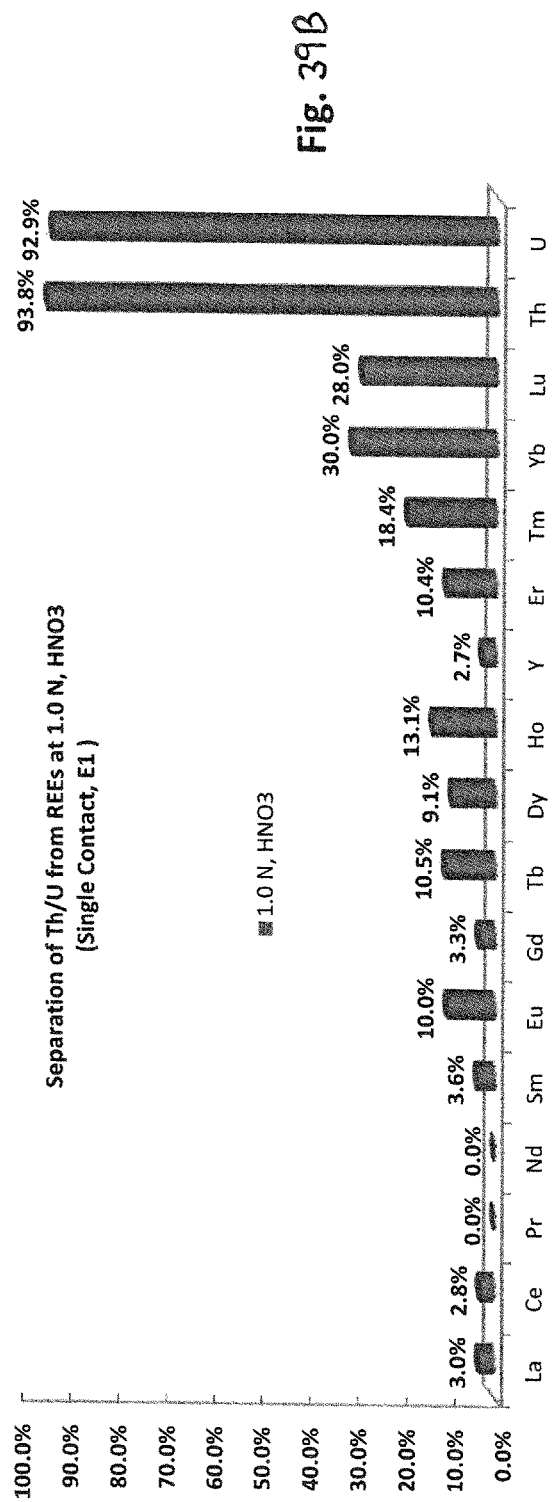

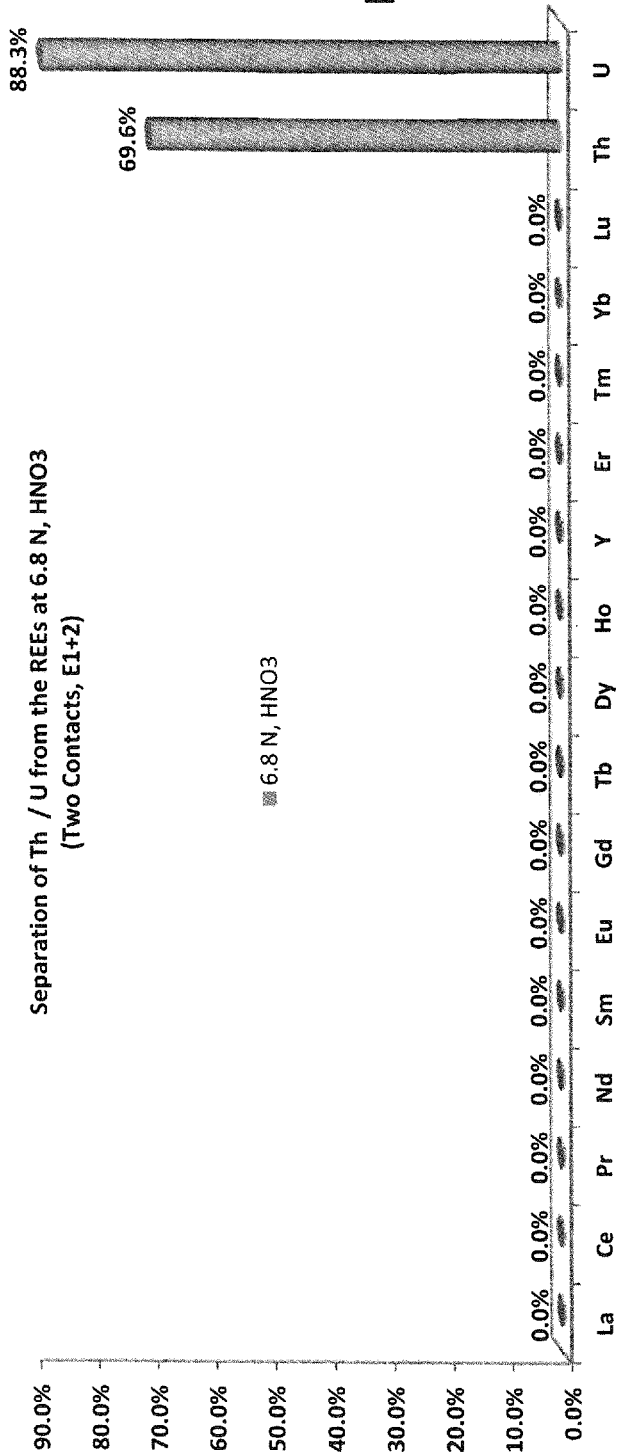

PROCESSING FOR THE EXTRACTION OF RARE EARTH ELEMENTS

CROSS-REFERENCE TO RELATED APPLICATIONS

This application claims priority to U.S. Provisional Patent Application No. 62/062,705 by Kasaini filed on Oct. 10, 2014, to U.S. Provisional Patent Application No. 62/074,608 by Kasaini filed on Nov. 3, 2014 and U.S. Provisional Patent Application No. 62/165,155 by Kasaini filed on May 21, 2015. The disclosure of each of these applications is incorporated herein by reference in its entirety.

FIELD

This disclosure relates to the field of extractive metallurgy, particularly the extraction of rare earth metals from feedstocks such as mineral ore bodies containing these elements.

BACKGROUND

Rare earth elements (REEs) comprise seventeen elements in the periodic table, specifically the 15 lanthanide elements plus scandium and yttrium. REEs are a group of metallic elements with unique chemical, catalytic, magnetic, metallurgical and phosphorescent properties, and as such find use in a wide variety of modern devices including high-strength magnets, batteries, displays, lighting, and high performance metal alloys.

REEs are relatively plentiful in the earth's crust. However, REEs are typically highly dispersed and are not often found as concentrated rare earth minerals in economically exploitable ore deposits. The extraction of REEs from mineral deposits is also challenging because mineral deposits containing REEs typically also contain appreciable levels of radioactive elements such as thorium (Th) and uranium (U) that must be safely and economically separated from the REEs during processing of the ore.

REEs may be further categorized based upon their value and/or their molecular weight. As used herein, the term critical rare earth element ("CREE") includes neodymium (Nd), europium (Eu), terbium (Tb), dysprosium (Dy), praseodymium (Pr) and yttrium (Y). The term heavy rare earth element ("HREE") includes terbium (Tb), dysprosium (Dy), holmium (Ho), erbium (Er), thulium (Tm), ytterbium (Yb) and lutetium (Lu). The term light rare earth element ("LREE") refers to lanthanum (La), cerium (Ce), praseodymium (Pr) and neodymium (Nd). Samarium (Sm), europium (Eu) and gadolinium (Gd) are collectively referred to herein as "SEG."

As is noted above, many growing industries utilize REEs in the manufacture of myriad products. However, most of these products require that the REEs are of exceptionally high purity. Despite this industrial demand, many mineral deposits containing REEs are not fully exploited due to the costs associated with processing the ore to recover the REEs in a very high purity form.

SUMMARY

Accordingly, it has been realized that there is a need for a method for the extraction of REEs from mineral ore bodies, such as bastnaesite-based mineral ore bodies, that leads to a reduced overall cost for the process, e.g., reduced capital expenditures ("capex") and/or reduced operating expenditures ("opex"). It would be advantageous if such an economical process nonetheless was able to produce very high purity REE-containing end products that have significant value in many industrial uses.

In one embodiment, the present disclosure relates to a method for leaching a mineral ore body comprising rare earth elements, the method including the steps of contacting the mineral ore body with a hydrochloric acid (HCl) solution for a period of time that is sufficient to solubilize at least a portion of the rare earth elements and form a pregnant liquor solution and a solid residue. During the contacting of the hydrochloric acid solution and the mineral ore body, the leach temperature remains relatively low, and in one embodiment the leach temperature does not exceed about 60° C. After a desirable amount of REEs have been solubilized, a pregnant liquor solution, e.g., containing the solubilized REEs, is separated from the solid residue, e.g., from the unsolubilized minerals.

In another embodiment disclosed herein, a method for the extraction of thorium is provided that includes precipitating the thorium as thorium hydroxide under controlled pH conditions so that the thorium precipitates without precipitating substantial amounts of rare earth metals. The resulting rare earth solutions are of extremely high purity and may be processed in a solvent extraction circuit for the recovery of high purity rare earth metals, or may be treated to convert the solutions to rare earth oxides. The thorium may be precipitated separately from cerium, or may be co-precipitated with cerium.

In another embodiment, a method for the extraction of cerium from a cerium-containing acidic solution is provided. The method includes the steps of contacting the cerium-containing acidic solution with ammonium hydroxide to precipitate at least a portion of the cerium as cerium hydroxide and form a cerium-depleted solution and a cerium hydroxide product, and separating at least a portion of the cerium hydroxide product from the cerium depleted solution.

In yet another embodiment, the present disclosure is directed to solvent extraction processes for separating thorium and/or cerium from a RE-oxide product by solvent extraction.

In yet another embodiment, the present disclosure is directed to solvent extraction processes for separating rare earth elements, individually or as "baskets," from a RE-oxide product. The process may advantageously require fewer mixer/settler tanks than known processes, and/or may produce little to no effluent. The processes may be used, for example, to separate Ce, La, Nd and Pr, SEG and HREEs. Some of the processes disclosed herein may also be used to remove non-REEs from the RE-oxide product such as thorium (Th), uranium (U) and base metals.

For example, in one embodiment of this disclosure, a process for the removal of thorium from rare earth elements is disclosed. In another embodiment, a process for the separation of cerium from other rare earth elements is disclosed. In yet another embodiment, the process for the separation of lanthanum from other rare earth elements is disclosed. The foregoing processes for the removal of thorium, the separation of cerium and the separation of lanthanum may be utilized in combination to produce a high purity and reduced volume rare earth element product which may be subjected to further solvent extraction processes to separate the remaining rare earth elements.

In other embodiments, processes for stripping extractants (e.g., organic extractants) that are loaded with REEs or other elements such as thorium is disclosed. These processes entail the use of an organic acid (e.g., oxalic acid) to rapidly precipitate compounds of the metals (e.g., oxalate compounds) from the extractant. These processes may enable the recycling of both the stripped extractant and the raffinate within the circuit. The need for large excesses of acids (e.g., mineral acids) that are normally required for stripping extractants may be significantly minimized, and in some cases may be eliminated.

In some characterizations, the foregoing processes may advantageously reduce or even eliminate the need for large excesses of organic extractant inventory. These processes may also reduce the operating plant footprint (size) by first separating the bulk REEs (e.g., Ce and La) to decrease the solvent extraction capacity (e.g., the number of mixer settlers) that is required for separating the more valuable rare earths (e.g., CREEs) that constitute a smaller proportion of the REO powder.

Another objective of this disclosure is to provide a cost effective method of removing thorium from the REEs, such as at an early stage (e.g., a first stage) of a process. In one characterization, the thorium is removed first in a single contact solvent extraction step. In one refinement, after removal of the thorium, cerium is separated from the mixed REE product, which may reduce the required solvent extraction capacity for separation of other REEs by up to one-half (50%) or more. The subsequent removal of lanthanum may further reduce the required solvent extraction capacity for separation of other REEs by up to two-thirds (66%) or more.

The processes disclosed herein, implemented alone or in combination, may advantageously reduce the operating expenses ("opex") of an REE recovery plant by reducing the amounts of reagents, energy, and/or water, etc. that are used. The processes may also advantageously reduce the capital expenditures ("capex") to construct and REE recovery plant by reducing the equipment requirements such as motors, pumps, mixer impellers, piping, mixers settlers, etc. . . . , as compared to traditional solvent extraction processes.

Another objective of certain embodiments of this disclosure is to provide end products that are of extremely high purity. By way of example, the separated end products disclosed herein may include cerium at a purity of 99.999 wt. % cerium on a metals basis, lanthanum at a purity of 99.999 wt. % La on a metals basis, combined neodymium and praseodymium at a purity of 99.999% Nd/Pr on a metals basis, combined SEG at a purity of 99.999 wt. % on a metals basis, and/or 99.999% HREEs on a metals basis.

Additional embodiments of processes for the treatment extraction of REEs will become apparent from the following description, as well as a number of characterizations, refinements and additional features that are applicable to the disclosed embodiments, alone or in any combination.

DESCRIPTION OF THE DRAWINGS

FIG. 24-30 illustrate different acid leach results for leaching a mid-grade bastnaesite-based mineral ore where the rare earth elements are in the form of rare earth carbonates and rare earth oxides.

FIGS. 36A-36B illustrate the selective solvent extraction of both Ce and Th from other REEs using TPB as an extractant.

FIGS. 39A-39E illustrate the effect of solvent extraction variables during the selective separation of Th from REEs using solvent extraction.

DETAILED DESCRIPTION

Broadly characterized, this disclosure is directed to the processing of REE-containing products to extract REEs of high purity from the REE-containing products. Disclosed are several processing steps that may be combined in whole or in part, or may be applied independently to REE-containing products.

Throughout this disclosure, including in the claims, a percentage (%) of one or more elements or compounds refers to percentage by mass (i.e., wt. %) unless otherwise indicated. Further, the percentages of metals that are specified in this disclosure are relative to the total metals content of a particular product (a "metals basis"), e.g., without accounting for non-metallic elements in the product such as oxygen in the case of metal oxides.

Figure 1:
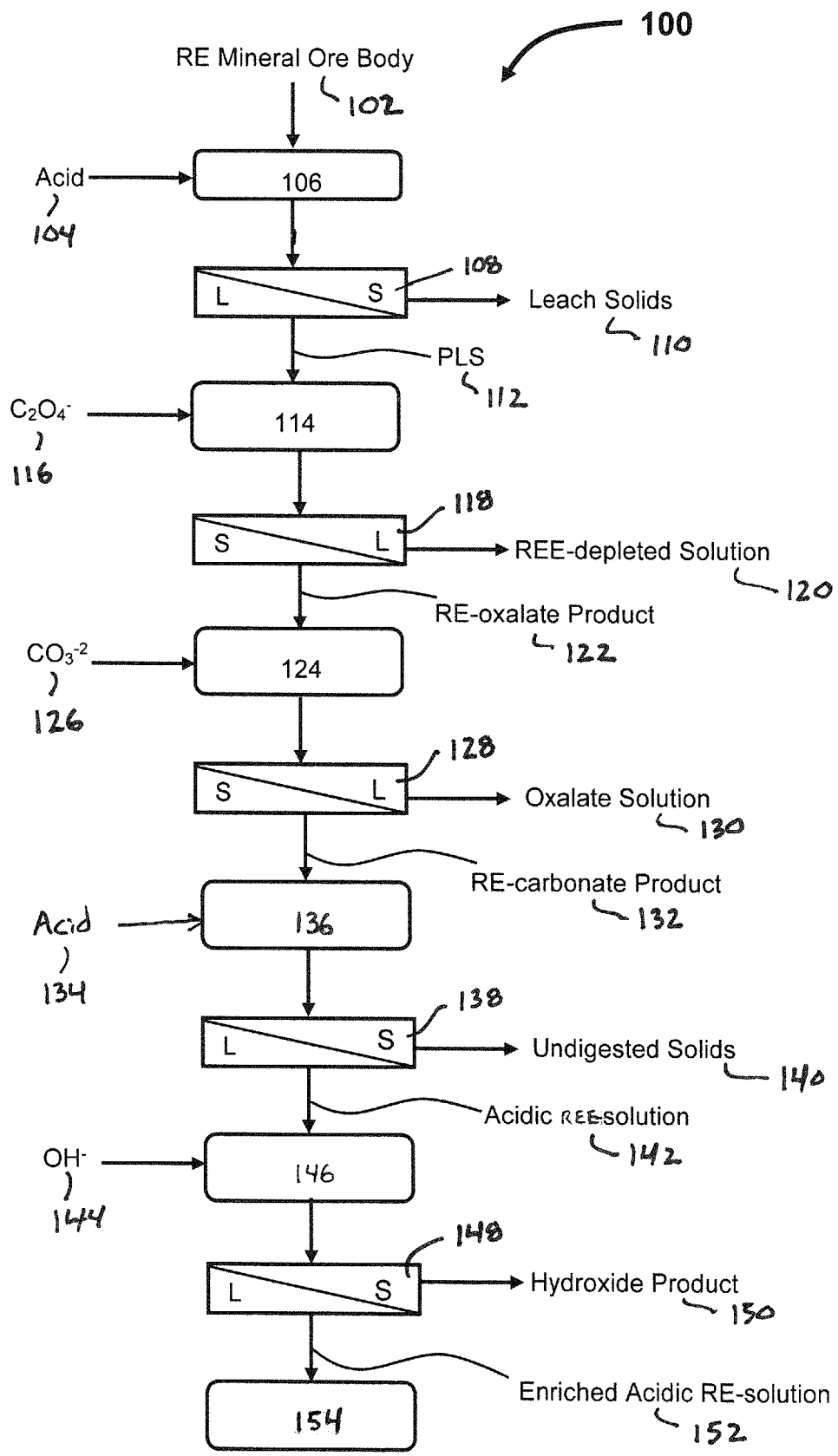
FIG. 1 is a schematic flowsheet illustrating a method for the recovery of rare earth elements from a rare earth ore concentrate.

FIG. 1 is a flowsheet illustrating an exemplary process for the extraction of REEs having a high purity from a rare earth (RE) mineral ore body. FIG. 1 illustrates a method for the extraction of REEs from the RE mineral ore body that integrally combines several sub-methods to achieve the extraction of high purity REEs from the RE mineral ore body. These sub-methods may be separable from the integrated flowsheet, or may be integrated in various combinations to complete the flowsheet or any portion of the flowsheet.

Referring to FIG. 1, the method 100 may begin with a RE mineral ore body 102. The mineral ore body 102 may be derived from one or more rare earth containing minerals such as bastnaesite, monazite, carbonatite, loparite, or similar rare earth containing minerals. For example, the RE mineral ore body 102 may be formed by separating rare earth minerals from waste rock and other debris, and beneficiating the rare earth minerals (e.g., milling) to reduce the particle size and increase the surface area of the minerals before further separation of the minerals from the waste, such as by flotation and/or magnetic separation. Other methods for the preparation of mineral ore bodies for subsequent leaching are known to those skilled in the art, and the present disclosure is not limited to any particular methods for preparation of the mineral ore body 102 for leaching. A typical mineral ore body will include from about 30 wt. % to about 70 wt. % rare earth oxides, although the present disclosure is not limited to the treatment of mineral ore bodies having this concentration or type of rare earth compounds.

In a leaching step 106, the mineral ore body 102 is contacted with an acid 104 (e.g., in a reactor) for a period of time to solubilize (e.g., digest) at least a portion of the metallic compounds in the mineral ore body 102, including the solubilization of a substantial portion of RE compounds (e.g., RE-oxides and/or RE-carbonates) in the mineral ore body 102. As is described below with respect to FIG. 2, in one characterization of the methods disclosed herein, the leaching step 106 may advantageously be carried out at a relatively low temperature and at ambient pressure.

After leaching 106, pregnant liquor solution 112 ("PLS") comprising solubilized REEs is separated from the leach solids 110 in a PLS separation step 108, i.e., the PLS 112 is separated from the components of the mineral ore body 102 that are not solubilized by the acid 104. The PLS 112 may then be treated in an oxalate formation step 114 where the PLS 112 is contacted with a source of oxalate ions ($C_2O_4^-$) 116. For example, the oxalate ion source 116 may comprise oxalic acid ($H_2C_2O_4$), oxalate salts (e.g., sodium oxalate ($N_2C_2O_4$)), or combinations of oxalic acid and oxalate salt(s). The oxalate formation step 114 forms an RE-oxalate product 122 comprising at least a portion of the REEs from the PLS 112 in the form of RE-oxalate compounds (e.g., $ReC_2O_4 \cdot 10H_2O$, where Re is a rare earth element). The solid RE-oxalate product 122 may be separated from an REE-depleted solution 120 in a RE-oxalate separation step 118.

The RE-oxalate product 122 contains a relatively high concentration of REEs in the form of RE-oxalate compounds. The RE-oxalate product 122 may then be contacted with a source of hydroxide ($OH^-$) or carbonate ($CO_3^-$) 126 in a metathesis step 124 to convert (e.g., metathesize) the REEs to carbonate compounds (e.g., $Re_2CO_3 \cdot xH_2O$ or ReOH) and form an RE-hydroxide or RE-carbonate solid product 132. The RE-carbonate product 132 may be separated from an oxalate solution 130 in a separation step 128.

Thereafter, the RE=-hydroxide or RE-carbonate product 132 is contacted with an acid, e.g., with nitric acid ($HNO_3$), in an acid digestion step 136 for a period of time to solubilize a substantial portion of the REEs in an acidic RE-solution 142. The acidic RE-solution 142 is separated from undigested solids 140 in a RE-solution separation step 138.

The acidic RE-solution 142 may then be contacted with a source of hydroxide ions ($OH^-$) 144 in a hydroxylation step 146 to selectively precipitate certain elements (e.g., thorium and/or cerium) from the acidic RE-solution 142, e.g., through pH control during precipitation of metal hydroxides. For example, the hydroxide ion source 144 may comprise a hydroxide salt, and in one characterization comprises ammonium hydroxide ($NH_4OH$). Various embodiments of this hydroxylation step 146 are described in more detail below with respect to FIGS. 5-10. After contacting the acidic RE-solution 142 with the hydroxide ion source 144, a hydroxide product 150 is separated from an enriched acidic REE-solution 152 in an enriched REE-solution separation step 148. The hydroxylation step 146 may advantageously separate appreciable quantities of undesirable elements such as thorium (e.g., as thorium hydroxide) and/or iron (e.g., as iron (III) hydroxide) from the acidic RE solution 142, thus enriching the acidic RE solution with respect to REEs. The hydroxylation step 146 may also be utilized to separate lower value REEs such as cerium from the acidic REE solution 142.

The hydroxylation step, carried out at about pH 9, may also be utilized to precipitate all REEs to the exclusion of highly soluble base metals, e.g., calcium, potassium, magnesium, phosphorus, zinc, manganese, strontium, lead, chromium and titanium. The REE-rich hydroxide precipitate may subsequently be dissolved in acid to produce REE-solution for advanced separation.

The enriched REE-solution 152 can then be subjected to an REE-separation step 154 to separate individual REEs and/or to separate the REEs into groups ("baskets"). The REE-separation step 154 may include the selective precipitation of REEs (e.g., as RE-oxides and/or RE-hydroxides) and/or the solvent extraction of REEs from solution, as is discussed in more detail below with respect to FIGS. 11-20.

In accordance with the foregoing, one embodiment of a method for the extraction of REEs from a REE-containing product includes leaching a RE mineral ore body to form a PLS containing REEs, forming an RE-oxalate product from the PLS, metathesizing the RE-oxalate product to form an RE-hydroxide or RE-carbonate product, digesting the RE-hydroxide or RE-carbonate product in an acid to form an acidic REE solution, and hydroxylating the acidic REE solution to precipitate certain elements from the acidic REE solution, forming an enriched REE solution. The enriched REE solution may be subjected to a separation step to separate one or more REEs or groups of REEs from the REE solution.

In addition to the complete processing scheme described above and with respect to FIG. 1, the present disclosure is directed to specific embodiments of the individual process steps that are integrated in the complete processing scheme. The individual steps may be practiced independently (e.g., on REE-containing products sourced from outside of the above-described method) or may be practiced in any combination.

As is discussed above with respect to FIG. 1, the methods disclosed herein may be applied to a mineral ore body to extract individual rare earth elements from the ore. Among the major minerals that contain appreciable quantities of REEs are monazite and bastnaesite. Monazite is a phosphate mineral that is commonly found in India, Madagascar and South Africa. In contrast, bastnaesite is a carbonate mineral that may be found in parts of Europe, the United States, Pakistan and Russia, among other regions. Bastnaesite is a fluorocarbonate, e.g., with a general formula of $(Ce,La)CO_3F$, where the cerium is often substituted by light REEs, lanthanum, yttrium and/or thorium.

Bastnaesite is often associated with quartz, feldspars, mica, apatite and pyroxenes. The clays, feldspars and pyroxenes (e.g., $XY(Si,Al)_2O_6$ where X represents calcium, sodium, iron II and magnesium and occasionally zinc, manganese and lithium, and where Y represents ions of smaller size, such as chromium, aluminum, iron III, magnesium, manganese, scandium, titanium, vanadium and even iron II) are major sources of numerous heavy and alkaline metal impurities. Bastnaesite may also be associated with other rare-earth-bearing minerals such as allanite, cerite and tysonite.

Although bastnaesite is a carbonate mineral, bastnaesite ores found near the surface may be completely or partially oxidized. Fully oxidized bastnaesite ores contain less calcite ($CaCO_3$) and are rich in oxides of rare earths and oxides of base metals such as iron oxides and manganese oxide. Partially oxidized ores contain the carbonates (e.g., carbonatite) and fewer metal oxides.

Thus, a bastnaesite-based ore may comprise fully oxidized bastnaesite, partially oxidized bastnaesite that comprises a mixture of metal oxides and metal carbonates, or a substantially pure bastnaesite which comprises substantially 100% of the metals as metal carbonates. The total REE concentration in a typical raw (chemically untreated) bastnaesite-based ore may be from about 2 wt. % to about 12 wt. % calculated as the rare earth oxides (REOs). Although the composition of ore bodies from different geographic regions may vary dramatically, typical distributions of individual REEs, i.e., as a percentage of total REEs (TREEs) are illustrated in Table I.

TABLE I

| REE | Distribution (wt. %) |
| --- | --- |
| Ce | 40-43 |
| La | 24-27 |
| Nd | 15-18 |
| Pr | 4-5 |
| Sm | 2.6-3.0 |
| Gd | 1.4-1.7 |
| Eu | 0.04-0.7 |
| Dy | 0.3-0.5 |
| Tb | 0.11-0.14 |
| Y | 1.1-1.3 |
| Er | 0.06-0.08 |
| Others | 0.07-0.09 |

As can be seen in Table I, the primary REE components of the ore body are lanthanum and cerium, with smaller proportions of the other REEs.

Processes which attempt to extract REEs from bastnaesite-based ores at high temperature and with strong acid conditions also extract large amounts of acid soluble metal impurities, and consequently consume excess acid reagent. Further, the excess metal impurities that report to the PLS may negatively impact the quality of downstream REE-containing products and of recycled plant effluents. The cost of purifying an impure PLS by chemical precipitation, ion exchange and solvent extraction is significantly high and significantly impacts the economics of an REE recovery project. For example, the removal of Fe (e.g., $Fe^{3+}$) from a PLS by precipitation typically leads to significant losses of valuable HREEs, while other elements such as Zn, $Fe^{2+}$, K, Na, Al and Mn are not precipitated out of the PLS at low temperature and moderate pH conditions using alkaline solutions or oxalic acid.

Bastnaesite-based ores may be beneficiated by combinations of screens, gravity and magnetic separators. In robust beneficiation plants, froth flotation techniques are applied to a warm fine pulp to separate rare earth-bearing minerals from gangue minerals using a suite of reagents such as pH control reagents, depressants, frothers and collectors. The upgraded ore may contain REEs locked in calcites, silicates and/or apatite or completely liberated in oxide and carbonate form. For bastnaesite-based ores in which REEs are locked in excess calcites, silicates and apatite, the ores are typically decomposed or oxidized in reactors under strong alkaline conditions. In some cases, the oxidized bastnaesite-based ores are sulfated at high temperature and later digested in water such that the REE-sulfates dissolve in water with an advantage that oxidized cerium remains in the leach residue. The benefits of removing cerium far ahead in the hydrometallurgical process impacts positively on the economics of downstream individual REE separation. However, the cost of beneficiation and high temperature oxidation leads to excess energy and reagent usage together with deportment of heavy metal impurities in the final PLS. This means that additional purification processes are required to remove Fe, Mn and other base metals from the PLS.

Accordingly, there is a need for a method for the leaching of REEs from mineral ore bodies, such as bastnaesite-based mineral ore bodies, that leads to a reduced overall cost for the process, e.g., reduced capital expenditures ("capex") and/or reduced operating expenditures ("opex").

Figure 2:
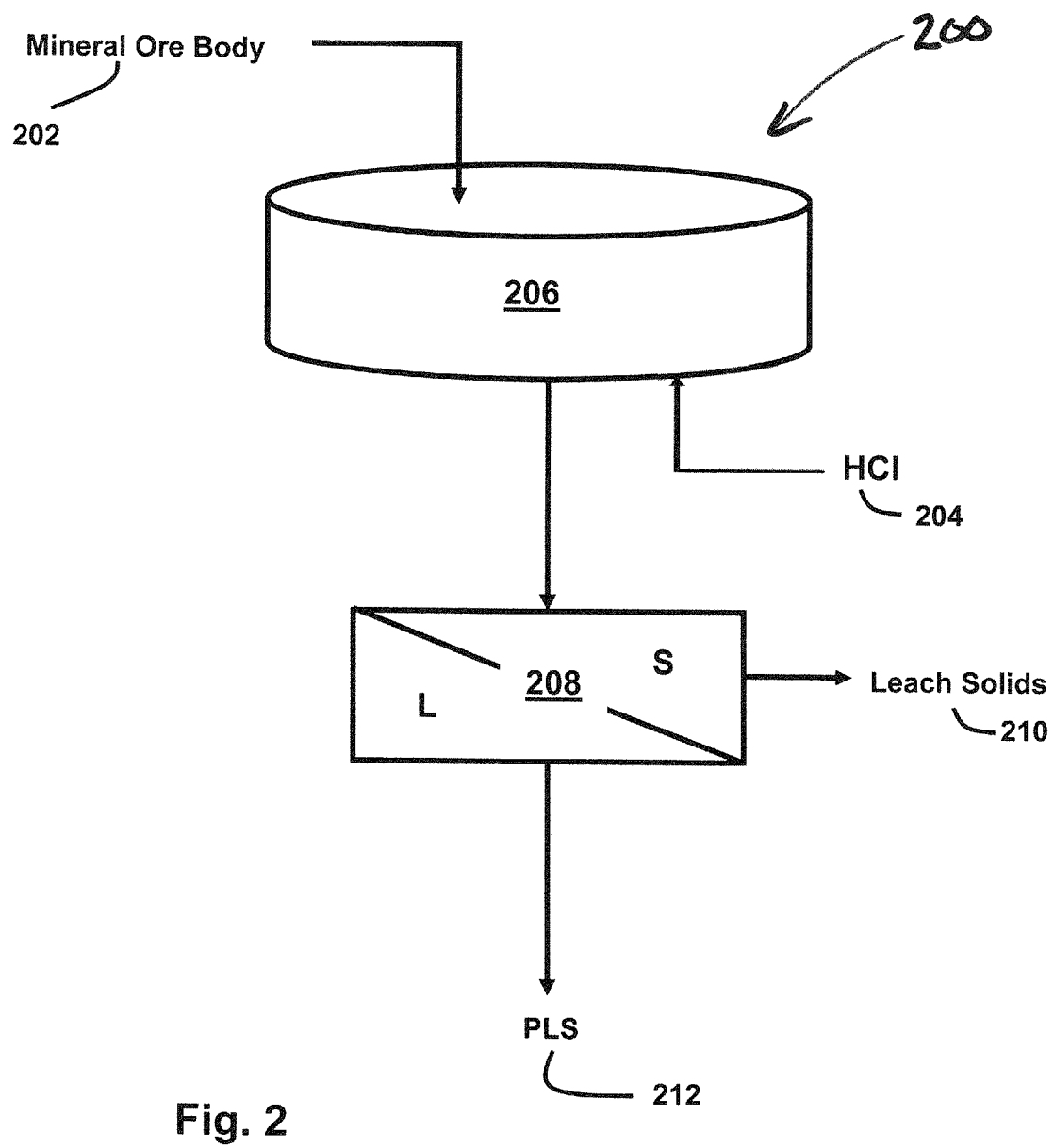
FIG. 2 is a schematic flowsheet illustrating a method for the leaching of a mineral ore body.

In one embodiment, the present disclosure relates to a method for leaching a mineral ore body comprising REEs. One such method is schematically illustrated in FIG. 2. The leaching method 200 may include contacting a mineral ore body 202 with an acid, e.g., an acid comprising hydrochloric acid (HCl) 204 in a reactor 206 for a period of time that is sufficient to solubilize at least a portion of the REEs from the mineral ore body 202.

In accordance with this embodiment, during the contacting of the HCl 204 and the mineral ore body 202 in the reactor 206, the leach temperature may advantageously remain relatively low. In one characterization, leach temperature during this contacting step does not exceed about 60° C. In further characterizations, the leach temperature during this contacting step does not exceed about 50° C., such as where the leach temperature does not exceed about 45° C., does not exceed about 40° C., or even does not exceed about 35° C. However the leach temperature should be sufficiently high to solubilize a substantial portion of the REEs from the Mineral ore body 202. For example, the leach temperature within the reactor 206 may be at least about 15° C., such as at least about 20° C. The leaching step 206 may also be carried out at ambient or substantially ambient pressure conditions, eliminating the need for a pressurized vessel such as an autoclave.

As is discussed above, the mineral ore body 202 may be, for example, a bastnaesite-based mineral ore body that includes fully oxidized bastnaesite (e.g., where the rare earth elements are in metal oxide form), partially oxidized bastnaesite (e.g., where the REEs are found in both metal oxide and metal carbonate form) or substantially pure bastnaesite (e.g., where the REEs are all found in metal carbonate form). In another embodiment, the mineral ore body 202 comprises little or no phosphate-based mineral, e.g., as may be found in a monazite-based mineral ore body.

The mineral ore body 202 may be a raw mineral ore body. As used herein, a raw mineral ore body is a mineral body that has not been substantially chemically altered after extraction of the ore from the ground, i.e., in the form of a rare earth ore concentrate. For example, a raw mineral ore body is one that has not been subjected to roasting, e.g., has not been heated to an elevated temperature to convert carbonates to oxides. Such treatment steps are often applied in known processes to concentrate the ore body, e.g., such that the concentration of rare earth oxides in the ore that is leached with the mineral acid is 50% or even higher. The elimination of roasting and similar pretreatment steps to materially alter the chemistry of the mineral ore body according to this embodiment the present disclosure may result in substantial cost savings.

The mineral ore body 202 that is contacted with the HCl 204 may include appreciable quantities of minerals and compounds in addition to the rare earth compounds (RE-oxides and/or RE-carbonates), referred to herein as gangue minerals. For example, the mineral ore body 202 may comprise an appreciable quantity of silicates, and in one characterization may include at least about at least about 20 wt. % elemental silicon (Si).

Because the mineral ore body 202 may comprise substantial quantities of gangue minerals, it may also have a relatively low concentration of rare earth compounds, e.g., as compared to rare earth ore concentrates. In one characterization, the mineral ore body fed to the leaching step may comprise not greater than about 16 wt. % rare earth elements, such as not greater than about 10 wt. % rare earth elements, or even not greater than about 6 wt. % rare earth elements. In another characterization, the mineral ore body 202 may comprise at least about 84 wt. % gangue minerals, such as at least about 90 wt. % gangue minerals or even at least about 94 wt. % gangue minerals. It is an advantage of the leaching process disclosed herein that such mineral ore bodies may be leached in an economical manner while extracting a very high percentage of the valuable metals from the ore.

For example, according to this embodiment, by exercising careful control over the leach conditions in the reactor 206, iron in the mineral ore body 202 may be inhibited from solubilizing in the PLS 212. This is a particular advantage when the PLS 212 is subsequently treated to precipitate the REEs as oxalate compounds as is discussed in more detail below. In one characterization, the mineral ore body 202 comprises iron, and not greater than about 30% of the iron in the mineral ore body 202 reports to the PLS 212, e.g., not greater than about 30% of the iron is solubilized in the PLS 212. For example, not greater than about 22% of the iron in the mineral ore body 202 may report to the PLS 212, or even not greater than about 10% of the iron in the mineral ore body 202 or even not greater than about 4% of the iron reports to the PLS 212. Thus, the PLS 212 may have a relatively low concentration of iron, and in one characterization the PLS 212 comprises not greater than about 9 g/L iron, such as not greater than about 4 g/L iron, not greater than about 2 g/L iron or even not greater than about 1 g/L iron.

In another aspect, the leach conditions disclosed herein (e.g., at temperatures of not greater than about 60° C.) may also inhibit thorium (Th) from solubilizing in the PLS 212, which may also lead to subsequent cost savings as thorium is undesirable in the PLS 212. For example, in one characterization, not greater than about 70 wt. % of the thorium in the mineral ore body 202 reports to the PLS 212, such as not greater than about 60% of the thorium in the mineral ore body 202 or even not greater than about 50% of the thorium in the mineral ore body. In another characterization, the PLS 212 may comprise not greater than about 125 g/L thorium, such as not greater than about 70 g/L thorium or even not greater than about 7 g/L thorium.

Despite the relatively moderate (e.g., low temperature) leach conditions, which may reduce the digestion of metals such as iron and thorium, it has been found that relatively high concentrations of REEs from the mineral ore body 202 may report to the PLS 212, particularly as compared to the low concentrations of gangue minerals that report to the PLS 212. That is, it has been found that the relatively low leach temperatures lead to a highly selective extraction of the REEs from the mineral ore body 202. In one characterization, at least about 65% of critical rare earth elements (CREEs) in the mineral ore body 202 report to the PLS 212. As is noted above, the CREEs include praseodymium (Pr), neodymium (Nd), europium (Eu), terbium (Tb), dysprosium (Dy) and yttrium (Y). In another characterization, at least about 75 wt. % of the CREEs in the mineral ore body 202 report to the PLS 212, such as at least about 85 wt. % of the CREEs in the mineral ore body 202 or even at least about 95 wt. % of the CREEs in the mineral ore body 202 report to the PLS 212. In another characterization, the PLS 212 that is separated from the leach solids 210 comprises at least about 30 g/L CREEs, such as at least about 15 g/L CREEs.

Although the mineral ore body 202 may be a raw ore body (e.g., not substantially chemically modified such as by roasting), the mineral ore body 202 may be comminuted before the leaching step to reduce the size of the mineral particles. In one characterization, prior to leaching the mineral ore body 202 is comminuted to reduce the particle size to about −48 mesh, or even smaller. A −48 mesh size means that substantially all of the particles are not greater than about 320 µm in size.

In another aspect of the method illustrated in FIG. 2, the quantity of mineral acid (HCl) 204 that is contacted with the mineral ore body 202 is relatively low. In one characterization, the leaching step comprises contacting the mineral ore body 202 with not greater than about 310 kg of HCl per tonne of (dry) mineral ore body 202. In another characterization, the leaching step comprises contacting the mineral ore body 202 with at least about 50 kg of HCl per tonne of (dry) mineral ore body 202. The HCl may be in the form of an aqueous solution having a concentration of from about 22 wt. % HCl to about 33 wt. % HCl, for example. These relatively low concentrations of HCl during the leaching step 206 may advantageously reduce the opex of the process.

The leaching step 206 may be carried out using virtually any leach configuration known to those skilled in the art. In one particular characterization, the leaching step 206 comprises contacting the mineral ore body 202 with the HCl in a counter-current leach configuration (CCL). A counter-current leach configuration may advantageously increase the efficiency of the leaching step. Nonetheless, the leaching step may also comprise contacting the mineral ore body 202 with the HCl in a static leach configuration. A static leach configuration may advantageously reduce or eliminate the need to comminute the mineral ore body 202 prior to leaching. For example, the mineral ore body 202 may comprise ore body particles having a particle size of at least about 1 nominal inch and not greater than about 2 nominal inch. In another characterization, the ore body particles may have a size of −10 mesh. In another characterization, the ore body particles may have a size of +3 mesh.

The methods disclosed with respect to FIG. 2 may also reduce or eliminate the need for the addition of other chemical(s) to the leaching step, i.e., in addition to the mineral acid. For example, many known leaching methods require the addition of an additive such as sodium sulfate ($Na_2SO_4$) to precipitate undesirable barium (Ba) from the PLS 212. The low temperature leach conditions described with respect to FIG. 2 may reduce or even eliminate the need for such an additive to the leach as the solubilization of barium is significantly reduced at the lower leaching temperatures.

Further, the method 200 described with respect to FIG. 2 may lead to a significantly reduced consumption of mineral acid (e.g., HCl), thus reducing opex and reducing the generation of toxic fumes. The resulting PLS 212 may require little or no further downstream processing to remove impurities such as base metals (e.g., Fe, Mg, Mn etc.) from the PLS 212.

Thus, the low temperature leaching method 200 may provide one or more of the following advantages:
(i) reduced digestion (solubilization) of impurities such as Fe, Mn, Al, Mg, Ba, Sr, Th and the like;
(ii) reduced evolution of flue gases and toxic vapors;
(iii) reduction or elimination of precipitation agents such as sodium sulfate for Ba precipitation;
(iv) the use of a low acid dosage in the leaching step, reducing or eliminating the need for sodium carbonate to neutralize the acid;
(v) low amounts of wash water for the solids residue since the acid volume in the leach residue may be relatively low;
(vi) reduced reagent costs;
(vii) reduced capex due to the use of smaller scrubbers and smaller filters;
(viii) reduced footprint due to a smaller amount of metal residue to be neutralized for disposal; and
(ix) enhanced purity of the REEs in the PLS, e.g., reduced Th, Ca and/or Ba in the PLS.

As is disclosed with respect to FIG. 1, the PLS may be treated in an oxalate formation step to convert REEs in the PLS to RE-oxalates. While the oxalate formation step disclosed herein may be applied to a PLS formed by a low temperature leaching process such as that described above, it will be appreciated that the oxalate formation step may be applied to any PLS, including those resulting from a higher temperature leaching step.

Figure 3:
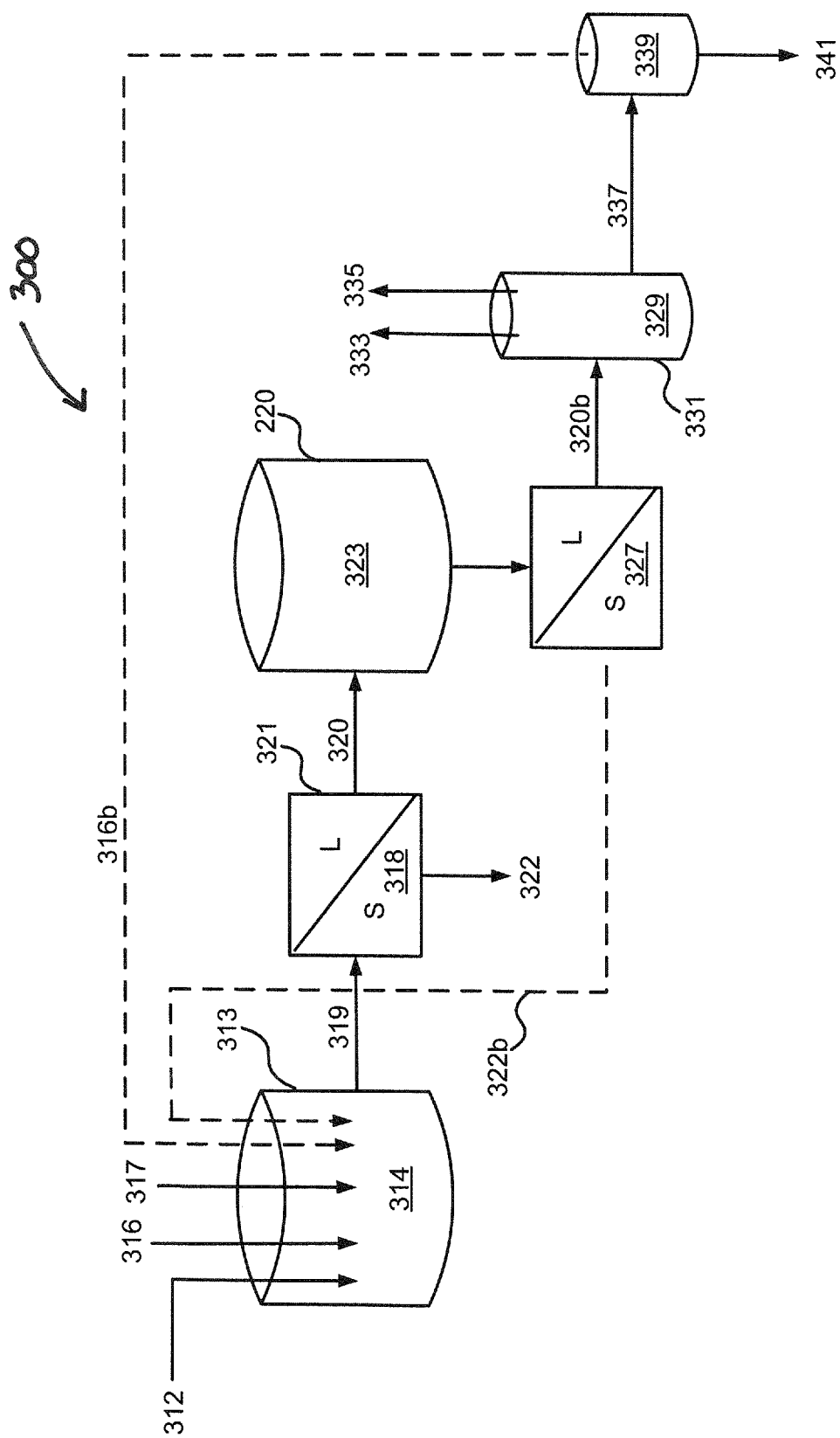
FIG. 3 is a schematic flowsheet illustrating a method for the precipitation of rare earth elements as rare earth oxalates from a pregnant liquor solution.

An embodiment of an oxalate formation step is illustrated in FIG. 3. FIG. 3 schematically illustrates one such method for the formation of an RE-oxalate product having low concentrations of non-REEs. As illustrated in FIG. 3, a PLS 312 is contacted with an oxalate ion source such as oxalic acid ($H_2C_2O_4.2H_2O$) 316 in an oxalate formation step 314. The PLS 312 may include one or more REEs, i.e., REEs that have been dissolved (e.g., solubilized) in the PLS 312. For example, the PLS 190 may be an acidic solution (e.g., from a chloride leach) and the REEs may be present as dissolved salts, such as dissolved chloride salts. In one example, the PLS 312 includes a concentration of REEs of at least about 20 g/l. For example, the PLS 312 may include at least about 25 g/l REEs, such as at least about 30 g/l REEs, at least about 35 g/l REEs, or even at least about 40 g/l REEs.

The PLS 312 may also include non-REE elements that are solubilized in the PLS 312. The non-RE elements may include metallic elements, particularly: alkali metals such as sodium (Na) and potassium (K); alkaline earth metals such as magnesium (Mg), calcium (Ca), strontium (Sr) and barium (Ba); transition metals such as nickel (Ni), copper (Cu), zirconium (Zr), iron (Fe), manganese (Mn) and titanium (Ti); post-transition metals such as lead (Pb) and aluminum (Al); metalloids such as silicon (Si); and radioactive metals (e.g., actinides) such as thorium (Th) and uranium (U). The non-RE elements may also include non-metallic elements such as sulfur (S) and phosphorous (P). Among the foregoing, and in certain characterizations, the PLS 312 may particularly include Mn in concentrations of at least about 10 g/l and/or may include Fe in concentrations of at least about 20 g/l. As is discussed above, the PLS 312 may have a relatively low concentration of non-RE elements, such as a PLS that is formed in accordance with the low temperature leaching process above.

It is a particular advantage of the oxalate formation step 314 of this embodiment that a substantial majority of the non-REEs do not report with (precipitate with) the RE-oxalate product 322, i.e., they remain solubilized in an REE-depleted solution 320.

Exemplary compositions of pregnant liquor solutions that may be treated to form RE-oxalates are illustrated in Table II.

TABLE II

| Element | PLS Example 1 (mg/l) | PLS Example 2 (mg/l) | PLS Exemplary Range (mg/l) |
|---|---|---|---|
| F | 3610 | 3380 | 3000-4000 |
| Al | 4555 | 4593 | 4000-5000 |
| Ba | 2126 | 2147 | 2000-2500 |
| Ca | 3045 | 3151 | 3000-3200 |
| Fe | 22838 | 22733 | 22000-30000 |
| K | 1638 | 1653 | 1000-2000 |
| Mg | 1892 | 1995 | 1000-2000 |
| Mn | 13349 | 13514 | 10000-14000 |
| Na | 17733 | — | 10000-180000 |
| P | 70 | 71 | 60-80 |
| Pb | 1011 | 1058 | 1000-1200 |
| S | <100 | <100 | 10-80 |
| Si | 47 | 49 | 40-50 |
| Th | 40 | 70 | 40-70 |
| Ti | 296 | 309 | 250-350 |
| U | 40 | 34 | 30-60 |
| Zn | 1210 | 1297 | 1000-3000 |
| REEs | 35737 | 36369 | >35000 |

As can be seen from Table II, pregnant liquor solutions, e.g., from the leaching of a REE-containing product with HCl, may also contain appreciable amounts of non-RE elements, including base metals and other undesirable metals such as uranium and thorium. It is an advantage of this embodiment that RE-oxalates may be precipitated from the PLS 312, while a substantial majority of the non-REEs remain in solution, i.e., do not form oxalate compounds during the oxalate formation step 314. Particularly, the method may result in very low concentrations of elements such as Al, Fe, Ca, Mg, Mn, P, Pb, S, Ti, U and/or Zn precipitating in the RE-oxalate product 322. As a result, the RE-oxalate product 322 is of high purity with respect to REEs and a substantial proportion of the base metals and other metals such as uranium may be removed prior to subsequent extraction and/or separation of the REEs, e.g., in a solvent extraction process.

The oxalate formation method of this embodiment to extract REEs may include contacting the PLS 312 with oxalic acid 316 in an oxalate formation step 314, such as by contacting the reactants in a reactor (e.g., a sealed reactor) under conditions such that RE-oxalate compounds (e.g., $RE_2(C_2O_4)_3$, where RE=rare earth) precipitate from the PLS 312 as an RE-oxalate product 322. It will be appreciated that the RE-oxalate compounds may also be hydrated compounds, e.g., $RE_2(C_2O_4)_3 \cdot xH_2O$. The PLS 312 is an acidic solution and may, for example, include free chloride ions. For example, the PLS 312 may comprise hydrochloric acid (HCl) and may be obtained from the leaching of rare earth minerals (e.g., a mineral ore body or a rare earth ore concentrate) with HCl. In one example, the PLS 312 has a free acid concentration (HCl) in the range of from about 0.5M to about 1M (e.g., from about 18.2 g/l to about 35.5 g/l HCl).

A sufficient amount of oxalic acid 316 is contacted with the PLS 312 in the reactor to precipitate a majority of the REEs as RE-oxalates in an RE-oxalate product 322. For example, the oxalic acid 316 (e.g., fresh oxalic acid) input to the oxalate formation step 314 may be an aqueous solution having a concentration of fresh oxalic acid of at least about 38.4 g/l. Further, the concentration of oxalic acid may be not greater than about 52.5 g/l. Excess oxalic acid may be required and may be obtained by recycling various product streams within the process as is described herein.

Sodium oxalate ($Na_2C_2O_4$) 317 may also be contacted with the PLS 312 in the oxalate formation step 314, such as by adding the sodium oxalate 317 to the oxalic acid 316, or by adding the sodium oxalate 317 directly to the PLS 312. As is illustrated in FIG. 3, the sodium oxalate 317 may advantageously be recycled from a subsequent process step, such as from crystallization step 315, describe below. Alternatively, or in addition to, fresh sodium oxalate may be added to the oxalate formation step 314. In one example, the ratio of (fresh) oxalic acid 316 to sodium oxalate 317 may be greater than 1, and in one particular characterization, the ratio of oxalic acid 316 to sodium oxalate 317 may be at least about 3:1 and not greater than about 4:1, such about 3.5:1. The addition of recycled sodium oxalate 317 to the oxalate formation step 314 may advantageously reduce the total consumption of oxalic acid by the process, and may represent a significant opex cost savings for the process.

The oxalate formation step 314 may be carried out under reaction conditions such that the formation of RE-oxalates is favored over the formation of most non-RE oxalates from the PLS 312. In one characterization, the oxalate formation step 314 is carried out by maintaining the reactants (e.g., PLS 312, oxalic acid 316 and optionally sodium oxalate 317) at an elevated precipitation temperature (e.g., a controlled precipitation temperature above ambient) of at least about 50° C. such as at least about 60° C. or at least about 70° C. Further, the precipitation temperature may be not greater than about 90° C., such as not greater than about 85° C. It has been found that a very high proportion of the REEs dissolved in the PLS 312 will precipitate as RE-oxalate particulates at such precipitation temperatures, while a comparatively low quantity of most non-RE elements, with the possible exception of thorium, will precipitate from the PLS 312. Precipitation temperatures at the higher end of this range (e.g., from about 75° C. to about 85° C.) may result in higher purity RE-oxalates, i.e., a high content of RE-oxalates in the RE-oxalate product 322 and a relatively low concentration of non-RE oxalates in the RE-oxalate product 322. In one characterization, the oxalate formation step 314 may be carried out by maintaining a precipitation temperature (e.g., in a reactor 313) for a sufficient amount of time to precipitate at least about 75 at. % of the REEs in the PLS 312 as particulate RE-oxalates, such as at least about 85 at. % of the REEs, at least about 90 at. % of the REEs, at least about 95 at. % of the REEs, or even at least about 98 at. %, at least about 99 at. % or at least about 99.5 at. % of the REEs. In one example, the oxalate formation step 314 may be carried out for at least about 30 minutes and not greater than about 120 minutes, such as for about 60 minutes. The reactants may also be agitated (e.g., mixed) in the reactor 313 during the oxalate formation step 314.

After formation of oxalate precipitates in the reactor 313, the metal oxalate precipitates may be allowed to crystallize (e.g., to grow) over a period of time and the RE-oxalate product 322 may then be separated from an REE-depleted solution 320 in a RE-oxalate separation step 318. For example, the mixture 319 of RE-oxalate product 322 and REE-depleted solution 320 may be allowed to cool over a period of time to allow crystallization (e.g., size increase) of the solid metal oxalates.

If the mixture 319 (e.g., slurry) from the oxalate formation step 314 is allowed to cool, it may take a long period of time (e.g., several days) for the metal oxalate precipitates to completely crystallize so that the RE-oxalate product 322 may be readily and economically separated from the REE-depleted solution 320. Alternatively, the temperature of the reactants may be increased to a second (crystallization) temperature (e.g., greater than the first precipitation temperature) to enhance (e.g., to accelerate) crystallization and growth of the metal oxalate precipitates, particularly of the RE-oxalates. It has been found that because a majority of the initially available oxalate ion ($C_2O_4^{2-}$) is consumed in the formation step 314 at the precipitation temperature, the increase in temperature in the crystallization step will not cause a substantial amount of non-RE elements to precipitate from the PLS 312. The crystallization temperature is greater than the precipitation temperature, and in one characterization, the crystallization temperature is at least about 5° C. greater than the precipitation temperature, such as at least about 7° C. greater than the precipitation temperature. In another characterization, the crystallization temperature is at least about 90° C., such as at least about 92° C. and is not greater than about 100° C., such as not greater than about 98° C. The crystallization of the oxalates may be carried out in the same reactor as the precipitation of the oxalates (e.g., in reactor 313), or may be carried out in a separate reactor (not illustrated).

The crystallization temperature may be maintained for a time sufficient to grow the RE-oxalate particulates to a size that is suitable for subsequent separation 318 from the remaining REE-depleted solution 320. In one characterization, the crystallization temperature is maintained for a period of time sufficient to grow the RE-oxalate precipitates to a mean average size (e.g., diameter) of at least about 100 μm, such as at least about 200 μm, for example at least about 250 μm. In one particular characterization, the RE-oxalate precipitates are crystallized to a mean average size of from about 400 μm to about 450 μm. For example, the crystallization temperature may be maintained for at least about 4 hours and not greater than about 8 hours, such as for about 6 hours.

After crystallization, the RE-oxalate product 322 may be separated from the REE-depleted solution 320 in a separation step 318. For example, the separation step 318 may include the use of a micro-filter 321 to separate the RE-oxalate product 322 from the REE-depleted solution 320.

The RE-oxalate product 322 comprises predominately RE-oxalates. It is an advantage of the oxalate formation step 314 that the RE-oxalate product 322 may be of very high purity with respect to REEs. For example, the total non-REEs (e.g., Ba, Na, K, Si, Sr and/or Th) may constitute not greater than about 5 wt. % of the RE-oxalate product 322, such as not greater than about 3 wt. % or even not greater than 1 wt. % of the RE-oxalate product 322. Table III illustrates the elemental metal concentrations of exemplary RE-oxalate products, i.e., expressed as percentages of the total metal content, as determined by inductively coupled plasma (ICP) analysis.

TABLE III

| Element | Ex. 1 Concentration (at. % of total metals) | Ex. 2 Concentration (at. % of total metals) |
|---|---|---|
| TREEs | ~98.2 | ~92.5 |
| F | 0.00 | 0.00 |
| Al | <0.01 | <0.01 |
| Ba | 0.44 | 1.00 |
| Ca | 0.16 | <0.10 |
| Fe | 0.16 | 0.58 |
| K | 0.14 | <1.00 |
| Mg | <0.01 | <0.01 |
| Mn | <0.1 | <0.1 |
| Na | 0.08 | <0.1 |
| P | 0.04 | 0.24 |
| Pb | 0.04 | <0.10 |
| S | 0.04 | 0.04 |
| Si | 0.02 | <0.50 |

TABLE III-continued

| Element | Ex. 1 Concentration (at. % of total metals) | Ex. 2 Concentration (at. % of total metals) |
|---|---|---|
| Th | 0.52 | 0.58 |
| Ti | 0.02 | <0.10 |
| U | 0.00 | 0.00 |
| Zn | <0.01 | <0.10 |
| Total Non-REEs | ~1.74 | ~7.04 |
| Th + U | ~0.52 | ~0.58 |

As is illustrated by Table III, the oxalate formation step 314 may advantageously precipitate RE-oxalates in a highly selective manner from the PLS 312, e.g., to the exclusion of non-REEs such as base metals.

Thus, the REE-depleted solution 320 may be an acidic solution that includes solubilized metals that did not precipitate, e.g., to form a metal oxalate, during the oxalate formation step 314. For example, the REE-depleted solution 320 may include solubilized elements as listed in Table III such as Fe, Mn, Th, U, F, Al, Ca, K, Mg, Na, Sr, Zn, P, S, Pb and Ti. In one characterization, the REE-depleted solution 320 includes not greater than about 0.5 g/l REEs, such as no greater than about 0.25 g/l REEs. In another characterization, the REE-depleted solution 320 contains no greater than about 10 ppm thorium, such as from about 1 ppm to 10 ppm thorium. The REE-depleted solution 320 may have high free acid content, and the free acid content may be higher than the free acid content of the PLS 312. For example, the free acid content (e.g., HCl) of the REE-depleted solution 320 may be at least about 100 g/l, such as at least about 110 g/l. In another characterization, the free acid content of the REE-depleted solution 320 may be at least about 1.5 times greater than the free acid content of the PLS 312, such as at least about 2 times greater than the free acid content of the PLS 312.

As is disclosed above, the RE-oxalate product 322 may include a high concentration of the REEs in the form of RE-oxalates. In one characterization, at least about 95 wt. % of the total metallic elements in the RE-oxalate product 322 are REEs, such as at least about 97 wt. % and even at least about 99 wt. % of the total metallic elements. Any remaining non-REE metal oxalates (i.e., impurities) may comprise, for example, oxalates of Ba, Na, K, Si and Th. Stated another way, based on the total metals content of the RE-oxalate product 322, the product 322 may include not greater than about 5 at. % non-REE metals, such as not greater than about 3 at. % non-REE metals and even not greater than about 1 at. % non-REE metals.

The REE-depleted solution 320 may be recycled to conserve acid (e.g., HCl acid), which may be particularly advantageous due to the relatively high free acid content of the REE-depleted solution 320. For example, as illustrated in FIG. 3, the REE-depleted solution 320 may be transferred to a thickening step 323 such as in a thickener 325. After thickening 323, a separation step 327 may be carried out to separate metal oxalates 322b, which then may be recycled to the oxalate formation step 314, from an acidic solution 320b, e.g., an acidic solution that includes a high concentration of chloride ions. The solution 320b may be subjected to a distillation step 329 using a distiller 331 to recover water 333, which may be used as process water in other process steps, and acid 335, which may also be recycled to other process steps such as a leaching step described above (FIG. 2). Residue 337 from the distillation step 329 may be further treated in a crystallization step 339 to recover and recycle oxalic acid crystals 316b and a by-product 341 that contains metals. The by-product 341 may be processed to recover further metals of value, such as gold, uranium, aluminum, manganese, iron, magnesium, strontium and zinc.

As is discussed above with respect to FIG. 1, certain embodiments of the present disclosure are directed to metathesizing a RE-containing product (e.g., RE-oxalates described above) to a second RE-containing product (e.g., RE-hydroxides or RE-carbonates). The metathesis may be carried out in combination with one or more steps disclosed herein (e.g., with a low temperature leach and/or an oxalate formation step), or may be carried out independently.

Although the methods described above for the formation of RE-oxalates may advantageously reduce the concentration of impurities associated with the REEs, the solubility of REE-oxalates in acid is very low. Thus, one embodiment of this disclosure specifically provides for the conversion of the RE-oxalates to a more soluble form, e.g. RE-carbonates, by a metathesis reaction to render the REEs soluble in an acid such as nitric acid ($HNO_3$).

Figure 4:
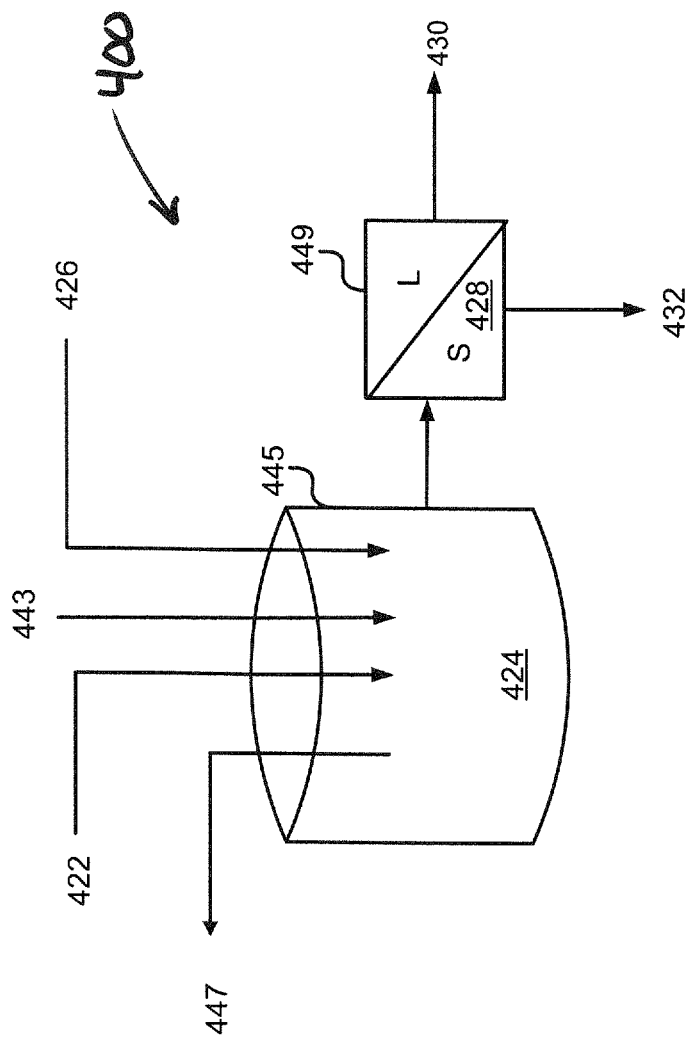
FIG. 4 is a schematic flowsheet illustrating a method for the conversion of a rare earth oxalate product to a rare earth carbonate product by metathesis.

In the embodiment illustrated in FIG. 4, an RE-oxalate product 422 is converted in a metathesis step 424 to a RE-carbonate product 432 for subsequent dissolution of the REE-carbonate product 432 in an acid, e.g., to solubilize the REEs and thorium in an acidic solution, as is discussed below. In this embodiment, an RE-oxalate product 422 is contacted with a carbonate ion source 426 such as sodium carbonate ($Na_2CO_3$) in the metathesis step 424, along with a solvent 443 such as water (e.g., fresh or recycled water), which may be introduced with the other reactants or introduced separately. For example, the metathesis step 424 may include contacting the reactants in a reactor 445 for a period of time sufficient to convert at least about 98%, such as at least about 98.5% of the REEs in the RE-oxalate product 422 to RE-carbonates in the RE-carbonate product 432. In one characterization, the reactants are maintained at an elevated temperature e.g., at least about 70° C., such as at least about 90° C., or at least about 100° C., to ensure that very little or substantially no sodium oxalate precipitates from the solution. When sodium hydroxide (NaOH) is utilized for metathesis, e.g., to form RE-hydroxides from the RE-oxalates, the reactants may advantageously be maintained at a temperature of at least about 90° C., such as at least about 100° C. or even at least about 110° C.

The metathesis step 424 may be carried out for a period of time sufficient to convert at least about 98%, such as at least about 98.5% of thorium in the RE-oxalate product 422 from thorium oxalate to thorium carbonate in the RE-carbonate product 432. The only by-product of the metathesis step 424 is a high-purity carbon dioxide stream 447 which may be captured as a by-product.

In a separation step 428, the RE-carbonate product 432 (e.g., RE-carbonate particulates) are separated from an oxalate solution 430 such as by using a filter 449. The separation step 428 may be maintained at an elevated temperature to prevent substantial amounts of sodium oxalate from precipitating out of the solution. For example, heated water (e.g., heated to a temperature of at least about 50° C., such as at least about 70° C.) may be passed through the filter 449 to maintain the sodium oxalate in solution if desired.

The oxalate solution 430 may therefore include substantial amounts of dissolved oxalates (e.g., $Na_2C_2O_4 \cdot yH_2O$ when the carbonate source 426 is sodium carbonate) and the oxalate solution 430 may advantageously be recycled to a step where the REEs are precipitated as the RE-oxalate product 422 (see FIG. 3).

Figure 5:
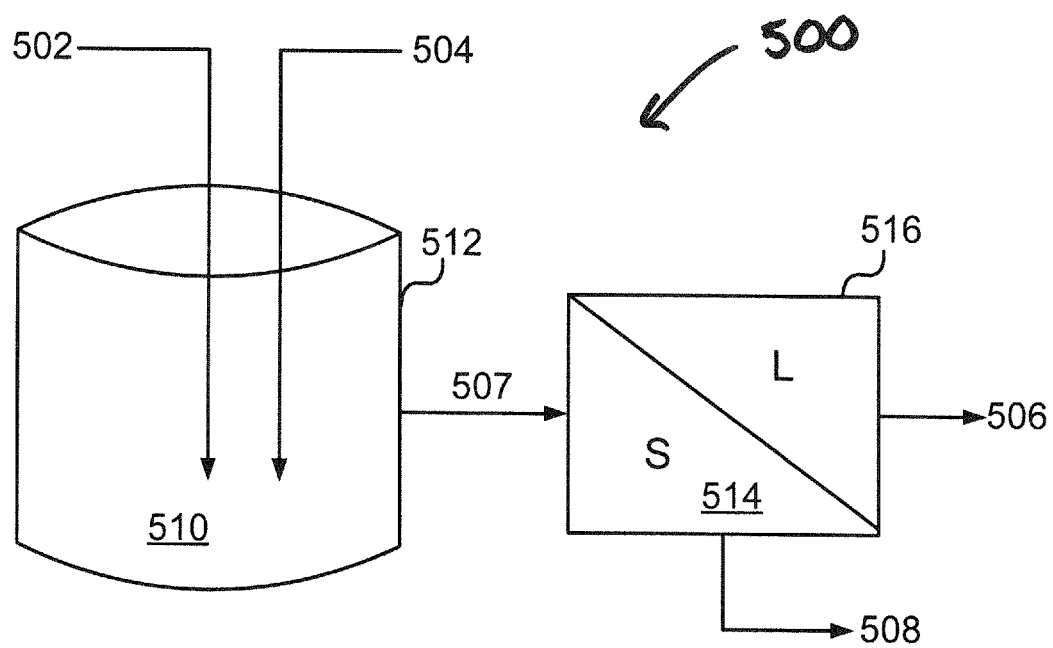
FIG. 5 is a schematic flowsheet illustrating a method for the selective precipitation of thorium from an acidic solution.

FIG. 5 illustrates a schematic flowsheet of a method for the precipitation of thorium from an acidic solution according to one embodiment of the present disclosure. As is disclosed above, the hydroxylation steps may be carried out independently or may be carried out in combination with one or more of the foregoing embodiments for processing REE-containing products.

As illustrated in FIG. 5, an acidic solution 502 containing at least solubilized thorium is contacted with a hydroxide ion source 504 (e.g., a hydroxide salt) in a hydroxylation (i.e., precipitation) step 510, e.g., by contacting the acidic solution 502 and hydroxide ion source 504 in a reactor 512 to cause thorium in the acidic solution 502 to precipitate as thorium hydroxide. After at least a portion of thorium in the acidic solution 502 has precipitated from the acidic solution 502 as thorium hydroxide, a thorium depleted solution 506 may be separated from a thorium hydroxide product 508 in a separating step 514, e.g., using a filter 516.

The acidic solution 502 contains at least solubilized thorium. The acidic solution 502 may be derived from the leaching of a raw mineral ore or an ore concentrate containing REEs or other high-value metals. Thorium is among the elements that are commonly found in mineral deposits containing REEs and the resulting acidic leach solutions typically contain undesirable concentrations of thorium. In one example of this embodiment, the concentration of solubilized thorium in the acidic solution 502 may be at least about 50 mg/l (milligrams per liter), such as at least about 100 mg/l of solubilized thorium in the acidic solution 502, or even at least about 200 mg/l of solubilized thorium. Typically, the acidic solution will comprise not greater than about 1500 mg/l thorium, such as not greater than about 850 mg/l thorium.

The acidic solution 502 may also include one or more REEs, i.e., REEs that are also solubilized in the acidic solution 502. For example, the acidic solution 502 may include REEs in a concentration of at least about 10 grams per liter (g/l). In certain characterizations, the acidic solution 502 includes a relatively high concentration of REEs, such as at least about 15 g/l REEs, at least about 20 g/l REEs, at least about 30 g/l or even at least about 50 g/l REEs, where the REEs are solubilized (e.g., dissolved) into the acidic solution 502. Typically, the acidic solution 502 will include not greater than about 100 g/l REEs. In one particular characterization of this example, the acidic solution 502 includes at least one or more REEs of particularly high value, such as one or more of the CREEs, namely praseodymium, neodymium, europium, terbium, dysprosium and yttrium.

The solution 502 is acidic and may have a pH of not greater than about pH 3.0, such as not greater than about pH 1.0, prior to being contacted with the hydroxide ion source 504. In one example, the acidic solution includes nitric acid ($HNO_3$), although other acids such as sulfuric acid ($H_2SO_4$) may also be useful in the embodiments disclosed herein. For example, the acidic solution 502 may comprise nitric acid and may be obtained from the acid digestion of rare earth compounds, e.g., the acid digestion of RE-oxides, RE-hydroxides, RE-oxalates and/or RE-carbonates with nitric acid to form solubilized nitrate compounds of the REEs. In one characterization, the free acid in the acidic REE solution is obtained from the acid digestion of a RE-hydroxide product or RE-carbonate product, such as a RE-hydroxide or RE-carbonate product formed in accordance with the metathesis step described above. Nitric acid is particularly useful, as the thorium hydroxide precipitated during hydroxylation 510 will become stable and thus will not substantially dissolve, even at a relatively low pH (e.g., at a relatively high acidity).

The acidic solution 502 comprises nitric acid, and in one particular example, the acidic solution 502 has a free acid concentration in the range of from about 0.5 g/l to about 55 g/l $HNO_3$. When the acidic solution 502 comprises nitric acid, the solubilized elements (e.g., thorium and REEs) may be in the form of solubilized nitrate salts. It is an advantage of this embodiment that the acidic solution 502 may have a relatively low free acid concentration, and therefore may require relatively small quantities of the hydroxide ion source 504 to precipitate thorium hydroxide and to avoid diluting metal species in solution, which favors crystallization to precipitate thorium.

The acidic solution 502 may also include traces of non-REEs that are solubilized in the acidic solution 502. For example, the non-REEs may include metallic elements, such as: alkali metals such as sodium (Na) and potassium (K); alkaline earth metals such as magnesium (Mg), calcium (Ca), strontium (Sr) and barium (Ba); transition metals (e.g., base metals) such as nickel (Ni), copper (Cu), zirconium (Zr), iron (Fe), manganese (Mn) and titanium (Ti); post-transition metals such as lead (Pb) and aluminum (Al); metalloids such as silicon (Si); and other radioactive metals (e.g., actinides) such as uranium (U). The non-REEs may also include non-metallic elements such as sulfur (S) and phosphorous (P). The acidic solution may also contain other base metals, such as lead (Pb) or zinc (Zn).

In one example, the acidic solution 502 includes primarily REEs and thorium, with little or no other non-RE elements (e.g., base metals) that are solubilized in the acidic solution 502. For example, the acidic solution 502 may comprise not greater than about 5 wt. % non-RE elements, such as not greater than about 3 wt. % non-RE elements on a metals basis.

The hydroxylation step 510 includes contacting the thorium-containing acidic solution 502 with a hydroxide ion source 504, such as sodium hydroxide or ammonium hydroxide, to precipitate a thorium hydroxide product 508 (e.g., predominately containing particulate thorium hydroxide). For example, the reactants may be contacted in a reactor 112 under conditions such that at least a portion of the thorium solubilized in the acidic solution 502 precipitates as a thorium hydroxide product 508.

It is an advantage of the method of this embodiment that the thorium may be precipitated from the acidic solution 502, while a substantial majority of the REEs contained in the acidic solution 502 remain solubilized in a thorium depleted solution 506 that is separated from the thorium hydroxide product 508. To ensure that sufficient quantities of thorium precipitate from the acidic solution 502 and that a substantial majority of REEs in the acidic solution 502 remains solubilized, it has been found that the pH during the hydroxylation step 510 should be maintained at a pH that enables high selectively for thorium, i.e., to preferentially precipitate thorium from the acidic solution 502. In one characterization, the pH during the hydroxylation step 510 is within the range of at least about pH 3 and not greater than about pH 6.0. It has been found that increasing the pH within this range may increase the amount of thorium precipitated from the acidic solution 502 as a thorium hydroxide product 508. In one characterization, the pH during the hydroxylation step 110 is maintained at a pH of at least about pH 3.1, such as at least about pH 3.2, at least about pH 3.3, at least about pH 3.4 or even at least about pH 3.5, such as at least about pH 3.6. However, as the pH approaches higher levels, an increasing quantity of REEs may also precipitate from the acidic solution 502 (e.g., as particulate RE-hydroxides). In the embodiment illustrated in FIG. 5, to avoid the precipitation of undesirable quantities of REEs from the solution, the pH may be maintained at less than about pH 4, such as not greater than pH 3.9 or not greater than pH 3.8. In one example, the pH during the hydroxylation step 510 may be maintained at the desired pH level by controlling the quantity of hydroxide precipitant 504 that is added to the reactor 512 during the hydroxylation step 510, e.g., during the precipitation of thorium from the thorium-containing acidic solution 502.

It has also been found that the desirable range of pH values for the selective precipitation of thorium is dependent upon the concentration of solubilized thorium in the acidic solution 502. In particular, it has been found that increased pH values within the range of about pH 3.5 to pH 4 or slightly higher may be utilized to selectively precipitate thorium as a thorium hydroxide product 508 without precipitating significant amounts of REEs when the concentration of thorium in the acidic solution 502 is relatively low. That is, as the concentration of the thorium in the acidic solution 502 decreases, the pH during the hydroxylation step 510 may be increased to remove additional thorium without removing substantial quantities of REEs. In one example, the acidic solution 502 can be diluted (e.g., with water) to reduce the thorium concentration, and the hydroxylation step 510 may carried out at a higher pH (e.g., pH 3.5 to pH 3.9) without precipitating undesirable quantities of REEs. In one characterization, the acidic solution 502 comprises not greater than about 800 mg/l of thorium, such as not greater than 500 mg/l, or even not greater than about 200 mg/l thorium, and the contacting step is carried out at a pH of at least about pH 3.5, such as at least about pH 3.6, at least about pH 3.7, and even at least about pH 3.8, but typically not greater than pH 4, such a not greater than pH 3.9. However, it is believed that at least about 50 mg/l of thorium is required in the solution for precipitation of thorium to occur.

The thorium-containing acidic solution 502 and the hydroxide ion source 504 should remain in contact (e.g., in reactor 512) for a period of time sufficient to precipitate a majority (e.g., at least about 50%) of the thorium from the acidic solution 502 and form a thorium depleted solution 506 and a thorium hydroxide product 508. In one characterization, the time of contact (e.g., the average residence time in the reactor) during the hydroxylation step 510 may be at least about 30 minutes and may be not greater than about 90 minutes. It is an advantage of this embodiment that the hydroxylation step 510 may be carried out at ambient temperatures, e.g., the step does not typically require the reactor 512 to be heated or cooled. Further, the hydroxylation step 510 may be carried out at ambient pressures, e.g., the hydroxylation step 510 does not require a sealed or otherwise pressure-controlled reactor 512.

After the contacting step 510, the thorium hydroxide product 508 may be separated from the thorium depleted solution 506 in a separating step 514. For example, a filter 516 may be used to filter the output stream 507 containing thorium hydroxide and the thorium depleted solution 506 from the reactor 512 and retain the thorium hydroxide product 508 on the filter 516. The thorium depleted solution 506 (i.e., the filtrate), containing high levels of REEs and very low levels of thorium, may be further treated as is discussed below to extract cerium. The thorium hydroxide product 508 may advantageously be of high purity, i.e., the product may comprise at least about 99 wt. % thorium hydroxide, such as at least about 99.9 wt. % thorium hydroxide. The thorium hydroxide product 508 may be disposed of, or may be a salable commodity particularly in view of the ability to form a high purity thorium hydroxide product 508.

As is noted above, thorium precipitation from the acidic solution may be enhanced with increased pH (e.g., up to about pH 4) and with a decreased concentration of thorium in the acidic solution and with low free acid content. In one example of this embodiment, this finding may be applied in a multi-step (e.g., two-step) process for the separation of thorium. Specifically, the thorium extraction method of this embodiment may include a first hydroxylation step that includes contacting an acidic solution with a hydroxide precipitant at a first pH, e.g., of at least about pH 3 and not greater than about pH 4, to precipitate a thorium hydroxide product containing very low amounts of REEs and form an intermediate thorium depleted solution, i.e., having a lower concentration of thorium than the acidic solution. The intermediate thorium depleted solution may then be subjected to a second hydroxylation step where the intermediate thorium depleted solution is contacted with a hydroxide precipitant at a second pH of at least about pH 3.1 and not greater than about pH 6, such as not greater than about pH 4.2, where the second pH is greater than the first pH to remove additional thorium. In one particular characterization of this method, the pH during the first hydroxylation step is from about pH 3.0 to about pH 3.3, and the pH during a second hydroxylation step is from about pH 3.5 to about pH 4. In this regard, the pH in the second hydroxylation step may be carried out at such higher pH to aggressively remove thorium, even if some REEs precipitate with the thorium hydroxide product. In the event that some valuable REEs are precipitated with the thorium, the resulting hydroxide product may be recycled, e.g., recycled back to the first hydroxylation step at lower pH.

Figure 6:
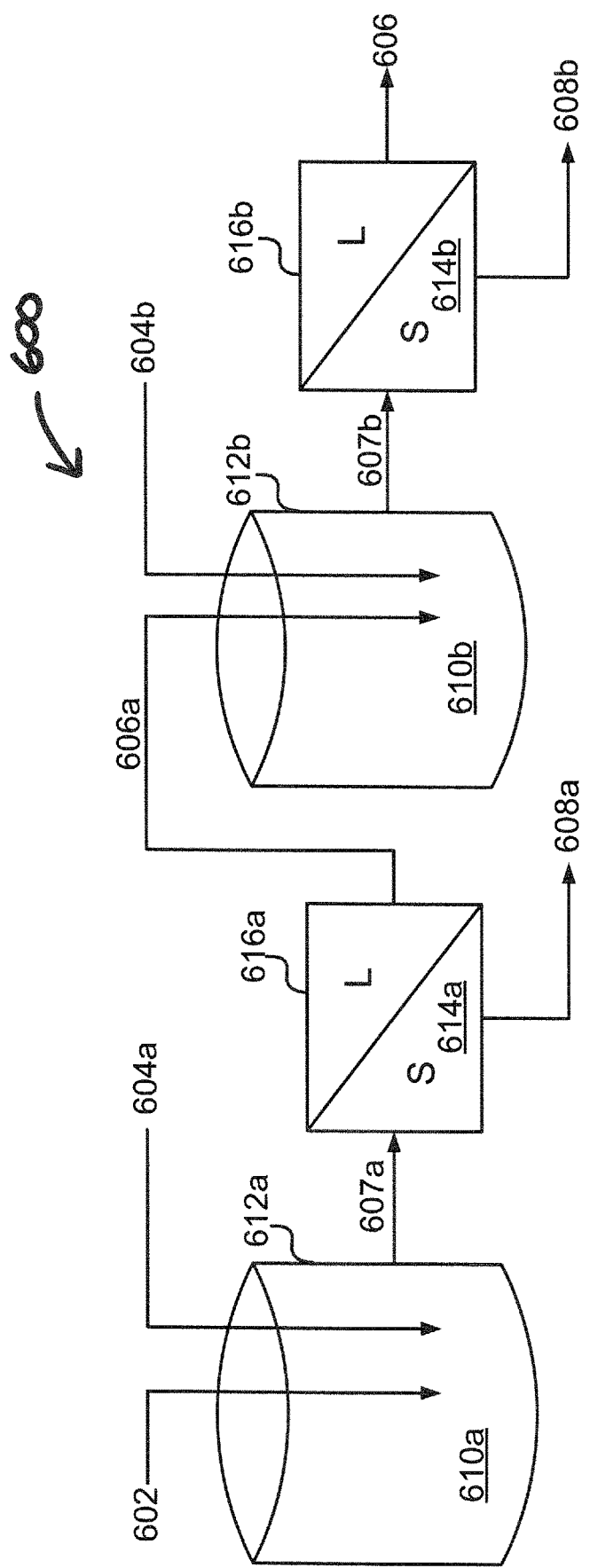
FIG. 6 is a schematic flowsheet illustrating a method for the selective precipitation of thorium from an acidic solution using multiple hydroxylation steps.

Referring now to FIG. 6, this exemplary method may include a first hydroxylation step 610a where the acidic solution 602 is contacted with a first hydroxide ion source 604a, such as in a first reactor 612a, under conditions such that at least a portion of the thorium in the acidic solution 602 precipitates as a first thorium hydroxide product 608a and a substantial majority of the REEs (e.g., at least about 99 at. % of the REEs on a metals basis) remain solubilized in an intermediate thorium depleted acidic solution 606a. For example, at least about 50% of the thorium in the acidic solution 602 may be precipitated in reactor 612a and removed in a first separation step 614a, e.g., using a filter 616a. In one particular characterization, at least about 60% and not greater than about 90% of the thorium in the acidic solution 602 is separated from the intermediate thorium depleted solution 606a in the separation step 614a as a thorium hydroxide product 608a. As a result, the intermediate thorium depleted solution 606a recovered from the separation step 614a has a lower concentration of thorium than the acidic solution 602.

As is discussed above, the lower concentration of thorium in the intermediate thorium depleted solution 606a advantageously enables a higher pH to be utilized in a second hydroxylation step 610b (i.e., as compared to the first hydroxylation step 610a), e.g., in a second reactor 612b. Thus, in a second separation step 614b, a second thorium hydroxide product 608b is separated from the thorium depleted solution 606. The thorium depleted solution 606 from the separation step 614b may advantageously include not greater than about 5% of thorium contained in the acidic solution 602, such as not greater than about 2% of the thorium contained in the acidic solution 602. Further, due to the high selectivity of the process, at least about 95%, such as at least about 98%, of REEs in the acidic solution 602 may remain solubilized in the thorium depleted solution 606. Although illustrated as a two-step process in FIG. 6 (e.g., including two hydroxylation steps), the method may include additional incremental steps if desired for enhanced thorium precipitation and/or enhanced REE recovery.

Further, the amount of thorium hydroxide product 608b that is separated to form the thorium depleted solution 606 may be relatively small, as compared to the amount of thorium hydroxide product 608a that is separated to form the intermediate thorium depleted solution 606a. Further, the thorium hydroxide product 608b may include some REEs (due to the higher pH used in hydroxylation step 610b). In one characterization, the thorium hydroxide product 608b may include up to about 20 wt. % REEs on a metals basis. Therefore, in one example, the thorium hydroxide product 608b may be recycled back to the first hydroxylation step 610a, so that the recovery of REEs from the thorium depleted solution 606 is increased. That is, any increase in the amount of REEs precipitated as REE-hydroxides in hydroxylation step 610b may be mitigated by recycling the thorium hydroxide product 608b to hydroxylation step 610a, keeping the REEs within the circuit. Thus, in this example, substantially all of the thorium hydroxide may be extracted from the circuit with the thorium hydroxide product 608a while reducing losses of REEs.

In one example of the foregoing embodiments, ammonium hydroxide ($NH_4OH$) is utilized as a hydroxide ion source 604a/604b to precipitate thorium as thorium hydroxide. For example, ammonium hydroxide may be added as an aqueous solution having a concentration of from about 10 wt. % to about 20 wt. % ammonium hydroxide, e.g., about 15 wt. % ammonium hydroxide. As a result, the thorium depleted solution 606 recovered from the separation step(s) 614a/614b may contain substantial amounts of ammonium nitrate ($NH_4NO_3$), dissolved in the thorium depleted solution 606. It may be desirable to continuously or intermittently extract the ammonium nitrate, which is a valuable and salable by-product.

In some examples, it may be advantageous to integrate the method(s) described above for the precipitation of thorium from an acidic solution (e.g., an REE-containing acidic solution) with a solvent extraction circuit for extracting REEs, e.g., from the thorium depleted solution. It may also be advantageous to integrate a method for the formation of the acidic solution, before hydroxylation, by acid digestion of rare earth compounds, such as the acid digestion of RE-oxides. In one particular embodiment, reagent consumption may be reduced and overall operating expenses of the process reduced by recycling nitric acid from a solvent extraction circuit to an acid digestion step to form the above-described acidic solution. In one characterization, nitric acid consumption may be reduced to almost zero, with only make-up nitric acid being added to the process to compensate for normal evaporation and leakage losses.

Figure 7:
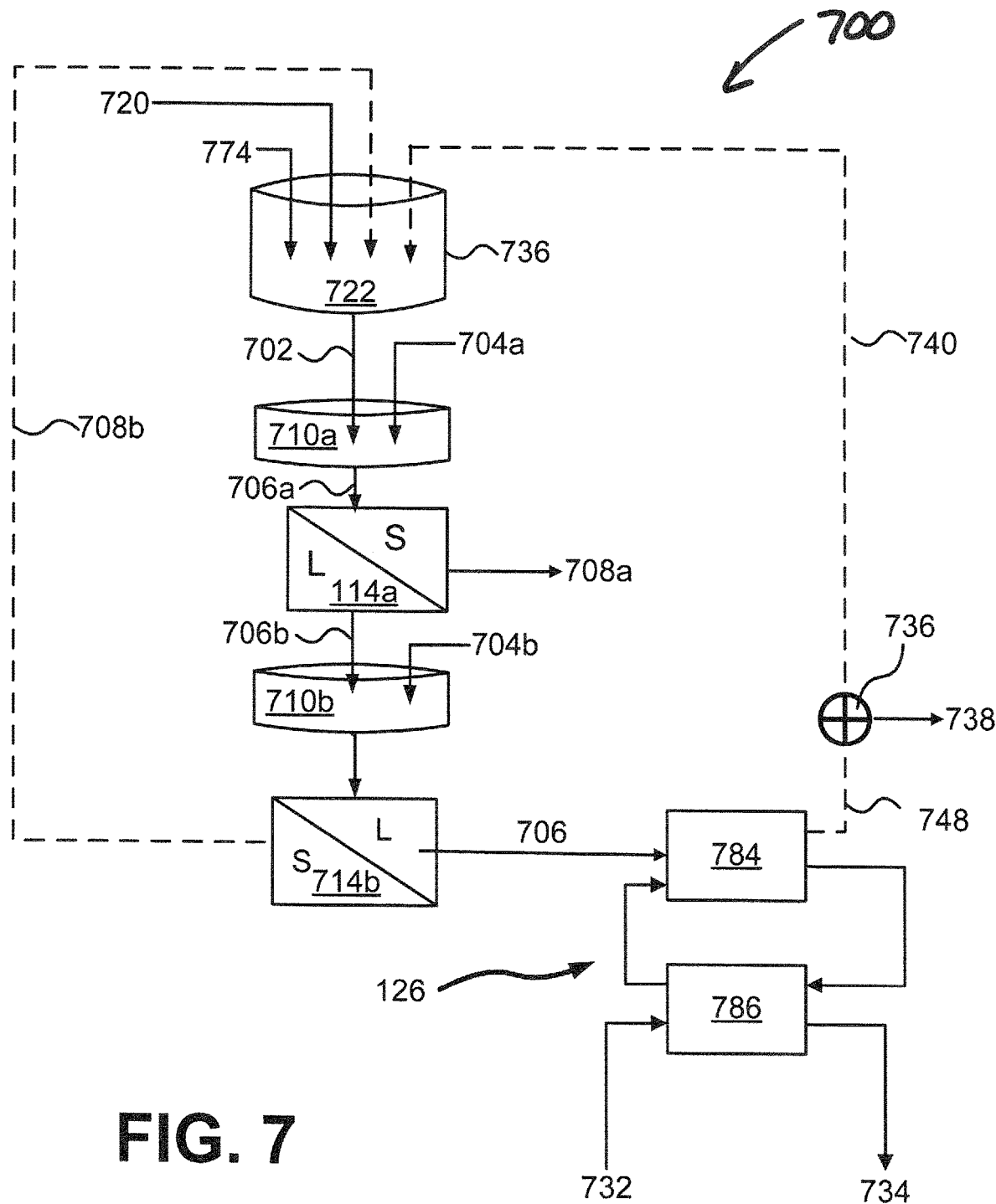
FIG. 7 is a schematic flowsheet illustrating a method for the precipitation of thorium as thorium hydroxide from an acidic solution including the recycle of acid from a solvent extraction circuit.

In one example, the acidic solution is formed by the acid digestion of an RE-oxide product or RE-carbonate product, such as one that has a high purity with respect to REEs. As illustrated in FIG. 7, an RE-oxide product 774 may be contacted with an acid 720 (e.g., fresh nitric acid and/or sulfuric acid) in an acid digestion step 722, such as in a reactor 724. The acidic solution 702 may be contacted in a first hydroxylation step 710a with a hydroxide ion source 704a to precipitate a thorium hydroxide product 708a from the acidic solution 702. The thorium hydroxide product 708a may be separated from the thorium depleted solution 706b in a separation step 714a. Thereafter, as illustrated with respect to FIG. 6, the intermediate thorium depleted solution 706b may be contacted in a second hydroxylation step 710b with a second hydroxide precipitant 704b to form the thorium depleted solution 706. The thorium depleted solution 706 may then be separated from the second thorium hydroxide product 708b in a separation step 714b.

As is noted above, the amount of thorium hydroxide product 708b may be relatively small and there may be appreciable quantities of REEs in the thorium hydroxide product 708b. To reduce losses of REEs, the thorium hydroxide product 708b may be recycled back to the process, and as illustrated in FIG. 7, the second thorium hydroxide product 708b is recycled back to the acid digestion step 722 where the thorium is re-digested with the RE-oxide product 774. In this manner, all of the thorium hydroxide is removed from the acidic solution 702 with the first thorium hydroxide product 708a. When the thorium hydroxide product 708b is separated in separating step 714b, the resulting thorium depleted solution 706 is a relatively high purity RE-nitrate solution.

The high purity RE-nitrate solution 706 may then be subjected to a solvent extraction circuit 726 to extract REEs from the thorium depleted solution 106. One example of such a solvent extraction circuit is described below with respect to FIGS. 14-20. It is an advantage of this embodiment that having the REEs solubilized in nitrate media may reduce the expenses associated with a solvent extraction circuit. The solvent extraction circuit 726 may include the steps of solvent extraction 728 and solvent stripping 730 with a stripping solvent 732. Because the thorium depleted solution 706 described herein is of extremely high purity, the solvent extraction circuit 726 may advantageously be operated at a reduced capital expense and reduced operating expense. The resulting products are very high purity and high value REEs 734.

As is noted above, the thorium depleted solution 706 may include substantial quantities of highly salable ammonium nitrate. Thus, an ammonium nitrate removal step 736 may be utilized to continuously or intermittently remove ammonium nitrate 738 from the solution 706. As illustrated in FIG. 7, the ammonium nitrate is removed after the solvent extraction circuit 726, as the presence of ammonium nitrate in the thorium depleted solution 706 is not believed to impair the efficacy of the solvent extraction circuit 726. However, it will be appreciated that the ammonium nitrate separation step may also occur before the solvent extraction circuit 726 if desired.

The ammonium nitrate separation step 736 may include cooling the thorium depleted solution to a reduced temperature (e.g., below about 10° C.) to crystallize ammonium nitrate 738. Because ammonium nitrate 738 is highly soluble in acid, it may only be necessary to intermittently operate the separation step 736 to remove ammonium nitrate 738. Ammonium nitrate is valuable and salable by-product that is widely used in the fertilizer industry and may represent a significant source of revenue from the process.

As illustrated in FIG. 7, after separation of the ammonium nitrate 738 (intermittently or continuously), the nitric acid 740 (e.g., recycled nitric acid) may be recycled back to the process, e.g., back to the acid digestion step 722. Thus, the acid (e.g., input at 720) may be contained in an essentially "closed loop" within the process. Additional nitric acid may be generated during the solvent extraction circuit due to cationic ion exchange releasing protons into solution. In this regard, a substantial quantity of the nitric acid required for the acid digestion step may be provided by the recycled nitric acid 740, and only a small amount of fresh nitric acid 720 may be required for the process once steady state and continuous operations are achieved and maintained.

FIG. 7 illustrates the integration of a solvent extraction circuit for the extraction of high purity REEs as metals from the nitrate solution containing the REEs. In other embodiments, it may be advantageous to integrate the method(s) described herein for the precipitation of thorium from an acidic solution with a circuit for precipitating the REEs, e.g., as REE-oxides and/or REE-hydroxides.

Figure 8:
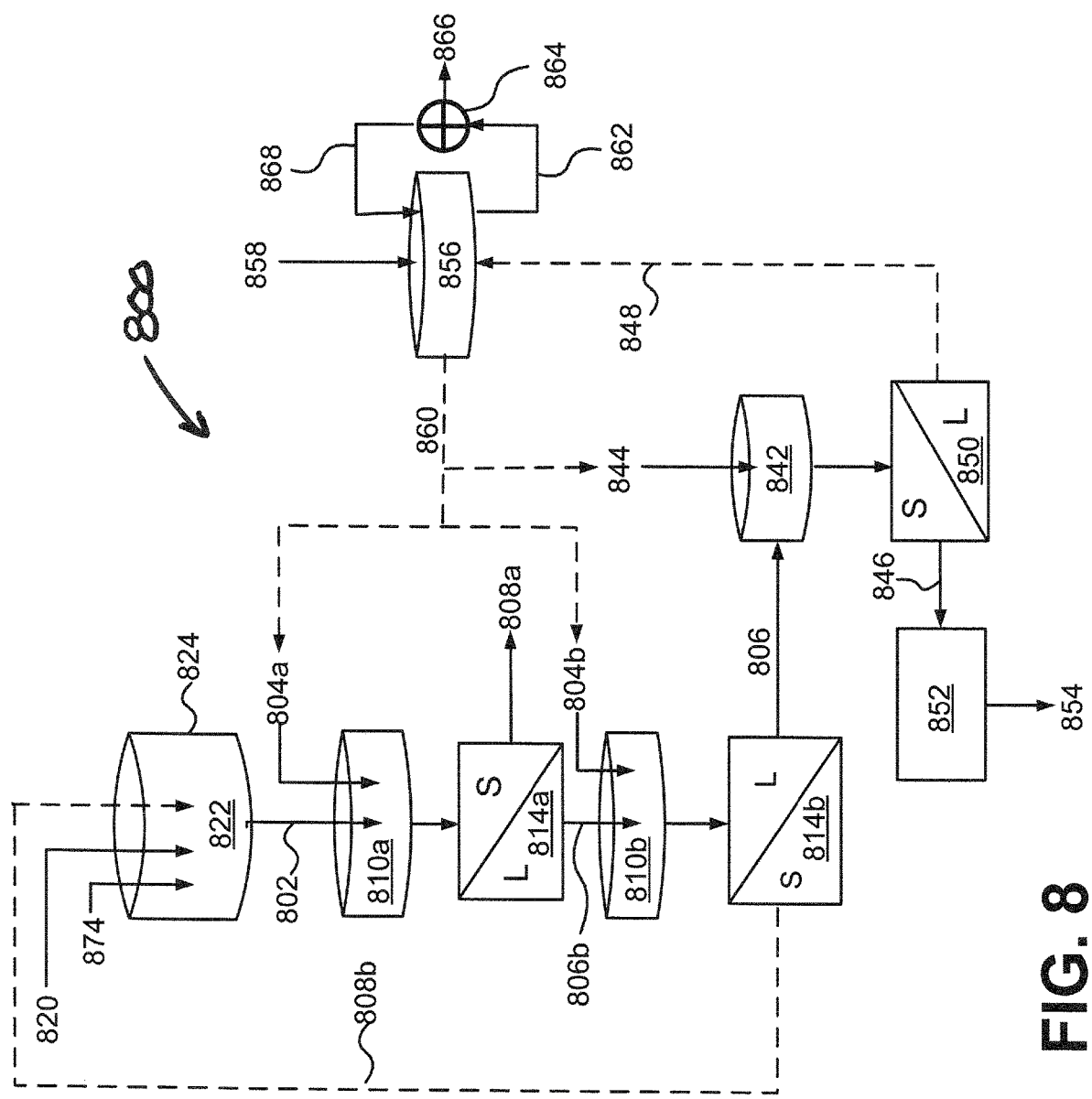
FIG. 8 is a schematic flowsheet illustrating a method for the precipitation of thorium as thorium hydroxide from an acidic solution including the precipitation of rare earth element hydroxides from a nitric acid solution.

In this regard, FIG. 8 illustrates an example of an integrated process similar to the process illustrated in FIG. 7, but where an REE precipitation circuit replaces the solvent extraction circuit of FIG. 7. Thus, the thorium depleted and REE-nitrate rich solution can be treated to precipitate high purity REE-compounds such as REE-oxides and/or REE-hydroxides which, for example, may be shipped to a separate facility for extraction of the REEs as metals.

Referring to FIG. 8, the thorium depleted solution 806 from the separation step 814b will typically have a pH in the range of about pH 3.6 to about pH 4 (e.g., about pH 3.8) and will be rich in RE-nitrates and may contain no, or extremely low levels of, thorium and/or uranium. For example, the thorium depleted solution 806 may include not greater than about 1 ppm thorium and/or uranium. As illustrated in FIG. 8, this solution 806 is conveyed to an REE precipitation step 842, where the solution 806 is contacted with an REE precipitation agent 844. In one characterization, ammonium hydroxide is used for precipitation in both the precipitation step 844 to precipitate REEs and in the hydroxylation step(s) 810a/810b to precipitate thorium. The REE precipitation agent 844 (e.g., a hydroxide ion source) may be added to the solution 806 in sufficient quantities to increase the pH of the solution, such as by increasing the pH to at least about pH 8, such at least about pH 9. At these pH levels, the REEs will precipitate from the solution 806 as REE-hydroxides 846, which may be separated from an REE-depleted nitrate solution 848 in a separation step 850.

The RE-hydroxides 846 may then be converted from the RE-hydroxides to RE-oxides. As illustrated in FIG. 8, the RE-hydroxides 846 are conveyed to a drying step 852 where the RE-hydroxides are heated to a drying temperature that is sufficient to convert a substantial majority of the RE-hydroxides 846 to RE-oxides 854. For example, the drying step 852 may include heating the RE-hydroxides 846 to a temperature of at least about 100° C., such as at least about 120° C., and not greater than about 160° C., such as not greater than about 150° C. In one example, the RE-hydroxides 846 are conveyed to a screw feed dryer for the substantially continuous production of the RE-oxides 854. In another example, the RE-hydroxides 846 may be stockpiled as necessary and dried.

It is an advantage of this embodiment that the resulting RE-oxide product 854 will have a very high purity, particularly with respect to base metals and radioactive metals such as uranium and thorium. In one example, the RE-oxide product 854 has a REE purity of at least about 99.8% on a metals basis, i.e., the RE-oxide product 854 comprises at least about 99.8% RE-oxides, such as a purity of at least about 99.9% RE-oxides. For example, the RE-oxide product 854 may comprise not greater than about 1 ppm thorium. The uranium content may be not greater than 0.1 ppm, for example, such a not greater than about 0.01 ppm.

An REE-depleted nitrate solution 848 may also recovered from the separation step 858, and may have a high content of ammonium nitrate, such as from about 30 g/l to about 50 g/l ammonium nitrate. The solution 848 may be recycled to preserve nitrates and in particular to preserve ammonium in the process. As illustrated in FIG. 8, the REE-depleted nitrate solution 848 may be conveyed to a vessel 856 where ammonium hydroxide is stored for use in the process, i.e., where the recycled nitrate solution 848 is added to fresh ammonium hydroxide 858. An ammonium hydroxide product 860 such as an ammonium hydroxide solution may then be conveyed as needed to the process, e.g., to hydroxylation steps 810a/810b and/or to REE precipitation step 842. Because the recycled REE-depleted nitrate solution will contain ammonium nitrates, it may be desirable to remove the ammonium nitrates from the ammonium hydroxide vessel 856 on a continuous or intermittent basis. In this regard, a portion 862 of the solution contained within vessel 856 may be periodically bled off from the vessel 856 and subjected to an ammonium nitrate precipitation step 864 to crystallize an ammonium nitrate by-product 866 and recycle an ammonium nitrate depleted solution 868 back to the vessel 856. The ammonium nitrate by-product 866 will be of high purity and a valuable by-product of the process.

While one example for the precipitation of REE compounds from the thorium depleted solution have been described in detail, it will appreciated that other methods may be applied. For example, in some examples, it may be desirable to directly precipitate the REEs as REE-nitrates from the thorium depleted solution.

As is noted above, the thorium-containing acidic solution 802 may contain REEs in addition to thorium, and may be formed by the dissolution of a variety of compounds in an acid (e.g., dissolution by acid digestion). In some of the embodiments disclosed herein, and as is disclosed above, it is desirable that the REEs are in the form of RE-oxalates, e.g., $RE_2(C_2O_4)_3$ or $RE_3(C_2O_4)_3$. Further, the acidic solution 802 may be formed by the dissolution of carbonate compounds, such as $RE_2(CO)_3 \cdot xH_2O$, formed from RE-oxalates by a metathesis reaction to render the REEs soluble in an acid such as nitric acid, as is disclosed above. In addition, the RE-oxalates and/or the RE-carbonates may be converted to RE-oxides, e.g., by heating (calcining) at an elevated temperature in the presence of an oxidizing gas such as air.

As is disclosed above, many REE-containing ores include a relatively high concentration of cerium (Ce) as compared to other REEs. For example, in some RE-ore bodies cerium may comprise close to 50 wt. % of the total REEs on a metals basis. However, cerium has a lower value than many other REEs and it may be advantageous to separate the cerium from the other REEs, for example to reduce the size of the subsequent solvent extraction circuit and produce an REE-containing end product that has a higher value.

In this regard, one embodiment of the present disclosure is directed to the extraction of cerium from a Ce-containing product. The cerium may be extracted from the Ce-containing product by leaching the Ce-containing product in nitric acid ($HNO_3$) to dissolve (e.g., solubilize) at least a portion (e.g., at least a majority) of the Ce-containing product to form a cerium-containing acidic solution. The cerium-containing acidic solution may then be contacted with a hydroxide precipitant, e.g. ammonium hydroxide ($NH_4OH$), to precipitate at least a portion of the cerium as cerium (IV) hydroxide (e.g., $Ce(OH)_4$) and form a Ce-depleted solution and a Ce-hydroxide product. The cerium-depleted solution, which may contain high levels of valuable non-cerium REEs, may be separated from the Ce-hydroxide product. In some embodiments, the selectivity of the cerium precipitation may be enhanced by the use of a further precipitation step on the Ce-depleted solution step to further reduce the cerium concentration in the Ce-depleted solution.

Figure 9:
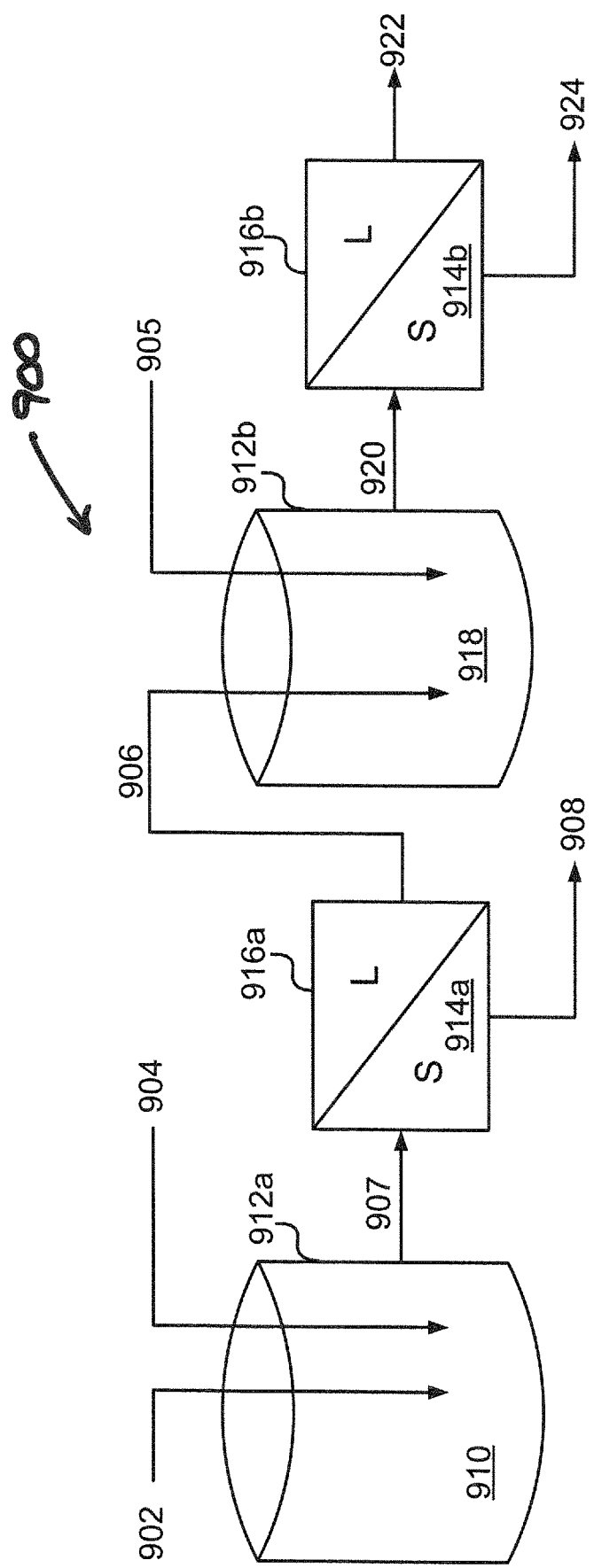
FIG. 9 is a schematic flowsheet illustrating a method for the extraction of cerium as cerium hydroxide from a cerium-containing acidic solution that includes a cerium species.

By way of example, FIG. 9 schematically illustrates a method for the extraction of cerium as cerium hydroxide ($Ce(OH)_4$) from a cerium-containing acidic solution that includes a cerium species. Referring to FIG. 9, a Ce-containing product 902 is contacted with an acid solution 904 (e.g., nitric acid) in a leaching step 910 that may be carried out in a reactor vessel 912a. The Ce-containing product 902 may be any product (e.g., a particulate solid product) that contains a cerium compound. The Ce-containing product 902 may also comprise other REEs whose subsequent recovery is desirable. For example, the Ce-containing product 902 may be derived from an ore (e.g., from an ore concentrate) that includes cerium and at least one other REE. Often, the Ce-containing product 902 will comprise other REEs of relatively high value, e.g., CREEs such as dysprosium, europium, terbium, lanthanum, neodymium, praseodymium and yttrium. The Ce-containing product 902 may be a product resulting from the processing of an ore concentrate to produce rare earth compounds, such as a rare earth oxide product, a rare earth oxalate product, a rare earth carbonate product, or other rare earth compound(s) that are amenable to dissolution in an acid such as nitric acid. In one particular characterization, the Ce-containing product 902 comprises RE-oxalates and/or RE-oxides including cerium and non-Ce REEs. According to this embodiment, it is desirable to have the cerium in the Ce-containing product 902 in the $Ce^{4+}$ oxidation state. In one example, at least about 90% of the cerium in the Ce-containing product 902 is in the $Ce^{4+}$ oxidation state, such as where at least about 95% of the cerium, at least about 98% of the cerium, at least about 99% of the cerium or even at least about 99.5% of the cerium is in the $Ce^{4+}$ oxidation state. In one particular embodiment, the Ce-containing product 902 is an RE-oxide product comprising cerium oxide. For example, the RE-oxide product may be formed by calcining (e.g., roasting) a cerium-containing oxide precursor (e.g., RE-carbonates and/or RE-oxalates) at a temperature and under conditions to form RE-oxides and convert a majority (e.g., substantially all) of the cerium to $Ce^{4+}$ (e.g., as $CeO_2$). In one example, RE-oxides are formed by calcining the cerium-containing oxide precursor at a temperature of at least about 700° C., such as at least about 710° C. to convert and/or maintain substantially all of the cerium as $Ce^{4+}$.

The Ce-containing product 902 may or may not comprise thorium. In this regard, the Ce-containing product may have been previously treated to remove thorium, such as by using the methods described above with respect to FIGS. 5-8. Alternatively, the thorium may be precipitated before or may be co-precipitated with the cerium.

In one particular characterization, the Ce-containing product 902 is dispersed in an aqueous medium (e.g., water) to form a pulp (e.g., a slurry) of solid REE compounds (e.g., RE-oxalate and/or RE-oxide compounds), such as an aqueous pulp comprising at least about 20 wt. % solids and not greater than about 50 wt. % solids. Thus, a solid Ce-containing product (e.g., comprising solid particulate oxalate or oxide compounds) may be mixed with water to form the pulp, for example before leaching with a nitric acid solution 904.

The nitric acid solution 904 is contacted with the Ce-containing product 902 for a period of time sufficient to dissolve (e.g., solubilize) at least a portion of the Ce-containing product 902, such as for a period of time to dissolve a majority of the Ce-containing product 902. In one characterization, at least about 95% of the Ce-containing product 902 is dissolved in the nitric acid solution 904 during the leaching step 910. The leaching step 910 may be carried out at ambient temperature, although elevated temperatures such as in the range of at least about 80° C. and not greater than about 90° C. may be useful. Although slight overpressures may be used if desired, the leaching step 910 may be carried out at ambient pressure, e.g., of about 1 atm. During the leaching step 1110, it is desirable for the nitric acid solution 904 to dissolve the Ce-containing product and to maintain a majority of the cerium from the Ce-containing product 902 in the $Ce^{4+}$ oxidation state. To facilitate dissolving and maintaining the cerium in the $Ce^{4+}$ oxidation state, the nitric acid solution 904 may be selected to be of relatively high strength. For example, upon dissolution of the cerium from the Ce-containing product 902, the strength of the nitric acid solution 904 should be sufficient to provide a sufficient quantity of protons ($H^+$) in the solution 904 to maintain a majority of the cerium in the $Ce^{4+}$ oxidation state, such as at least about 95% of the cerium in the $Ce^{4+}$ oxidation state. According to this embodiment, it is desirable to maintain the cerium in the $Ce^{4+}$ oxidation state, and although weaker acids may be able to dissolve the Ce-containing product 902, the dissolved cerium may form in the $Ce^{3+}$ oxidation state if the acid strength is not sufficiently high. For example, the nitric acid solution 904 may comprise at least about 65 wt. % $HNO_3$, such as at least about 68 wt. % $HNO_3$ or even at least about 70 wt. % $HNO_3$. Characterized another way, at least about 1.9 grams of $HNO_3$ may be added to the leaching step per gram of solid Ce-containing product (1.9 g $HNO_3$/g Ce-product). In another characterization, not greater than about 2.4 g $HNO_3$/g Ce-product may be added to the leaching step 910. Characterized yet another way, the nitric acid liquor 906 may have a free acid content of at least about 18% and not greater than about 21% upon completion of the leaching step 910.

The leaching step 910 will result in a leach product 907 comprising solids residue 908 and a cerium-containing acidic solution 906 that can be separated from the solids residue 908 (e.g., undissolved matter) in a separating step 914a, such as by using a filter 916a. The solids residue 908 may be disposed as waste, or may be subjected to further treatment if valuable products (e.g., non-REEs) are contained in the solids residue 908.

The cerium-containing acidic solution 906 is then conveyed to a reactor 912b where the cerium-containing acidic solution 906 is contacted with ammonium hydroxide 905 to precipitate at least a portion of the cerium as cerium hydroxide and form a precipitation stream 907b comprising a cerium depleted solution 922 and a cerium hydroxide product 924.

The precipitation step 918 (e.g., contacting the cerium-containing acidic solution 906 with ammonium hydroxide 905) may advantageously be carried out at ambient temperature and pressure, although elevated temperatures and/or pressures may be employed if desired. As is noted above, the cerium-containing acidic solution 906 coming into the reactor 912b may have a relatively high free acid content (e.g., at least about 18% free acid) to maintain the cerium as $Ce^{4+}$. As the cerium-containing acidic solution 906 is contacted with the ammonium hydroxide 905, the $Ce^{4+}$ will begin to form a cerium (IV) ammonium nitrate complex that stabilizes the cerium in the $Ce^{4+}$ state. Once the complex forms, and more ammonium hydroxide is added, the pH of the cerium-containing acidic solution 906 will increase. As the pH increases to about pH 3.5 or higher, the cerium (IV) ammonium nitrate complex will break down and the $Ce^{4+}$ will begin to precipitate as cerium (IV) hydroxide, i.e., as $Ce(OH)_4$ and/or as highly insoluble cerium tetrahydroxide hydrate, i.e., $Ce(OH)_4 \cdot xH_2O$. However, a vast majority of the non-Ce REEs will advantageously remain dissolved in the cerium-containing acidic solution 906, thereby separating a majority of the cerium from the other REEs.

The ammonium hydroxide 905 may be added to raise the pH of the cerium-containing acidic solution 906 in the reactor 912b to a pH of at least about pH 3.5, such as at least about pH 4.0, at least about pH 4.5, or even at least about pH 5.0. Typically, the pH should not exceed about pH 6.0. In this manner, and in one example, a majority of the cerium originally contained in the cerium-containing acidic solution 906 may precipitate as Ce-hydroxide. The ammonium hydroxide 905 may be added as a solution to the cerium-containing acidic solution 906, e.g., as a solution having a strength of at least about 2.5M. In another characterization, the mass ratio of ammonium hydroxide 905 to cerium-containing acidic solution 906 in the reactor 912b may be at least about 0.065 and may be not greater than about 0.087.

In one characterization, at least about 61% of the cerium originally in the cerium-containing acidic solution 906 will precipitate as Ce-hydroxide in the Ce-hydroxide product 924, such as at least about 70% or even at least about 85% precipitating as Ce-hydroxide. Further, it is an advantage that the Ce-hydroxide product 924 comprises relatively low concentrations of non-Ce REEs (e.g., as RE-hydroxides) and that a vast majority of the non-Ce REEs remain solubilized in the Ce-depleted solution 922. In this regard, the Ce-hydroxide product 924 may comprise not greater than about 8 at. % of non-Ce REEs on a metals basis, such as not greater than about 4 at. % of non-Ce REEs on a metals basis. In another characterization, at least about 90 at. % of the non-Ce REEs from the cerium-containing acidic solution 906 may remain solubilized in the Ce-depleted solution 922, such as at least about 96 at. %. Nonetheless, it may be desirable to recover additional REEs of high value, such as Nd, from the Ce-hydroxide product 924, such as by subjecting the Ce-hydroxide product 924 to solvent extraction (discussed below).

Although a majority of the cerium may be extracted from the Ce-containing product 902 in the Ce-hydroxide product 924, it may be desirable to increase the recovery of cerium and form an even purer (i.e., lower cerium concentration) Ce-depleted solution 922 by conducting a two-step process for cerium precipitation. As is illustrated in FIG. 10, the step of contacting the cerium-containing acidic solution with ammonium hydroxide to precipitate cerium may include first contacting the cerium-containing acidic solution with ammonium hydroxide to raise the pH to a first pH to precipitate cerium as cerium hydroxide and form an intermediate cerium depleted solution and a first cerium hydroxide product, and second contacting the intermediate cerium depleted solution with the ammonium hydroxide to raise the pH to a second pH, wherein the second pH is greater than the first pH, to precipitate additional solubilized cerium as cerium hydroxide and form the cerium depleted solution and a second cerium hydroxide product.

Figure 10:
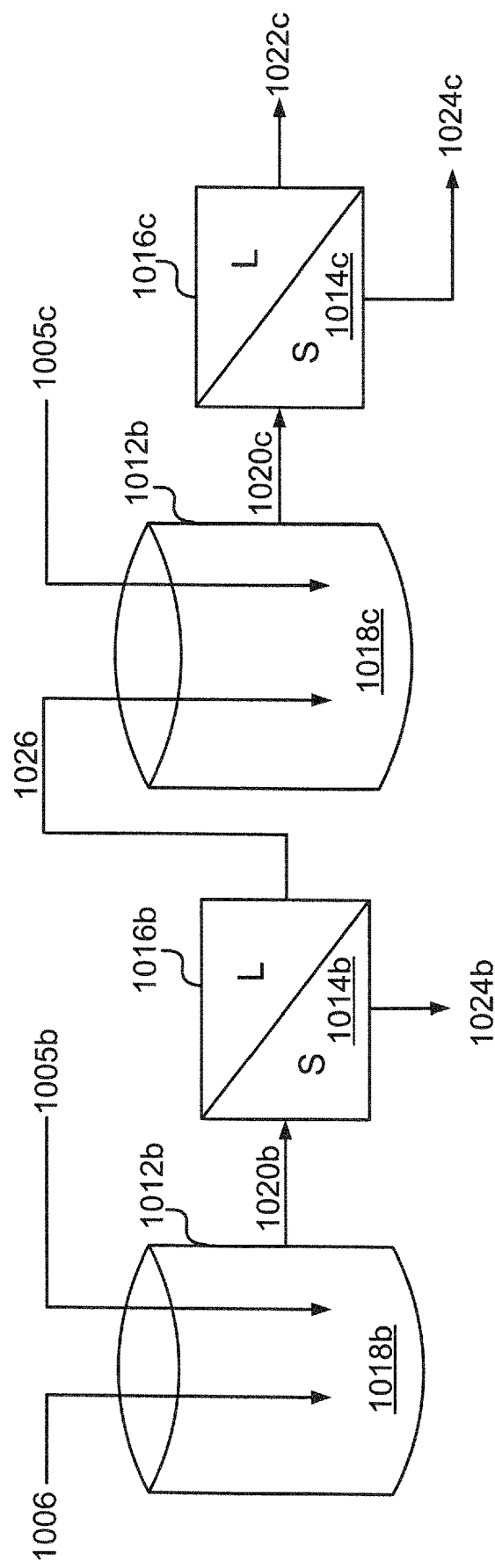
FIG. 10 is a schematic flowsheet illustrating a method for the extraction of cerium as cerium hydroxide from a cerium-containing acidic solution using multiple hydroxylation steps.

Referring to FIG. 10, such a two-stage precipitation process is schematically illustrated. A cerium-containing acidic solution 1006 comprising dissolved cerium, and possibly appreciable quantities of other REEs, is contacted with ammonium hydroxide 1005b in a reactor 1012b in a first contacting step 1018b. A first precipitation product 1020b is removed from the reactor 1012b and may be subjected to a separation step 1014b, e.g., using a filter 1016b. A Ce-hydroxide product 1024b is separated from an intermediate Ce-depleted solution 1026. The Ce-depleted solution 1026 may then be contacted with additional ammonium hydroxide 1005c in a second contacting step 1018c, such as in a second reactor 1012c. After the precipitation of additional cerium from the intermediate Ce-depleted solution 1026, a second precipitation product 1020c may be recovered and separated 1014c into a final Ce-depleted solution 1022c and a second Ce-hydroxide product 1024c.

In accordance with the embodiment illustrated in FIG. 10, the second pH (e.g., in reactor 1016c) is higher than the first pH (e.g., in reactor 1016b). In one example, sufficient ammonium hydroxide 1005b is added to the first reactor 1012b to raise the pH of the cerium-containing acidic solution to at least about pH 3.5, such as at least about pH 4, and not greater than about pH 4.5. In the second precipitation step 1018c, sufficient ammonium hydroxide 1005c is added to the reactor 1018c to further increase the pH of the intermediate cerium-depleted solution to at least about pH 5, such as at least about pH 5.5, and not greater than about pH 6.

As is noted above, the Ce-containing product may also include appreciable amounts of thorium. For example, in some characterizations, the cerium-containing acidic solution may include at least about 50 mg/l thorium, such as at least about 100 mg/l thorium, and not greater than about 2000 mg/l thorium, such as not greater than about 1600 mg/l thorium. In any event, in some embodiments, the precipitation process for the precipitation of cerium may also co-precipitate the thorium such that at least about 98%, at least about 99%, at least about 99.5%, at least about 99.98% or even at least about 99.999% of the thorium in the cerium-containing acidic solution is removed with the Ce-hydroxide product, e.g., as thorium hydroxide. Thus, the cerium depleted solution may comprise not greater than about 0.01 at. % thorium, such as not greater than about 0.002 at. % thorium.

Thus, when the cerium-containing acidic solution comprises thorium, the thorium may precipitate with the cerium (IV) hydroxide as thorium hydroxide. The thorium hydroxide may then be optionally separated from the cerium (IV) hydroxide in the manner noted above (e.g., as illustrated in FIGS. 5 and 6) for the selective precipitation of thorium hydroxide. That is, the Ce-containing product may be redissolved into acid under conditions that a majority of the cerium exists in the $Ce^{3+}$ oxidation state such that cerium will not co-precipitate with thorium—the cerium and any traces of other REEs will remain in solution.

The following embodiments of the present disclosure relates to a method for the selective separation of REEs from a product containing a plurality of REEs, which may also contain other elements such as thorium (Th) and uranium (U). The REE-containing product may be a solution and/or a solid containing the REEs, where the product is derived from naturally occurring minerals by chemical processing of the minerals to separate the valuable elements from the ore, e.g., as is disclosed in detail above.

Before separation of valuable REEs from the REE-containing product, the REE-containing product may be treated to partially or completely remove thorium and/or cerium from the REE-containing product. Some methods for the selective extraction of thorium and/or cerium are described above. In some characterizations, the REE-containing product may also include uranium, and the uranium may also be completely or partially removed with the thorium and/or cerium. In accordance with the following embodiments, thorium and/or cerium removal may be carried out by selective precipitation and/or by solvent extraction to increase the purity of the REE-containing product with respect to non-Ce REEs, thorium and possibly uranium.

The processes for thorium and/or cerium removal may be initiated from a rare earth oxide (RE-oxide) product. When the RE-oxide product comprises thorium it has been found to be advantageous if substantially all of the thorium in the RE-oxide product is present as Th(IV), i.e., in the $Th^{4+}$ oxidation state. As is discussed in more detail below, starting with the thorium in the $Th^{4+}$ oxidation state in the RE-oxide product and in the REE-containing acidic solution will facilitate the selective extraction of the thorium from the REEs and other elements in the REE-containing acidic solution. One method to ensure that a substantial proportion (e.g., greater than 99%) of the thorium in the RE-oxide product is in the 4+ oxidation state is to calcine the RE-oxide product at an elevated temperature. In one characterization, the RE-oxide product is calcined at a temperature of at least about 710° C., such as at least about 750° C., e.g., in an oxidizing environment such as in air. For example, an RE-oxalate powder or an RE-carbonate powder can be calcined under these conditions to form the RE-oxide product. It is believed that these temperatures in combination with an oxygen-containing gas (e.g., air) will be sufficient to ensure substantially complete conversion of the thorium to the Th(IV) oxidation state in the solid state.

To sustain this high oxidation state achieved in the solid state for thorium, the calcined RE-oxide product may advantageously be dissolved in a stabilizing acidic solution having sufficient excess protons (H+) and nitrates ($NO_3^-$), but with less reducing ions such as $OH^-$.

Figure 11:
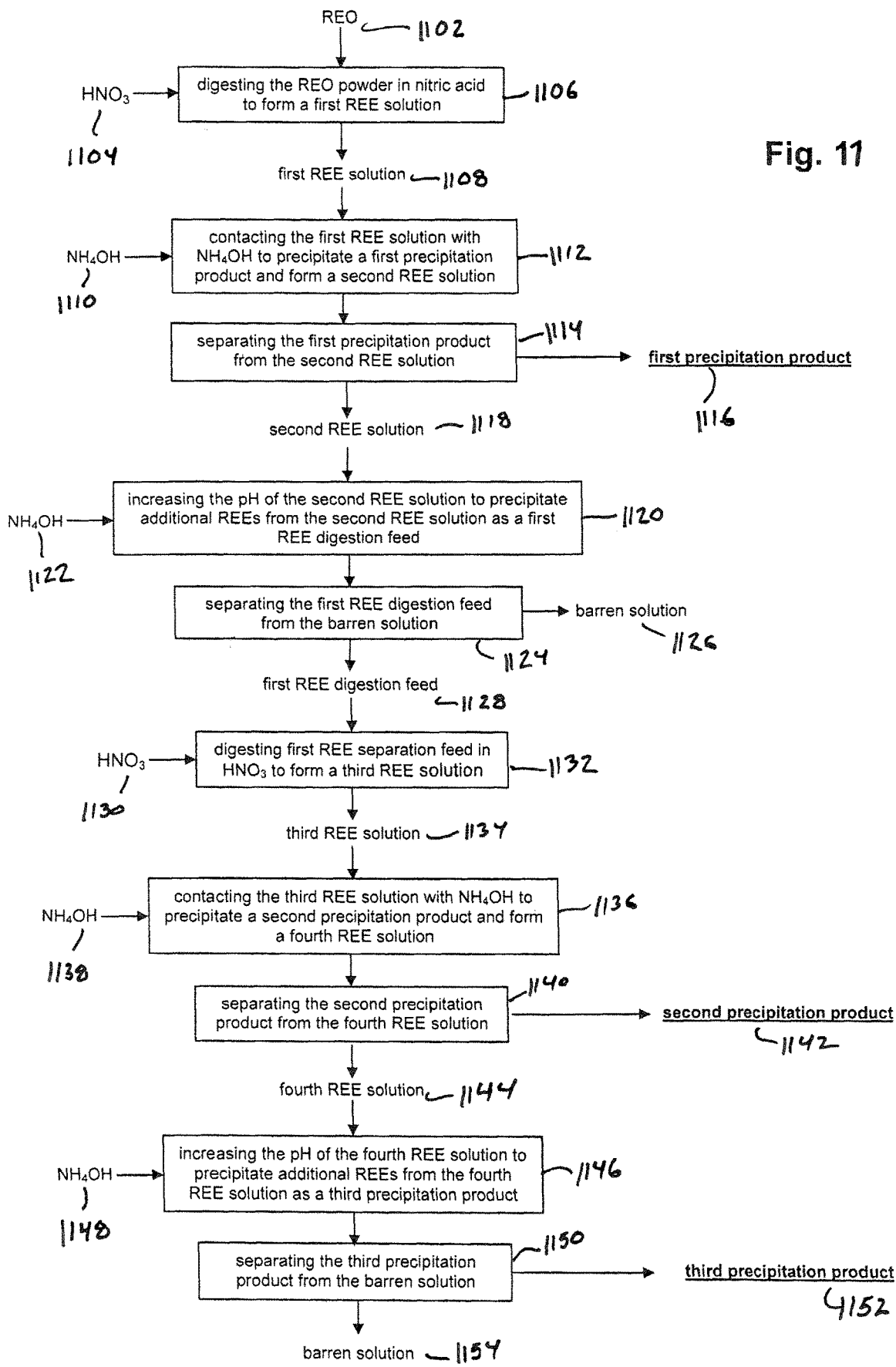
FIG. 11 is a schematic flowsheet illustrating a method for the chemical separation of rare earth elements and thorium from a rare earth element product.

Thus, referring to FIG. 11, the REE-containing product may be a RE-oxide product 1102, e.g., that is predominately comprised of rare earth oxide compounds. The RE-oxide product 1102 is digested 1106 in an acid, for example nitric acid 1104 ($H^+$, $NO_3^-$), to form a first REE solution 1108 comprising solubilized REEs. The RE-oxide product 1102 may be of relatively high purity with respect to REEs. In one example, the RE-oxide product 1102 comprises at least about 90% REEs, such at least about 95% REEs or even at least about 98% REEs on a metals basis. The methods disclosed above are capable of producing an RE-oxide product 1102 of such high purity. For example, the RE-oxide product 1102 may be contacted with a 70% solution of $HNO_3$ to digest all or substantially all of the REEs in the RE-oxide product 1102 (e.g., digest at least about 95% of the REEs) and form a (first) acidic REE solution 1108 comprising dissolved (solubilized) REEs. In one characterization, at least about 98% of the REEs in the RE-oxide product 1102 are digested by the nitric acid. The resulting REE acidic solution 1108 may include REEs in a concentration of at least about 10 grams per liter (g/l). In certain characterizations, the REE acidic solution 1108 includes a relatively high concentration of REEs, such as at least about 15 g/l REEs, at least about 20 g/l REEs, at least about 30 g/l or even at least about 50 g/l REEs, where the REEs are solubilized in the REE-containing acidic solution 1108. Typically, the REE-containing acidic solution 1108 will include not greater than about 100 g/l REEs. Further, the REE-containing acidic solution 1108 may have, for example, a relatively high acid concentration of at least about 18% $HNO_3$ (i.e., at least about 4.5M), or even at least about 22% $HNO_3$ (i.e., at least about 6M). It may be desirable to add a sufficient amount of acid to the REE-containing acidic solution 1108 to ensure such high levels of acidity, e.g., by adding additional acid beyond the amount that is stoichiometrically required to digest all of the RE-oxide product 1102.

Thus, the RE-oxide product 1102 may contain thorium and in one example the RE-oxide product 1102 comprises at least about 0.5% thorium, such as at least about 1% thorium, and not greater than about 5% thorium, such as not greater than about 3% thorium on a metals basis.

With respect to cerium, and merely by way of example, the RE-oxide product 1102 may contain a significant proportion of cerium. For example, the RE-oxide product 1102 may contain at least about 35% cerium, at least about 40% cerium, or even at least about 50% cerium on a metals basis.

Importantly, the RE-oxide product 1102 may comprise a plurality of CREEs. For example, the RE-oxide product 1102 may comprise at least about 15 at. % CREEs such as at least about 20 at. % CREEs or even at least about 25 at. % CREEs on a metals basis. Among these, the RE-oxide product 1102 may comprise at least about 15 at. % combined Pr and Nd, such as at least about 22 at. % combined Pr and Nd.

The RE-oxide product 1102 may also contain some HREEs. By way of example, the RE-oxide product 1102 may contain at least about 0.1 at. % HREEs and not greater than about 1 at. % HREEs on a metals basis.

Further, the RE-oxide product 1102 may also comprise LREEs. For example, the RE-oxide product 1102 may comprise at least about 85 at. % LREEs, such as at least about 90 at. % LREEs, and typically not greater than about 95 at. % LREEs on a metals basis. The majority of the LREEs will typically be cerium. Among the other LREEs, the RE-oxide product 1102 may contain at least about 10% La, such as at least about 18% La, and typically may contain not greater than about 30% La. Further, the RE-oxide product 1102 may also contain gadolinium (Gd)—a HREE, and in one example contains at least about 3% of combined Gd and Sm.

The RE-oxide product 1102 may contain other metallic elements; however it is generally desirable that other metallic elements in the RE-oxide product be present in very low concentrations. For example, it is desirable that the RE-oxide product 1102 contain no greater than about 0.05 at. % base metals on a metals basis, such as not greater than about 0.02 at. % base metals, e.g., no detectable concentrations of base metals. Non-metallic trace elements in the RE-oxide product 1102 may include silica ($SiO_2$) and unburnt carbon (C), e.g., from the rare earth oxalate powder in a kiln.

It will be recognized by those skilled in the art that the foregoing description of the constituents of the RE-oxide product 1102 are merely by way of example, and the methods described herein are not limited to any specific REE-containing product.

Referring back to FIG. 11, the RE-oxide product 1102 is digested in an acid, such as nitric acid 1104. For example, the RE-oxide product 1102 may be contacted with a 70% solution of $HNO_3$ to digest all or substantially all of the REE's in the RE-oxide product 1102 (e.g., at least about 95% of the REEs) and form a first REE solution 1108. In one characterization, at least about 98% of the REEs in the RE-oxide product 1102 are digested by the nitric acid. The resulting REE solution 1108 may include REEs in a concentration of at least about 10 g/l. In certain characterizations, the REE solution 1108 includes a relatively high concentration of REEs, such as at least about 15 g/l REEs, at least about 20 g/l REEs, at least about 30 g/l or even at least about 50 g/l REEs, where the REEs are solubilized (e.g., dissolved) into the REE solution 1108. Typically, the REE solution 1108 will include not greater than about 100 g/l REEs. Further, the REE solution 1108 may have, for example, a relatively high acid concentration of at least about 18% $HNO_3$ (i.e., at least about 4.5M), or even at least about 22% $HNO_3$ (i.e., at least about 6M). It may be desirable to add a sufficient amount of acid to the RE-oxide product 1102 to ensure such high levels of acidity, e.g., by adding additional acid beyond the amount that is stoichiometrically required to digest all of the RE-oxide product 1102. While not wishing to be bound by any particular theory, it is believed that such high acidity levels will assist to maintain the +4 oxidation state of cerium and thorium species in the REE solution 1108, and that this oxidation state facilitates the complexation and subsequent removal of cerium and thorium from REE solutions by chemical precipitation.

The first REE solution 1108 is then contacted with a compound to increase the pH of the first REE solution 1108. Particularly, the REE solution 1108 is contacted 1112 with a hydroxide ion source such as ammonium hydroxide ($NH_4OH$) 1110 to precipitate a first precipitation product 1116 and form a second REE solution 1118. A sufficient amount of $NH_4OH$ 1110 is contacted with the first REE solution 1108 to raise the pH of the first REE solution 1108 to a sufficient level to selectively precipitate thorium and cerium from the first REE solution 1108. For example, a quantity of an aqueous solution of $NH_4OH$ (e.g., 58% $NH_4OH$ in water) may be added to the first REE solution 1108 until the pH increases to a point that appreciable quantities of thorium and/or cerium precipitate from the first REE solution 1108 as Th-hydroxide and/or Ce-hydroxide. In one characterization, a sufficient amount of $NH_4OH$ 1110 is added to the first REE solution 1108 to increase the pH to at least about pH 4, such as at least about pH 4.2, at least about pH 4.4, or even at least about pH 4.6. In one particular characterization, a sufficient amount of $NH_4OH$ is added to the first REE solution 1108 to increase the pH to about pH 4.8. However, it is desirable to not increase the pH to a point where appreciable quantities of CREEs also precipitate from the first REE solution 1108. As such, in one example, the addition of $NH_4OH$ 1110 to the first REE solution 1108 does not increase the pH to above about pH 5.5, such as to not greater than about pH 5.0. In one particular characterization, a sufficient amount of $NH_4OH$ 1110 is added to the first REE solution 1108 to increase the pH to within the range of about pH 4.2 to about pH 5.0. Within the foregoing pH ranges, certain elements (e.g., Ce and Th) will selectively report to the first precipitation product 1116 relative to other elements (REEs) from the RE-oxide product 1102.

The first precipitation product 1116 is then separated 1114 from a second REE solution 1118, e.g., using a filter. It has been found that the first precipitation product 1116 will advantageously have a relatively low mass as compared to the mass of the RE-oxide product 1102. In one example, the mass of the first precipitation product 1116 will be not greater than about 40% of the mass of the RE-oxide product 1102, such as not greater than about 30%, not greater than about 20% or even not greater than about 15% of the mass of the RE-oxide product 1102. Stated another way, not greater than about 30% of the metallic elements from the RE-oxide product 1102 will report to (i.e., will precipitate in) the first precipitation product 1116, such as not greater than about 25%, not greater than about 20% or even not greater than about 15% of the metallic elements from the RE-oxide product 1102.

Despite having a relatively low mass as compared to the RE-oxide product 1102 that is input to the process, the first precipitation product 1116 may comprise a substantial amount of the thorium that is contained in the RE-oxide product 1102. In one example, the first precipitation product 1116 includes at least about 95% of the thorium from the RE-oxide product 1102, and in certain examples may include at least about 98% of the thorium from the RE-oxide product 1102, such as at least about 99% or event at least 99.5% of the thorium from the RE-oxide product 1102. It is of particular advantage that such a high level of the thorium from the RE-oxide product 1102 reports to a precipitation product having a low mass as compared to the mass of the RE-oxide product 1102. Thus, the first precipitation product 1116 may have a thorium content of at least about 8%, such as at least about 12% or even at least about 15%.

Although the first precipitation product 1116 may have even higher concentrations of thorium, typically the thorium content will not exceed about 25%.

The first precipitation product 1116 may also contain cerium that co-precipitates with the thorium during the contacting step 1112. For example, the first precipitation product may contain at least about 50% of the cerium from the RE-oxide product 1102, such as at least about 60% of the cerium from the RE-oxide product 1102. In another characterization the first precipitation product 1116 may contain at least about 50% cerium, such as at least about 60% cerium or even at least about 70% cerium. Typically, the first precipitation product will contain not greater than about 80% cerium.

As is noted above, the RE-oxide product 1102 may also contain CREEs, and the first precipitation product 1116 may contain some CREEs, i.e., a relatively small amount of CREEs may co-precipitate with the thorium and cerium during the contacting step 1112. For example, the first precipitation product 1116 may include not greater than about 15% of the CREEs from the RE-oxide product 1102, or even not greater than about 10%, such as not greater than about 8% of the CREEs from the RE-oxide product 1102. In another characterization, the first precipitation product 1116 may include not greater than about 20% CREEs, such as not greater than about 15% CREEs. Typically, the first precipitation product 1116 will contain at least about 1% CREEs, such as at least about 3% CREEs.

The RE-oxide product 1102 may also contain HREEs, and the first precipitation product 1116 may include some of these HREEs, i.e., a relatively small amount of HREEs may co-precipitate with the thorium and cerium during the contacting step 1112. For example, the first precipitation product 1102 may include at least about 25% of the HREEs from the RE-oxide product 1102, and may include not greater than about 40% of the HREEs from the RE-oxide product 1102. In another characterization, the first precipitation product 1116 may contain not greater than about 4% HREEs, such as not greater than about 3% HREEs. Typically, the first precipitation product 1116 will contain at least about 1% HREEs, such as at least about 1.5% HREEs.

The RE-oxide product 1102 may also contain LREEs, and the first precipitation product 1116 may include these LREEs, particularly cerium as is discussed above. For example, the first precipitation product 1116 may include at least about 8% of the LREEs from the RE-oxide product 1102, such as at least about 10%, and typically will include not greater than about 15% of the LREEs from the RE-oxide product 1102, such as not greater than about 12%. In another characterization, the first precipitation product 1116 may contain at least about 70% LREEs, such as at least about 75% LREEs. Typically, the first precipitation product 1116 will contain not greater than about 85% LREEs. Among the LREEs in addition to cerium, at least about 0.5% of the La and not greater than about 1.5% of the La from the RE-oxide product 1102 may precipitate with the first precipitation product 1116. In another characterization, the first precipitation product may contain at least about 0.8% and not greater than about 1.5% La.

Also, among the CREEs, Pr and Nd are of a particularly high value. Accordingly, it is an advantage that a relatively low proportion of the Pr and Nd report to the first precipitation product 1116. For example, not greater than about 8%, such as not greater than about 6% of the combined Pr and Nd from the RE-oxide product 1102 will typically precipitate with the first precipitation product 1116. Typically, at least about 3% of the combined Pr and Nd will precipitate with the first precipitation product 1116. In another characterization, the first precipitation product 1116 will typically include not greater than about 15% combined Pr and Nd, such as not greater than about 12% combined Pr and Nd, such as not greater than about 10% combined Pr and Nd. Typically, the first precipitation product 1116 will include at least about 5% combined Pr and Nd.

Further, Gd and Sm may be of particular value for many applications, and it is an advantage that a relatively small proportion of the Gd and Sm report to the first precipitation product 1116. For example, the first precipitation product 1116 may include not greater than about 15% of the combined Gd and Sm from the RE-oxide product 1102. Typically, the first precipitation product 1116 will include at least about 8% of the Gd and Sm from the RE-oxide product 1102. In another characterization, the first precipitation product 1116 will include not greater than about 0.5% combined Gd and Sm, such as not greater than about 0.1% or even not greater than about 0.05% combined Gd and Sm.

It will be appreciated that the foregoing ranges of elements in the RE-oxide product 1102 and the first precipitation product 1116 are provided by way of example only, and are intended to illustrate the general proportions of the different elements that precipitate in the first precipitation product 1116. The actual compositions will depend upon the mineral ore from which the RE-oxide product 1102 is derived, and the process conditions of the contacting step 1112 to precipitate the first precipitation product 1116.

After separation 1114 of the first precipitation product 1116 from the second REE solution 1118, the second REE solution 1118 includes the REEs and other elements that did not precipitate during the contacting step 1112. The pH of the second REE solution 1118 is increased 1120 by adding additional $NH_4OH$ 1122 to the second REE solution 1118. A sufficient amount of $NH_4OH$ 1122 should be added to the second REE solution precipitate substantially all (e.g., at least about 99.5%) of the metallic elements in the second REE solution 1120 as a first REE digestion feed 1128. For example, the first REE digestion feed 1128 may comprise solid hydroxide compounds of the metallic elements from the second REE solution 1118.

The first REE digestion feed 1128 is then separated from a barren solution 1126. The barren solution 1126 may be recycled to conserve $OH^-$ values in the circuit. After separation, the first REE digestion feed 1128 is digested 1132 in nitric acid 1130 to re-solubilize the metallic elements into a third REE solution 1134. A sufficient amount of acid 1130 should be contacted with the first REE digestion feed 1128 to digest (solubilize) substantially all (e.g., at least 99.5%) of the metallic elements in the first REE digestion feed 1128. The conditions of the digestion step 1132 may be similar to the digesting step 1106 described above. For example, the first REE digestion feed 1128 may be contacted with a 70% solution of $HNO_3$ to digest all or substantially all of the REEs in the first REE digestion feed 1128 and form a third REE solution 1134. The third REE solution 1134 may have, for example, a relatively high acid concentration of at least about 18% $HNO_3$ (i.e., at least about 5M), or even at least about 20% $HNO_3$ (i.e., at least about 8M). It may be desirable to add a sufficient amount of acid to the first REE digestion feed 1128 to ensure such high levels of acidity, e.g., by adding additional acid beyond the amount that is stoichiometrically required to digest all of the first REE digestion feed 1128.

The third REE solution 1134 is then contacted 1136 with additional $NH_4OH$ 1138 to precipitate a second precipitation product 1142 and form a fourth REE solution 1144. The conditions of the contacting step 1136 may be similar to the conditions described above with respect to the contacting step 1112. For example, a sufficient amount of $NH_4OH$ 1138 may be contacted with the third REE solution 1134 to raise the pH of the third REE solution 1134 to a sufficient level to selectively precipitate additional cerium and traces of thorium from the third REE solution 1134. For example, a quantity of an aqueous solution of $NH_4OH$ (e.g., 58% $NH_4OH$ in water) may be added to the third REE solution 1134 until the pH increases to a point that appreciable quantities of cerium precipitate from the third REE solution 1134, e.g., as Ce-hydroxide. In one characterization, a sufficient amount of $NH_4OH$ 1138 is added to the third REE solution 1134 to increase the pH to at least about pH 4, such as at least about pH 4.2, at least about pH 4.4, or even at least about pH 4.6. In one particular characterization, a sufficient amount of $NH_4OH$ is added to the third REE solution 1134 to increase the pH to about pH 4.8. However, it is desirable to not increase the pH to a point where appreciable quantities of CREEs also precipitate from the third REE solution 1134. As such, in one example, the addition of $NH_4OH$ to the third REE solution 1134 does not increase the pH to above about pH 5.5, such as to not greater than about pH 5.0. In one particular characterization, a sufficient amount of $NH_4OH$ 1138 is added to the third REE solution 1134 to increase the pH to within the range of about pH 4.2 to about pH 5.0. Within the foregoing pH ranges, certain elements (e.g., Ce) will selectively report to the second precipitation product 1142 relative to other elements.

The second precipitation product 1142 is then separated 1140 from a fourth REE solution 1144, e.g., using a filter. The second precipitation product 1142 may have a mass that is approximately 25% of the mass of the RE-oxide product 1102 that is input to circuit, and approximately twice the mass of the first precipitation product 1116. In one example, the mass of the second precipitation product 1142 will be not greater than about 40% of the mass of the RE-oxide product 1102, such as not greater than about 35%, or even not greater than about 30% of the mass of the RE-oxide product 1102. Stated another way, not greater than about 40% of the metallic elements from the RE-oxide product 1102 will report to (i.e., will precipitate in) the second precipitation product 1142, such as not greater than about 35%, or even not greater than about 30%. Typically, the mass of the second precipitation product 1142 will be at least about 15% of the mass of the RE-oxide product 1102, such as at least about 20%.

Although a significant amount of the thorium from the RE-oxide product 1102 will report to the first precipitation product 1116, some thorium may remain in the second REE solution 1118 and report to the second precipitation product 1142. In one example, the second precipitation product 1142 includes at least about 0.001% thorium and not greater than about 0.05% thorium, such as not greater than about 0.03% thorium. As such, all or substantially all of the thorium may advantageously report to either the first precipitation product 1116 or the second precipitation product 1142.

The second precipitation product 1142 may also include a substantial concentration of cerium. For example, the second precipitation product 1142 may comprise at least about 75% cerium, such as at least about 80% cerium or even at least about 85% cerium on a metals basis. Typically, the second precipitation product 1142 will include not greater than about 90% cerium. Thus, it can be seen that a significant portion of the cerium from the REO 102 may advantageously report to either the first precipitation product 1116 or the second precipitation product 1142. For example, at least about 70%, or even at least about 75% of the cerium from the RE-oxide product 1102 may report to either the first precipitation product 1116 or the second precipitation product 1142.

As is noted above, the RE-oxide product 1102 may also include CREEs, and it is an advantage that a majority of the CREEs may remain un-solubilized (i.e., remain in the fourth REE solution 1144). As such, the second precipitation product 1142 may include not greater than about 10% of the CREEs from the RE-oxide product 1102, or even not greater than about 8% of the CREEs from the RE-oxide product 1102. In another characterization, the second precipitation product 1142 may include not greater than about 15% CREEs, such as not greater than about 10% CREEs. Typically, the second precipitation product 1142 will include at least about 3% CREEs, such as at least about 5% CREEs.

The second precipitation product 1142 may include some HREEs, i.e., a relatively small amount of HREEs. For example, the second precipitation product 1142 may include at least about 15% of the HREEs from the RE-oxide product 1102, such as at least about 20% of the HREEs from the RE-oxide product 1102, and may include not greater than about 40% of the HREEs from the RE-oxide product 1102, such as not greater than about 30% of the HREEs from the RE-oxide product 1102. In another characterization, the second precipitation product 1142 may include not greater than about 2% HREEs, such as not greater than about 1% HREEs. Typically, the second precipitation product 1142 will include at least about 0.1% HREEs, such as at least about 0.5% HREEs.

The RE-oxide product 1102 may also include LREEs, and the second precipitation product 1142 may include a substantial amount of LREEs, particularly cerium. For example, the second precipitation product 1142 may include at least about 20% of the LREEs from the RE-oxide product 1102, such as at least about 22%, or even at least about 25%, and typically will include not greater than about 35% of the LREEs from the RE-oxide product 1102, such as not greater than about 30%. In another characterization, the second precipitation product 1142 may include at least about 90% LREEs, such as at least about 95% LREEs. Typically, the second precipitation product 1142 will include not greater than about 99% LREEs. Among the LREEs in addition to cerium, at least about 1% of the La and not greater than about 4% of the La from the RE-oxide product 1102, such as from about 2% to about 3% of the La from the RE-oxide product 1102, may precipitate with the second precipitation product 1142. In another characterization, the second precipitation product 1142 may include at least about 2% and not greater than about 3% La.

Also, among the CREEs, Pr and Nd are of a particularly high value. Accordingly, it is an advantage that a relatively low proportion of the Pr and Nd report to the second precipitation product 1142. For example, not greater than about 10%, such as not greater than about 8% of the combined Pr and Nd from the RE-oxide product 1102 will typically precipitate with the second precipitation product 1142. Typically, at least about 3% of the combined Pr and Nd from the RE-oxide product 1102 will precipitate with the second precipitation product 1142. In another characterization, the second precipitation product 1142 will typically include not greater than about 12% combined Pr and Nd, such as not greater than about 10% combined Pr and Nd, such as not greater than about 8% combined Pr and Nd. Typically, the second precipitation product 1142 will include at least about 3% combined Pr and Nd.

Further, Gd and Sm may be of particular value for many applications, and it is an advantage that a relatively small proportion of the Gd and Sm report to the second precipitation product 1142 and that substantial concentrations of the Gd and Sm remain in solution, e.g., in the fourth REE solution 1144. For example, the second precipitation product 1142 may include not greater than about 18% of the combined Gd and Sm from the RE-oxide product 1102, such as not greater than about 15%. Typically, the second precipitation product 1142 will include at least about 8% of the Gd and Sm from the RE-oxide product 1102. In another characterization, the second precipitation product 1142 will include not greater than about 4% combined Gd and Sm, such as not greater than about 3% or even not greater than about 2.5% combined Gd and Sm.

It will be appreciated that the foregoing ranges of elements in the second precipitation product 1142 are provided by way of example only, and are intended to illustrate the general proportions of the different elements that precipitate in the second precipitation product 1142. The actual compositions will depend upon the mineral ore from which the RE-oxide product 1102 is derived, and the process conditions (e.g., pH) of the (first) contacting step 1112 to precipitate the first precipitation product 1116, and the process conditions of the (second) contacting step 1136 to precipitate second precipitation product 1142.

The fourth REE solution 1144 is a high purity REE solution and is a salable product that may be taken directly to a solvent extraction circuit to selectively remove REEs from the solution 1144. Alternatively, the fourth REE solution 1144 may be treated 1146 to increase the pH of the fourth REE solution 1144, such as by adding additional $NH_4OH$ to the fourth REE solution, to precipitate REEs, e.g., as RE-hydroxides, that may be separated 1150 from a barren solution 1154 in the form of a very high purity third precipitation product 1152. Thus, although the characteristics of the third precipitation product 1152 are provided below, it is to be appreciated that the same characteristics with respect to product purity and the presence or absence of particular metallic elements will also apply to the fourth REE solution 1144.

In one characterization, a sufficient amount of additional $NH_4OH$ 1148 is added to the fourth REE solution 1144 to precipitate substantially all, e.g., at least about 99.5%, of the REEs from the fourth REE solution 1144 and form a very high purity solid REE-containing product.

In any event, the third precipitation product 1152 is separated 1140 from a fourth REE solution 1144, e.g., using a filter. The third precipitation product 1152 may have a mass that is approximately 50% or more of the mass of the RE-oxide product 1102 that is input to circuit illustrated in FIG. 11, and approximately twice the mass of the second precipitation product 1142. In one example, the mass of the third precipitation product 1152 will be at least about 50% of the mass of the RE-oxide product 1102, such as at least about 55% of the mass of the RE-oxide product 1102. Stated another way, at least about 50% of the metallic elements from the RE-oxide product 1102 will report to (i.e., will precipitate in) the second precipitation product 1142, such as at least about 55%. Typically, not greater than about 65% of the metallic elements from the RE-oxide product 1102 will report to the third precipitation product 1152.

It is of a particular advantage that the third precipitation product 1152 may have an extremely high purity with respect to total REEs (TREEs). In one characterization, the third precipitation product 1152 comprises at least about 99% TREEs. Even higher purities may be obtained, and in some examples the third precipitation product 1152 comprises at least 99.9% TREEs, or even at least 99.99% TREEs, or even at least about 99.999% TREEs.

In one example, as is described above, substantially all of the thorium from the RE-oxide product 1102 may be removed with the first precipitation product 1116 and the second precipitation product 1142. Thus, the third precipitation product 1152 may include little or no thorium. In one example, not greater than 0.01% of the thorium from the RE-oxide product 1102 reports to the third precipitation product 1152. In another example, the third precipitation product 1152 includes not greater than 0.001% thorium, such as not greater than 0.0005% thorium. In one example, the level of thorium in the third precipitation product 1152 is undetectable, i.e., is undetectable using inductively coupled plasma mass spectrometry ("ICP-MS").

The third precipitation product 1152 may also include relatively low levels of cerium. For example, the third precipitation product 1152 may comprise not greater than about 20% cerium such as not greater than about 15% cerium, not greater than about 10% cerium, or even not greater than about 5% cerium. In another example, the third precipitation product 1152 will include not greater than about 30% of the cerium from the RE-oxide product 1102, such as not greater than about 20%, or even not greater than about 15% of the cerium from the RE-oxide product 1102.

As is noted above, the RE-oxide product 1102 may also include CREEs, and it is an advantage that a majority of the CREEs may report to the third precipitation product 1152. In one example, the third precipitation product 1152 may contain at least about 30% CREEs, such as at least about 35% CREEs, or even at least about 38% CREEs. Typically, the third precipitation product 1152 will contain not greater than about 50% CREEs. In another example, at least about 75% of the CREEs from the RE-oxide product 1102 will report to the third precipitation product 1152, such as at least about 80%, at least about 83% or even at least about 86% of the CREEs from the RE-oxide product 1102. Thus, it can be seen that the third precipitation product 1152 may be rich in CREEs while including little or no thorium.

The third precipitation product 1152 may include some HREEs, i.e., a relatively small amount of HREEs. For example, the third precipitation product 1152 may include not greater than about 50% of the HREEs from the RE-oxide product 1102, such as not greater than about 45% of the HREEs from the RE-oxide product 1102. In another characterization, the third precipitation product 1152 may include not greater than about 1% HREEs, such as not greater than about 0.8% HREEs.

The third precipitation product 1152 may include a substantial amount of LREEs. For example, the third precipitation product 1152 may contain at least about 40% of the LREEs from the RE-oxide product 1102, such as at least about 50%, or even at least about 55% of the LREEs from the RE-oxide product 1102, and typically will include not greater than about 70% of the LREEs from the RE-oxide product 1102. In another characterization, the third precipitation product 1152 may include at least about 88% LREEs, such as at least about 90% LREEs, or even at least about 92% LREEs. Typically, the third precipitation product 1152 will include not greater than about 99% LREEs. Among the LREEs, at least about 85% of the La from the RE-oxide product 1102 may report to the third precipitation product 1152, such as at least about 90% of the La, or even at least about 95% of the La from the RE-oxide product 1102 may report to the third precipitation product 1152. Typically, not greater than about 99% of the La from the RE-oxide product 1102 will report to the third precipitation product 1152. In another characterization, the third precipitation product 1152 may contain at least about 30% La, such as at least about 35% La, and will typically include not greater than about 40% La.

Also, among the CREEs, a substantial majority of the Pr and Nd from the RE-oxide product 1102 may advantageously report to the third precipitation product 1152. In one example, at least about 75%, such as at least about 80% or even at least about 85% of the combined Pr and Nd from the RE-oxide product 1102 may precipitate with the third precipitation product 1152. In another characterization, the third precipitation product 1152 may contain at least about 30% combined Pr and Nd, such as at least about 35% combined Pr and Nd. Typically, the third precipitation product 1152 will include not greater than about 50% combined Pr and Nd.

Further, it may be an advantage that a relatively large proportion of the Gd and Sm from the RE-oxide product 1102 report to the third precipitation product 1152. For example, the third precipitation product 1152 may include at least about 65% of the combined Gd and Sm from the RE-oxide product 1102, such as at least about 70% of the combined Gd and Sm from the RE-oxide product 1102. Typically, the third precipitation product 1152 will contain not greater than about 85% of the Gd and Sm from the RE-oxide product 1102. In another characterization, the third precipitation product 1152 may contain at least about 4% combined Gd and Sm, such as at least about 6% combined Gd and Sm. Typically, the third precipitation product 1152 will include not greater than about 12% of the Gd and Sm from the RE-oxide product 1102.

It will be appreciated that the foregoing ranges of elements in the first precipitation product 1116, the second precipitation product 1142 and the third precipitation product 1152, as well as in the intermediate products and solutions, are provided by way of example only, and are intended to illustrate the general proportions of the different elements that precipitate in the different precipitation products. The actual compositions will depend upon the mineral ore from which the RE-oxide product 1102 is derived, and the process conditions of the various contacting (precipitation) steps.

Figure 12:
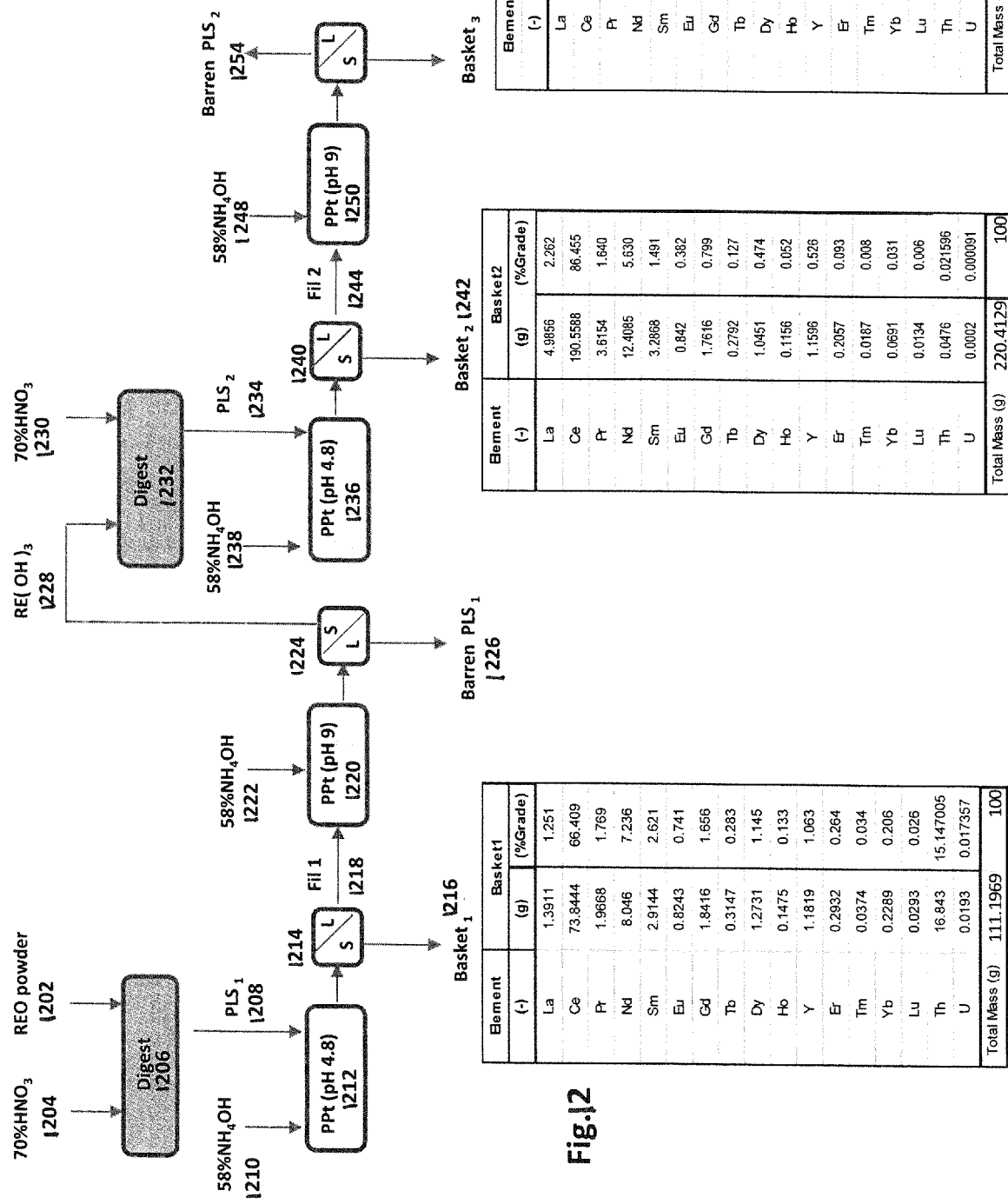
FIG. 12 is a schematic flowsheet illustrating the chemical separation of rare earth elements and thorium to produce three rare earth element baskets from a rare earth element product.

FIG. 12 illustrates a flowsheet that is similar to the flowsheet illustrated in FIG. 11. Referring to FIG. 12, a RE-oxide product 1202 is digested in nitric acid 1204 in a digestion step 1206 to form a pregnant liquor solution ("PLS1") 1208. The PLS1 1208 may have, for example, a relatively high acid concentration of at least about 18% $HNO_3$ (i.e., at least about 5M), or even at least about 20% $HNO_3$ (i.e., at least about 8M). It may be desirable to add a sufficient amount of acid to the RE-oxide product 1202 to ensure such high levels of acidity, e.g., by adding additional acid beyond the amount that is stoichiometrically required to digest all of the RE-oxide product 1202.

PLS1 1208 is then contacted with ammonium hydroxide ($NH_4OH$) 1210 to precipitate a first precipitation product as Basket1 1216 and form a filtrate ("Fil1") 1218. A sufficient amount of $NHO_4$ 1210 is contacted with PLS1 1208 to raise the pH to about pH 4.8 and selectively precipitate thorium and cerium from PLS1 1208. For example, a quantity of the aqueous solution of $NH_4OH$ 1210 (e.g., 58% $NH_4OH$ in water) may be slowly added to PLS1 1208 until the pH increases to about pH 4.8.

Basket1 1216 is separated 1214 from Filtrate1 1218, e.g., using a filter. As is noted above, Basket1 1216 will have a relatively low mass as compared to the RE-oxide product 1202. Despite having a relatively low mass as compared to the RE-oxide product 1202 that is input to the process, Basket1 1216 may include a substantial amount of the thorium that is contained in the RE-oxide product 1202. Basket1 1216 may also contain cerium that co-precipitates with the thorium during the precipitation step 1212. The REO 1202 may also contain HREEs, and Basket1 1216 may include some of these HREEs. The REO 1202 may also contain LREEs, and Basket1 1216 may include some of these LREEs, particularly cerium as is discussed above. Also, among the LREEs, Pr and Nd are of a particularly high value, and it is an advantage that a relatively low proportion of the Pr and Nd report to Basket1 1216. Further, it is an advantage that a relatively small proportion of the Gd and Sm report to Basket1 1216. An assay for Basket1 is provided below in Table IV:

TABLE IV

| | Basket1 | |
|---|---|---|
| Element | (g) | (% Grade) |
| La | 1.3911 | 1.251 |
| Ce | 73.8444 | 66.409 |
| Pr | 1.9668 | 1.769 |
| Nd | 8.046 | 7.236 |
| Sm | 2.9144 | 2.621 |
| Eu | 0.8243 | 0.741 |
| Gd | 1.8416 | 1.656 |
| Tb | 0.3147 | 0.283 |
| Dy | 1.2731 | 1.145 |
| Ho | 0.1475 | 0.133 |
| Y | 1.1819 | 1.063 |
| Er | 0.2932 | 0.264 |
| Tm | 0.0374 | 0.034 |
| Yb | 0.2289 | 0.206 |
| Lu | 0.0293 | 0.026 |
| Th | 16.843 | 15.147005 |
| U | 0.0193 | 0.017357 |
| Total | 111.1969 | 100 |

After separation 1214 of Basket1 1216 from Filtrate1 1218, Filtrate1 1218 includes the REEs and other elements that did not precipitate during precipitation 1212. The pH of Filtrate1 1218 is increased in a further precipitation step 1220 by adding $NH_4OH$ 1222 to Filtrate1 1218 to raise the pH to about pH 9. As a result, an $RE(OH)_3$ product 1228 is formed and is separated 1224 from a barren PLS1 1226, which may be recycled to conserve $OH^-$ values in the circuit. After separation 1224, $RE(OH)_3$ product 1228 is digested 1232 in nitric acid 1230 to re-solubilize the metallic elements into PLS2 1234.

PLS2 1234 is then subjected to a precipitation step 1236 by contacting with a sufficient amount of ammonium hydroxide 1238 to raise the pH to about pH 4.8 to precipitate Basket2 1242 and form Filtrate2 1244. Basket2 1242 is then separated 1240 from Filtrate2 1244, e.g., using a filter. As is discussed above, Basket2 1242 may have a mass that is roughly 25% of the mass of the RE-oxide product 1202 that is input to circuit, and roughly twice the mass of Basket1 1216.

Although a significant amount of the thorium from the RE-oxide product 1202 will report to Basket1 1216, some thorium may remain in Filtrate1 1218 and report to Basket2 1242. Basket2 1242 may also include a substantial concentration of cerium, and a significant portion of the cerium from the RE-oxide product 1202 may advantageously report to either Basket1 1216 or Basket2 1242. As is noted above, the RE-oxide product 1202 may also include CREEs, and it is an advantage that a majority of the CREEs may remain un-solubilized (i.e., in Filtrate2 1244). Basket2 1242 may include some HREEs, i.e., a relatively small amount of HREEs, and may also include a substantial amount of LREEs, particularly cerium. Among the LREEs in addition to cerium, a relatively small proportion of La will report to Basket2 1242. Also, a relatively low proportion of the Pr and Nd report to Basket2 1242. Further, a relatively small proportion of the Gd and Sm will report to Basket2 1242.

An assay for Basket2 is given below in Table V:

TABLE V

| | Basket 2 | |
|---|---|---|
| Element | (g) | (% Grade) |
| La | 4.9856 | 2.262 |
| Ce | 190.5588 | 86.455 |
| Pr | 3.6154 | 1.640 |
| Nd | 12.4085 | 5.630 |
| Sm | 3.2868 | 1.491 |
| Eu | 0.842 | 0.382 |
| Gd | 1.7616 | 0.799 |
| Tb | 0.2792 | 0.127 |
| Dy | 1.0451 | 0.474 |
| Ho | 0.1156 | 0.052 |
| Y | 1.1596 | 0.526 |
| Er | 0.2057 | 0.093 |
| Tm | 0.0187 | 0.008 |
| Yb | 0.0691 | 0.031 |
| Lu | 0.0134 | 0.006 |
| Th | 0.0476 | 0.021596 |
| U | 0.0002 | 0.000091 |
| Total | 220.4129 | 100 |

Filtrate2 1244 is the precipitated 1250 by increasing the pH of Filtrate2 1244, such as by adding $NH_4OH$ 1248, to precipitate Basket3 1252 that may be separated from barren PLS2 1254. Basket3 1252 may have a mass that is roughly twice the mass of Basket2 1242. It is of a particular advantage that Basket3 1252 may have an extremely high purity with respect to total REEs (TREEs), and may include little or no thorium. Basket3 1252 may also include relatively low levels of cerium. It is an advantage that a majority of the CREEs may report to Basket3 1252. Basket3 1252 may include some HREEs, i.e., a relatively small amount of HREEs. Basket3 1252 may include a substantial amount of LREEs. Among the LREEs, a majority of the La from the REO 1202 may report to Basket3 1252. Also, among the LREEs, a substantial majority of the Pr and Nd from the REO 1202 may advantageously report to Basket3 1252. Further, it may be an advantage that a relatively large proportion of the Gd and Sm from the REO 1202 report to Basket3 1252.

An assay for Basket3 is given below in Table VI:

TABLE VI

| | Basket 3 | |
|---|---|---|
| Element | (g) | (% Grade) |
| La | 166 | 35.798 |
| Ce | 81 | 17.468 |
| Pr | 36.4362 | 7.857 |
| Nd | 135.9218 | 29.311 |
| Sm | 19.4174 | 4.187 |
| Eu | 4.3289 | 0.934 |
| Gd | 12.45 | 2.685 |
| Tb | 0.7835 | 0.169 |
| Dy | 1.759 | 0.379 |
| Ho | 0.1668 | 0.036 |
| Y | 5.2541 | 1.133 |
| Er | 0.1759 | 0.038 |
| Tm | 0.0072 | 0.002 |
| Yb | 0.0123 | 0.003 |
| Lu | 0.0024 | 0.001 |
| Th | 0.0000 | 0.0000 |
| U | 0.0000 | 0.0000 |
| Total | 463.7155 | 100 |

Table VII below also illustrates the distribution of REEs, Th and U across Basket1, Basket2 and Basket3 when applying a methodology substantially similar to that described with respect to FIG. 12. The numbers listed in Table VII are the percentages of total in the RE-oxide. For example, 99.4% of the La from the RE-oxide dissolves in the first digestion step 1206 and 0.6% remains undissolved. During precipitation 1212, another 0.6% reports to the solids 1216 and 98.8% remains in Filtrate1 1218.

TABLE VII

| | 1st Digestion 206 | | Precipitation 212 Basket 1 | | Precipitation 220 Barren | | Digestion 232 | | Precipitation 236 Basket 2 | | Precipitation 250 Basket 3 | Barren |
|---|---|---|---|---|---|---|---|---|---|---|---|---|
| Element | Solids | PLS1 208 | Solids 216 | Filtrate1 218 | Solids 228 | Solution 226 | Solids | PLS2 234 | Solids 242 | Filtrate2 244 | Solids 252 | Solution 254 |
| La | 0.6 | 99.4 | 0.6 | 98.8 | 98.6 | 0.2 | 0 | 98.6 | 3 | 95.6 | 95.5 | 0.1 |
| Ce | 0.6 | 99.4 | 18.6 | 80.7 | 80.7 | 0 | 0 | 80.7 | 57.3 | 23.4 | 23.4 | 0 |
| Pr | 0.6 | 99.4 | 3.9 | 95.5 | 95.5 | 0 | 0 | 95.5 | 9.1 | 86.4 | 86.4 | 0 |
| Nd | 0.6 | 99.4 | 4.3 | 95.1 | 95.1 | 0 | 0 | 95.1 | 8.5 | 86.6 | 86.6 | 0 |
| Sm | 0.6 | 99.4 | 9.4 | 90.1 | 90.1 | 0 | 0 | 90.1 | 13.3 | 76.7 | 76.7 | 0 |
| Eu | 0.6 | 99.4 | 11.4 | 88 | 88 | 0 | 0 | 88 | 15.2 | 72.9 | 72.8 | 0 |
| Gd | 0.7 | 99.3 | 10.9 | 88.4 | 88.4 | 0 | 1.7 | 86.7 | 12.5 | 74.3 | 74.3 | 0 |
| Tb | 0.7 | 99.3 | 22 | 77.3 | 77.3 | 0.1 | 1.1 | 76.2 | 22.5 | 53.7 | 53.6 | 0 |

TABLE VII-continued

| | 1st Digestion | | Precipitation 212 Basket 1 | | Precipitation 220 Barren | | Digestion 232 | | Precipitation 236 Basket 2 | | Precipitation 250 Basket 3 Barren | |
|---|---|---|---|---|---|---|---|---|---|---|---|---|
| Element | Solids 206 | PLS1 208 | Solids 216 | Filtrate1 218 | Solids 228 | Solution 226 | Solids | PLS2 234 | Solids 242 | Filtrate2 244 | Solids 252 | Solution 254 |
| Dy | 0.7 | 99.3 | 31.2 | 68.1 | 68.1 | 0 | 2.2 | 65.9 | 27.9 | 38 | 38 | 0 |
| Ho | 0.7 | 99.3 | 32.9 | 66.4 | 66.3 | 0.1 | 2 | 64.3 | 29.1 | 35.2 | 35.1 | 0.1 |
| Y | 0.6 | 99.4 | 13.2 | 86.1 | 86.1 | 0 | 0 | 86.1 | 16.8 | 69.3 | 69.3 | 0 |
| Er | 0.7 | 99.3 | 41.6 | 57.7 | 57.6 | 0.1 | 0.4 | 57.2 | 33.3 | 23.8 | 23.7 | 0.1 |
| Tm | 0.7 | 99.3 | 58.3 | 41 | 39.5 | 1.5 | 1.6 | 37.9 | 28.6 | 9.3 | 8.4 | 0.8 |
| Yb | 0.7 | 99.3 | 72.5 | 26.9 | 26.7 | 0.2 | 1.3 | 25.4 | 22.4 | 3 | 3 | 0.1 |
| Lu | 0.7 | 99.3 | 70.8 | 28.5 | 27.3 | 1.2 | 10 | 17.4 | 15.4 | 2 | 1.6 | 0.4 |
| Sc | 2.2 | 97.8 | 96.5 | 1.3 | 1.3 | 0 | 1.3 | 0 | 0 | 0 | 0 | 0 |
| Th | 0.6 | 99.4 | 99.2 | 0.2 | 0.2 | 0 | 0.1 | 0.1 | 0.1 | 0 | 0 | 0 |
| U | 1 | 99 | 97.9 | 1.1 | 0.6 | 0.4 | 0.6 | 0.1 | 0 | 0.1 | 0 | 0 |

It is noteworthy that Table VII also illustrates that the digestion steps do not necessarily solubilize all of the metals in the solids and that relatively small concentrations of unsolubilized metals may remain. These solids may be disposed of as waste, or may be recycled to conserve metal values if economically practical.

Figure 13:
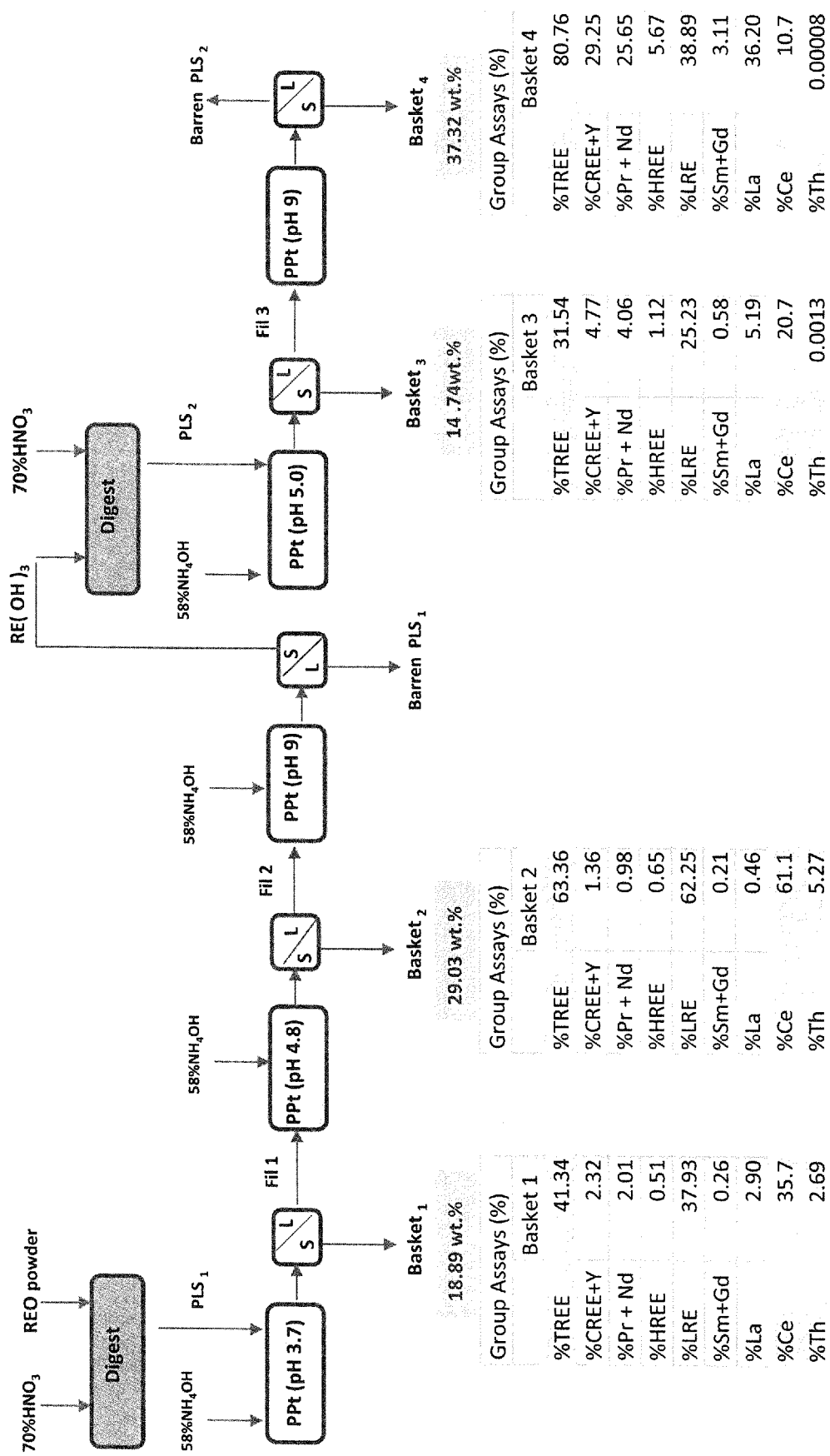
FIG. 13 is a schematic flowsheet illustrating the chemical separation of rare earth elements and thorium to produce four rare earth element baskets from a rare earth element product.

FIG. 13 is a flowsheet illustrating a similar methodology as that illustrated in FIG. 12. However, in FIG. 13 the precipitation steps for precipitation of the metal baskets increases from pH 3.7 to pH 5.0. Further, as compared to FIG. 12, an additional metal basket (i.e., Basket3 in FIG. 13) is incorporated. Thus, it can be seen that the methods disclosed herein are not limited to any particular number of chemical precipitation steps or to the formation of any particular number of metal "baskets." The assay for each Metal Basket is listed in FIG. 13.

As can be seen above, the foregoing method enables the creation of at least three precipitation products from a RE-oxide feed that contains various REEs, along with Th and possibly U. In particular, chemical precipitation may advantageously be used to form a precipitation product (e.g., the third precipitation product described above), that has an extremely high purity with respect to REEs, in particular high value REEs. thorium is removed from the RE-oxide product and substantially all of the thorium is removed with the first and second precipitation products. Further, a substantial majority of the relatively low value cerium also reports to the first and second precipitation products, leaving a much smaller concentration of the low value cerium in the third precipitation product. Thus, the dominate species in the first and second precipitation products are cerium and thorium, and these elements are present in a high concentration in a relatively low mass product. As a result, a smaller separation plant for isolating cerium and thorium may be required, thereby eliminating the potential of thorium contamination of a larger separation plant during thorium extraction, stripping, precipitation and packaging. The creation of these products by chemical precipitation may greatly simplify the subsequent steps (e.g., solvent extraction steps) that further separate the individual REE elements. Further, owing to the high concentration of cerium and thorium in the first precipitation product, it is advantageous to prepare concentrated solutions prior to solvent extraction without the need to reflux or upgrade dilute solutions for efficient separation and ultimate precipitation.

It is also a particular advantage that the first and second precipitation steps essentially separate Ce from La. That is, over 90% of the La may report to the third precipitation product, whereas only about 7% to 25% of the cerium may report to the third precipitation product, and may result in the third precipitation product being highly enriched in La, Y, Sm/Gd and CREEs and thus of a higher value than the first precipitation product and the second precipitation product. As is discussed below, the third precipitation product may be further upgraded by the selective removal of excess cerium.

Any one or more of the foregoing precipitation products ("metal baskets") may be further treated using solvent extraction to separate the constituent elements from each other. Advantageously, some of these solvent extraction methods may utilize a greatly reduced number of extraction steps to form a pure end product, and in some cases a single solvent extraction step may be used to completely separate certain elements from other(s).

In accordance with the foregoing disclosure, and merely by way of example, Table VIII illustrates typical ranges for the various elements in the precipitation products described above with respect to FIGS. 11-13.

TABLE VIII

| Element(s) | First PPT Product (e.g., Basket1) | Second PPT Product (e.g., Basket2) | Third PPT Product (e.g., Basket3) |
|---|---|---|---|
| TREEs | 85-95 wt. % | >99 wt. % | >99.999 wt. % |
| CREEs | 3-5 wt. % | 5-8 wt. % | 39-50 wt. % |
| HREEs | 0.5-6 wt. % | <2.5 wt. % | 0.3-6.0 wt. % |
| LREEs | 75%-90 wt. % | 97-99 wt. % | 92-96 wt. % |
| Sm + Gd | 0.4-0.6 wt. % | 0.7-0.9 wt. % | 6-9 wt. % |
| Pr + Nd | 3.5-9.0 wt. % | 4-7.5 wt. % | 37-43 wt. % |
| Ce | 50-76 wt. % | 86-96 wt. % | 7-20 wt. % |
| La | 0.5-1.5 wt. % | 2.3-2.8 wt. % | 35-38 wt. % |
| Th | 15-25 wt. % | 0.001-0.023 wt. % | ≤0.00005 wt. % |

As can be seen in Table VIII, the first precipitation product contains a large proportion of thorium and cerium, and also contains a substantial amount of HREEs. Although the first precipitation product only includes 0.5% to 4% HREEs, this may represent greater than 30% of the total HREEs from the RE-oxide product, and is contained in a product that has a relatively small mass as compared to the RE-oxide product. Thus, it may be economically desirable to separate the HREEs in the first precipitation product from the cerium and the thorium. Further, it may be desirable to further separate the thorium from the cerium so that a single Th-rich product is produced for ease of disposal.

Figures 14A, 14B, 14C:
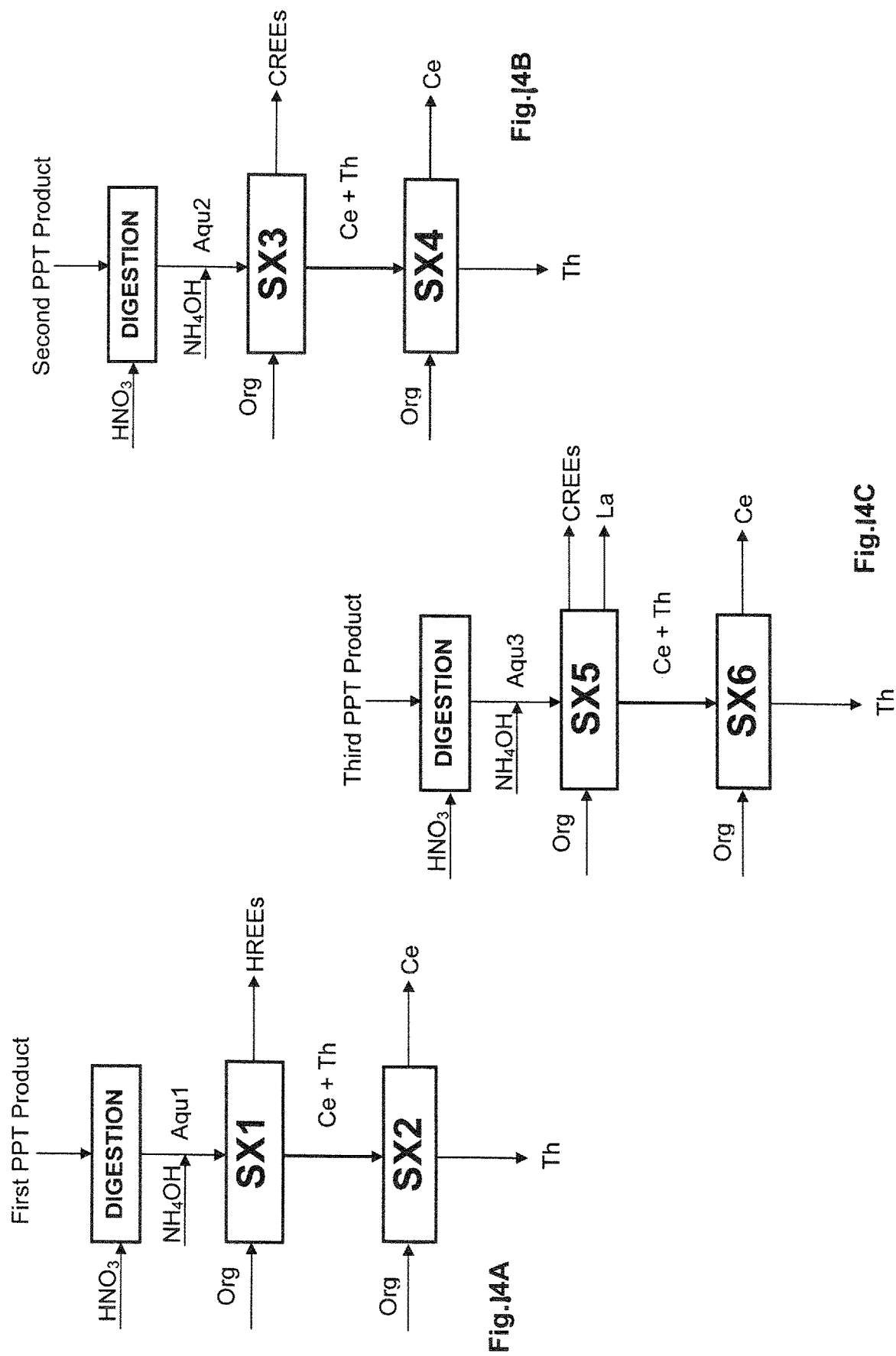
FIGS. 14A to 14C are schematic flowsheets illustrating solvent extraction methods that may be applied to precipitation products comprising rare earth elements.

Referring to FIG. 14A, the first precipitation product may be subjected to a first solvent extraction step ("SX1") to separate HREEs from both the cerium and thorium. In one example, it has been found that a single solvent extraction step SX1 may be utilized to selectively separate cerium and thorium from the HREEs. In this example, the first precipitation product is dissolved (solubilized) in nitric acid ($HNO_3$). It is desirable to use a sufficient amount of $HNO_3$ to digest substantially all (e.g., at least about 99.5%) of the first precipitation product, and to form an aqueous solution (Aqu1) having an excess of acid. The amount of acid in Aqu1 should be sufficient to maintain the +4 oxidation state of substantially all of the cerium and the thorium in Aqu1. For example, the solution Aqu1 may have an acidity of at least about 15% $HNO_3$, such as at least about 18% $HNO_3$, or even at least about 20% $HNO_3$. In one characterization, an initial acidity of from about 18% to about 22% $HNO_3$ may be sufficient.

Ammonium hydroxide may then be added to the solution Aqu1 to decrease the acidity of the solution. For example, a sufficient amount of $NH_4OH$ may be added to the solution Aqu1 to reduce the acidity of the solution to not greater than about 6% $HNO_3$, such as not greater than about 5% $HNO_3$, or even not greater than about 4% $HNO_3$. In one characterization, the acidity of the solution Aqu1 is reduced to within the range of at least about 3% and not greater than about 4% $HNO_3$, such as about 3.8% (about 0.9M). Again, while not wishing to be bound by any theory, it is believed that the addition of $NH_4OH$ to the highly acidic solution Aqu1 complexes the cerium and the thorium as ammonium nitrate complex metal species, and that these species are stable at lower acidities. Therefore, just prior to solvent extraction, a majority of the cerium in the solution Aqu1 will be "locked" in the nitrate-ammonium complex where cerium is in +4 oxidation state.

A solvent extraction step SX1 may then be carried out on the solution Aqu1. In this regard, the organic (Org1) may be selected from known organic compounds typically used of solvent extraction of REEs or similar elements, such as tributyl phosphate ("TBP") or Di-(2-ethylhexyl)phosphoric acid ("D2EPHA"). For example, the organic Org1 may be TBP in a solvent (e.g., kerosene) at concentrations such as from about 10% to about 40% TBP. The solvent extraction step SX1 may be carried out under ambient conditions, e.g., ambient temperature and pressure at an organic to aqueous ratio of about 1.1:1 (Org1:Aqu1).

By applying the foregoing methodology, it has been found that a substantial majority of the cerium and the thorium from the solution Aqu1 may be extracted with the organic, while a vast majority of the REEs (e.g., HREEs) will stay in the aqueous raffinate. In one example at least about 80%, such as at least about 85% or even at least about 90% of the cerium and thorium from the solution Aqu1 is extracted with the organic, such as at least about 92% of the cerium. In contrast, no greater than about 5%, such as not greater than about 3% or even no greater than about 1% of the other REEs will be extracted with the organic. The resulting raffinate has a very high purity with respect to REEs, and the raffinate may be recycled through the solvent extraction step SX1 to achieve a purity of at least about 98% REEs, such as at least about 99% REEs, or even at least about 99.5% REEs or 99.9% REEs.

A further solvent extraction step (SX2) may be carried out to separate thorium from cerium. When cerium and thorium are jointly extracted by an organic (e.g., TBP) in SX1, they exist in an organic solution. This organic may be stripped of the cerium and thorium by contacting the organic with a highly acidic solution, for example at least about 7M, such as about 8M. The thorium and cerium will be transferred to the aqueous acidic liquor and the organic, now substantially free of metals, may be recycled to the initial extraction step SX1. The resulting aqueous strip solution will carry substantially all of the cerium and thorium.

It is believed that in a nitrate solution at about pH 4.8, before acidity is increased, (e.g., from about 0.5M to about 7M), substantially all of the cerium species will exist in solution as $Ce^{3+}$, but after adjusting the acidity of the rare earth nitrate solution upwards, a limited amount of cerium will be oxidized to $Ce^{4+}$. At lower acidity, it is believed that a majority of the thorium will exist in the $Th^{4+}$ oxidation state, e.g., as a relatively stable Th (IV) nitrate. Simply explained, it is difficult to oxidize all $Ce^{3+}$ to $Ce^{4+}$ by adjusting acidity from pH 4.8 with 3M or 6.8M $HNO_3$. Thus, an organic (Org2) such as TBP or D2EPHA may be utilized to selectively extract Th (IV) nitrate species from Ce (III) nitrate species, where the cerium reports to the aqueous raffinate.

The same methodology described above with respect to solvent extraction steps SX1 and SX2 may also be utilized to separate REEs (e.g., CREEs) from cerium and thorium from the second precipitation product in solvent extraction step SX3 and to separate cerium from the trace amounts of thorium in solvent extraction step SX4 (FIG. 14B).

Further, the same methodology described above with respect to solvent extraction steps SX1 and SX2 may also be utilized with respect to the third precipitation product to separate non-Ce REEs (e.g., CREEs and La) from Ce (and possibly Th) in solvent extraction step SX5 and to separate cerium from the trace amounts of thorium, if any, in solvent extraction step SX6 (FIG. 14C).

Other methods for the removal of thorium and cerium from an RE-containing product may also be employed, independently or in combination with one or more of the foregoing processes. For example, thorium and/or cerium may be selectively removed from the RE-containing product (e.g., from RE-oxides) using solvent extraction techniques.

For example, the method for the removal of thorium may include contacting an REE-containing acidic solution with a thorium selective extractant to extract at least a portion of the thorium from the REE-containing acidic solution, whereby a thorium-depleted raffinate and a thorium-loaded extractant phase are formed. The thorium may then be stripped from the thorium-loaded extractant phase to form a thorium-depleted extractant. Various characteristics and refinements of this process for the use of solvent extraction to remove thorium will now be described in more detail.

As with the foregoing precipitation methods. it has been found to be advantageous if substantially all of the thorium in the RE-oxide product is present as Th(IV), i.e., in the $Th^{4+}$ oxidation state. Starting with the thorium in the $Th^{4+}$ oxidation state in the RE-oxide product and in the REE-containing acidic solution will facilitate the selective extraction of the thorium from the REEs and other elements in the REE-containing acidic solution. One method to ensure that a substantial proportion (e.g., greater than 99%) of the thorium in the RE-oxide product is in the 4+ oxidation state is to calcine the REO product at an elevated temperature. In one characterization, the REO product is calcined at a temperature of at least about 710° C., such as at least about 750° C., e.g., in an oxidizing environment such as in air. For example, an REE-oxalate powder or an REE-carbonate powder can be calcined under these conditions to form the REO product. It is believed that these temperatures in combination with oxygen gas or air will be sufficient to ensure substantially complete conversion of the thorium to the Th(IV) oxidation state in the solid state. To sustain this high oxidation state achieved in the solid state for thorium, the calcined REO product may advantageously be dissolved in a stabilizing acidic solution having sufficient excess protons (H+) and nitrates ($NO_3^-$), but with less reducing ions such as $OH^-$.

Figure 15:
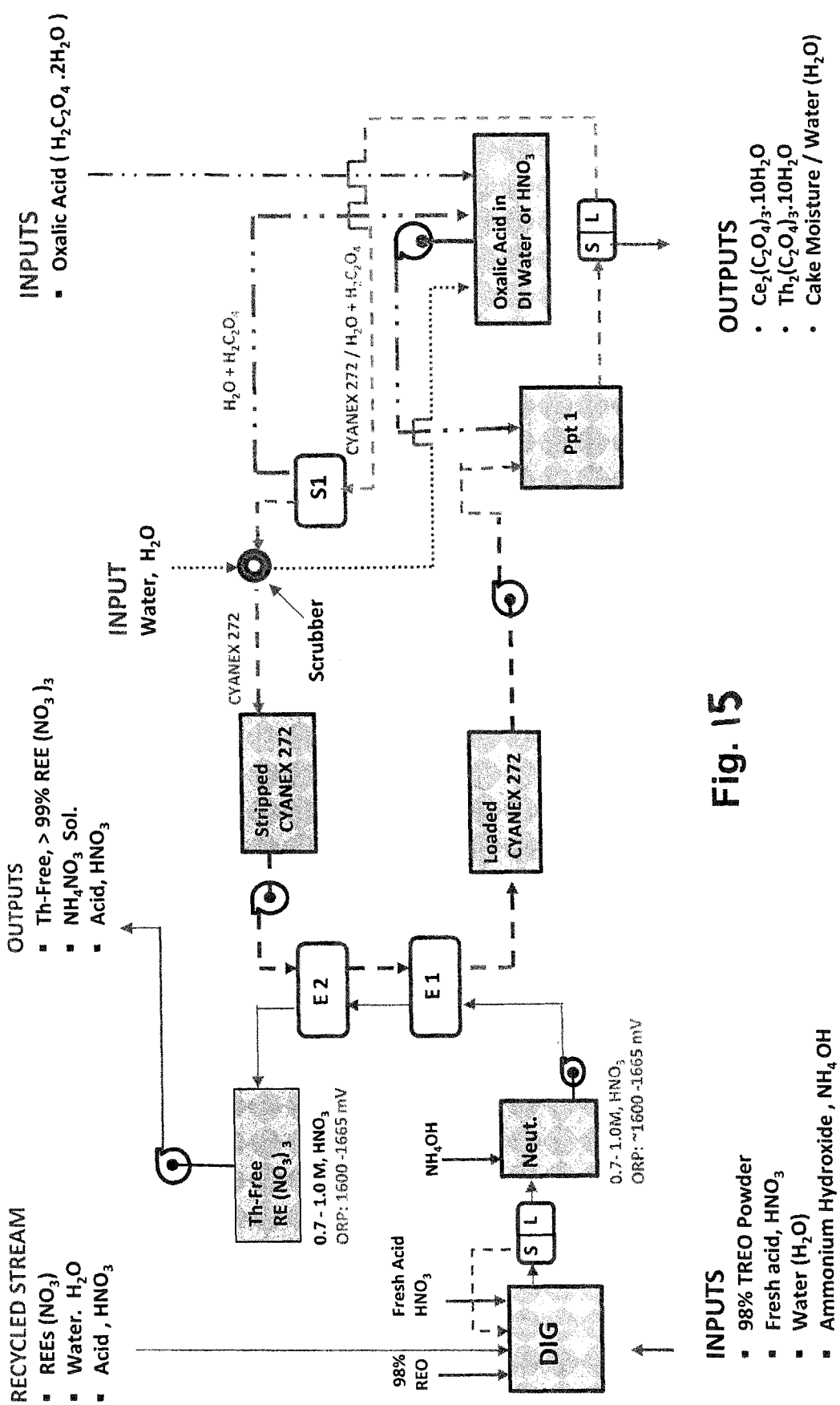
FIG. 15 is a schematic flowsheet illustrating the separation of thorium from an REE-containing product by solvent extraction.

Referring now to FIG. 15, the REE-containing acidic solution may be formed by digesting the RE-oxide product (e.g., having about 98 wt. % total REEs on a metals basis) in an acid, e.g., in a mineral acid such as nitric acid ($H^+$, $NO_3^-$). For example, the RE-oxide product may be contacted with a 70% solution of $HNO_3$ to digest all or substantially all of the REEs in the RE-oxide product (e.g., digest at least about 95% of the REEs) and form an acidic REE solution comprising dissolved (solubilized) REEs. In one characterization, at least about 98% of the REEs in the RE-oxide product are digested by the nitric acid. The resulting REE acidic solution may include REEs in a concentration of at least about 10 grams per liter (g/l). In certain characterizations, the REE acidic solution includes a relatively high concentration of REEs, such as at least about 15 g/l REEs, at least about 20 g/l REEs, at least about 30 g/l or even at least about 50 g/l REEs, where the REEs are solubilized in the REE-containing acidic solution. Typically, the REE-containing acidic solution will include not greater than about 100 g/l REEs. Further, the REE-containing acidic solution may have, for example, a relatively high acid concentration of at least about 18% $HNO_3$ (i.e., at least about 4.5M), or even at least about 22% $HNO_3$ (i.e., at least about 6M). It may be desirable to add a sufficient amount of acid to the REE-containing acidic solution to ensure such high levels of acidity, e.g., by adding additional acid beyond the amount that is stoichiometrically required to digest all of the RE-oxide product.

As is illustrated in FIG. 15, at least a portion of the nitric acid may be recovered from a recycled stream. After digestion of the RE-oxide product, any remaining (undigested) solids may be separated from the REE-containing acidic solution and returned to the digestion reactor. The REE-containing acidic solution exiting the solid/liquid separation unit will typically have an acidity of at least about 0.001M, at least about 0.01M, at least about 0.1M, such as at least about 0.5M. Typically, the acidity of REE-containing acidic solution will not exceed about 8M, such as not greater than about 5M. Advantageously, thorium will remain in the desired $Th^{4+}$ oxidation state over a wide range of acidity. Optionally, as is discussed in more detail below with respect to a cerium solvent extraction separation circuit, the REE-containing acidic solution may be neutralized after digestion (e.g., to a reduced acidity) by adding a neutralizing agent such as ammonium hydroxide ($NH_4OH$) to the REE-containing acidic solution. In one characterization, the REE-containing acidic solution is contacted with a neutralizing agent to reduce the acidity to at least about 0.5M, such as at least about 0.7M, and not greater than about 1.0 M. Also, at this stage of the process, the REE-containing acidic solution may advantageously have an oxidation reduction potential (ORP) of at least about 1500 mV, such as at least about 1600 mV, and not greater than about 1790 mV, such as not greater than about 1665 mV. As with the adjustment of the acidity, such an oxidation reduction potential may be particularly advantageous when the REE-containing acidic solution will also be treated by solvent extraction to separate cerium, as is discussed below.

In any event, the REE-containing acidic solution is contacted with a thorium selective extractant in at least a first contacting step (E1) to extract thorium from the REE-containing acidic solution. In one characterization, the thorium selective extractant is a phosphinic-type acid. For example, the thorium selective extractant may comprise bis(2,4,4-trimethylpentyl)phosphinic acid, which is sold under the name CYANEX 272 and is available from Cytec Industries Inc. of Woodland Park, N.J., USA. It has been found that under the general conditions described herein, the phosphinic-type acid will selectively extract thorium from the REE-containing acidic solution when the thorium is in the $Th^{4+}$ oxidation state, while a substantial portion of the REEs will remain in the raffinate from the contacting step. The thorium selective extractant will typically be dispersed within a diluent, typically a hydrocarbon diluent such as kerosene. In one characterization, it has been found to be particularly advantageous to use an extractant concentration in the diluent of at least about 10% and not greater than about 35%, and particularly at least about 20% and not greater than about 30%, such as from about 22% to about 28%. It has been found that the phosphinic-type acid extractant can also provide good results (e.g., high selectivity) over a wide range of acidities, such as from about 1M to about 8M $HNO_3$.

It may also be advantageous to ensure that the concentrations of metals that may interfere with the thorium extraction are sufficiently low so that they are not detrimental to the selective thorium extraction. Examples of such metals include calcium and manganese. For example, it may be advantageous if the weight ratio of Ca:Th is not greater than about 250. It may also be advantageous if the weight ratio of Mn:Th is not greater than about 50.

As illustrated in FIG. 15, the thorium selective extractant is contacted with the REE-containing acidic solution in counter-current flow. In one characterization, the thorium selective extractant is contacted with the REE-containing acidic solution in a mixer-settler. A mixer-settler includes a first section that mixes the components (e.g., using mechanical agitation) and a second section that permits settling and separation of the mixed phases by gravity. In one characterization, the total contact time may be at least about 3 minutes and not greater than about 15 minutes total time. For example, the residence time (contact time) in a mixer-settler may be such that the mixing of the REE-containing acidic solution and the thorium selective extractant is carried out for about 3 minutes and that the total time in the mixer-settler is about 15 minutes.

As illustrated in FIG. 15, the step of contacting the REE-containing acidic solution with the thorium selective extractant is carried out in two separate contacting steps (E1 and E2). Thus, the step of contacting the REE-containing acidic solution with the thorium selective extractant may include a first contacting step wherein the REE-containing acidic solution is contacted with the thorium selective extractant to extract at least a (first) portion of the thorium from the REE-containing acidic solution, whereby a first thorium-depleted raffinate and a first thorium-loaded extractant phase are formed. The first thorium-depleted raffinate may then be contacted with additional thorium selective extractant in a second contacting step (e.g., in counter-current flow) to extract at least a further portion of the thorium from the first thorium-depleted raffinate. It will be appreciated that additional contacting steps may be utilized, if desired.

However, the extraction of thorium from the REE-containing acidic solution may advantageously be carried out in a single contacting step, e.g., in a single mixer-settler. It is an advantage that this method permits the utilization of a single contacting step, which may reduce capital equipment costs and also may reduce operating costs for the extraction and removal of thorium from the REE-containing acidic solution by reducing reagent requirements, etc.

In either case, the thorium-loaded extractant phase (e.g., loaded CYANEX 272) is then conveyed (e.g., pumped) to a circuit for the removal of the extracted thorium from the thorium-loaded extractant phase, resulting in the formation of a thorium-depleted extractant. In one characterization, the thorium may be removed from the thorium-loaded extractant phase by stripping the thorium from the thorium-loaded extractant phase, e.g., by stripping at a very high acidity.

In another refinement of this process for the removal of thorium, the thorium may be removed from the thorium-loaded extractant phase by contacting the thorium loaded extractant phase with a precipitative medium, such as an organic acid, to precipitate the thorium from the thorium-loaded extractant phase and form a thorium-depleted extractant. One particularly useful organic acid that may be utilized for this purpose is oxalic acid ($H_2C_2O_4$). In this embodiment, and as illustrated in FIG. 15, the thorium-loaded extractant phase is contacted with oxalic acid (e.g., in water and/or in nitric acid) to precipitate thorium from the extractant as thorium oxalate (e.g., $Th_2(C_2O_4)_3.10H_2O$). Advantageously, this reaction to form thorium oxalate may occur very rapidly and may even be characterized as being essentially instantaneous. Characterized another way, the thorium may be completely precipitated from the thorium loaded extractant phase in less than about 1 minute, less than about 30 seconds, and even less than about 10 seconds. It should be noted that some amounts of cerium may also be extracted from the REE-containing solution by the thorium selective extractant. This cerium will also precipitate as cerium oxalate (e.g., $Ce_2(C_2O_4)_3.10H_2O$) with the thorium oxalate. Thus, upon liquid/solid separation, the thorium oxalate and cerium oxalate are eliminated from the thorium removal circuit.

After solid/liquid separation, the now thorium-depleted extractant will be dispersed in the organic acid, e.g., in the oxalic acid. It is an advantage that the thorium depleted extractant may be scrubbed from the oxalic acid so that the oxalic acid and the thorium depleted extractant may be recycled. In this regard, it is noteworthy that the circuit illustrated in FIG. 15 may be considered as a closed circuit, e.g., having no undesirable effluents from the circuit. In this regard, the thorium depleted extractant dispersed in the oxalic acid may be conveyed from the solid/liquid separation step to a stripping step (S1) where the thorium-depleted extractant (e.g., thorium-depleted CYANEX 272) is separated from the oxalic acid. The oxalic acid may then be recycled back to the precipitation step, e.g., to precipitate thorium. The extractant phase may then be scrubbed, e.g., with water or an acid, which may be recycled back to the contacting step.

The thorium-depleted raffinate may advantageously include not greater than about 0.1 wt. % thorium on a metals basis, such as not greater than about 0.05 wt. % thorium, or even not greater than about 0.01 wt. % thorium on a metals basis. Characterized another way, the thorium-depleted raffinate may comprise at least about 99% REEs on a metals basis, such as at least about 99.5% REEs on a metals basis or even at least about 99.9% REEs on a metals basis.

It is noteworthy to examine input streams and output streams from the thorium removal circuit illustrated in FIG. 15. Inputs to the process may include an RE-oxide product (e.g., RE-oxide powder that is about 98% pure with respect to REEs), fresh acid (e.g., nitric acid), water and optionally ammonium hydroxide. Inputs to the thorium precipitation step include oxalic acid and water. The output from the thorium precipitation circuit is thorium oxalate, possibly with some cerium oxalate and water. The output from the solvent extraction step includes an essentially thorium-free raffinate that includes a high concentration of REEs (e.g., greater the 99% REEs on a metals basis) and possibly ammonium nitrate in an acid.

Additionally, it has been found that phosphinic-type acid extractants such as bis(2,4,4-trimethylpentyl)phosphinic acid may also advantageously remove uranium (U) from the REE-containing acidic solution with the thorium, and in one characterization the thorium removal solvent extraction circuit illustrated in FIG. 15 will advantageously remove substantially all uranium from the REE-containing acidic solution. Further, as is illustrated in FIG. 15, phosphinic-type acid extractants may also remove a substantial portion of cerium from the REE-containing acidic solution with the thorium, while rejecting substantially all other REEs. It has also been found that phosphinic-type acid extractants may also remove a substantial portion of iron (e.g., traces of iron) from the REE-containing acidic solution with the thorium.

Thus, the use of a phosphinic-type acid extractant such as CYANEX 272 as described with respect to FIG. 15 may provide at least one or more of the following advantages: (i) the ability to extract substantially all of the toxic and radioactive elements at once and in a single mixer settler; (ii) the ability to function at a high acidity (e.g., about 1M to 8M $HNO_3$) while maintaining selectivity; (iii) because iron and thorium are removed, the chemical precipitation circuit is reduced in complexity as there is no need to set ~pH 3.2 to remove Fe and Th—the REEs left in solution are free from iron and thorium and therefore can be precipitated at a single pH of about pH 9 to secure a bulk REO powder for advanced separation, and the base metals such as Ca, Mg, Zn, Mn, Sr, K, Na, Ti, Cr, Ni, Co etc. remain in solution at pH 9; and (iv) the extractant cannot be stripped with any acid, but can be stripped with oxalic acid.

In any event, the process may also include a solvent extraction cerium removal circuit, in addition to or independent of the thorium removal solvent extraction circuit. Thus, according to another embodiment of this disclosure, a circuit for the separation and recovery of cerium from other REEs is disclosed. One advantage to separating the cerium from the other REEs prior to separation of the other REEs from each other is that cerium typically constitutes the largest concentration of metals in the REE-containing product. Thus, by first separating the cerium, the subsequent equipment and reagents for the separation of the other REEs may be substantially reduced. Further, cerium is of relatively low value as compared to many other REEs, e.g., as compared to the CREEs.

This cerium separation circuit may be implemented as a stand-alone process to separate cerium from other REEs. Also, the cerium separation circuit may be implemented before the use of the thorium removal circuit described above with respect to FIG. 15. Thus, for example, the RE-oxide product input to the cerium solvent extraction circuit may still have a relatively high level of thorium, such as up to about 2.5 wt. % on a metals basis. In one particular embodiment, the cerium separation circuit is implemented on the essentially thorium-free raffinate that is produced by the thorium removal circuit, e.g., as illustrated in FIG. 15 and described above.

In any case, it has been found to be advantageous if substantially all of the cerium in the RE-oxide product and the REE-containing acid is present as Ce(IV), i.e., in the $Ce^{4+}$ oxidation state. Starting with the cerium in the $Ce^{4+}$ oxidation state in the RE-oxide product and in the REE-containing acidic solution (e.g., in the thorium-depleted raffinate) will facilitate the selective extraction of the cerium from the other REEs and other elements in the REE-containing acidic solution. One method to ensure that a substantial proportion (e.g., greater than 99%) of the cerium in the RE-oxide product is in the 4+ oxidation state is to calcine an RE-containing product at an elevated temperature. In one characterization, the an RE-containing product is calcined at a temperature of at least about 710° C., such as at least about 750° C., e.g., in an oxidizing environment such as in air. For example, an REE-oxalate powder or an REE-carbonate powder may be calcined under these conditions to form the RE-oxide product. As with the thorium solvent extraction circuit discussed above, it is believed that these temperatures in combination with oxygen gas or air will be sufficient to ensure substantially complete conversion of the cerium to the Ce(IV) oxidation state in the solid state. To sustain this high oxidation state achieved in solid state, the RE-oxide product is dissolved in a stabilizing acidic solution having sufficient excess protons ($H^+$) and nitrates ($NO_3^-$).

Broadly stated, the method for the separation of cerium from the REE-containing acidic solution comprising cerium and at least one other rare earth element in addition to cerium, comprises the steps of contacting the REE-containing acidic solution with a cerium selective extractant to extract at least a portion of the cerium from the REE-containing acidic solution, whereby a cerium-depleted raffinate and a cerium-loaded extractant phase are formed. The extracted cerium is then recovered from the cerium-loaded extractant phase to form a cerium-depleted extractant. Various characteristics and refinements of this process will now be described in more detail with respect to FIG. 16.

The REE-containing acidic solution may be formed by digesting the RE-oxide product in an acid, e.g., in a mineral acid such as nitric acid in a manner discussed above with respect to FIG. 15. With respect to the recovery of cerium, it is desirable to adjust the acidity of the REE-containing acidic solution, if necessary, to adjust the acidity to the range of at least about 0.7M and not greater than about 3.0M, such as not greater than about 2.0M or even not greater than about 1.0M. Further, it has been found that the oxidation reduction potential (ORP) of the REE-containing acidic solution may have an impact on the efficacy of the cerium recovery process. In this regard, it is desirable that the ORP of the REE-containing acidic solution (e.g., during the contacting step) be at least about 1500 mV, such as at least about 1600 mV, and not greater than about 1790 mV, such as not greater than about 1665 mV.

Figure 16:
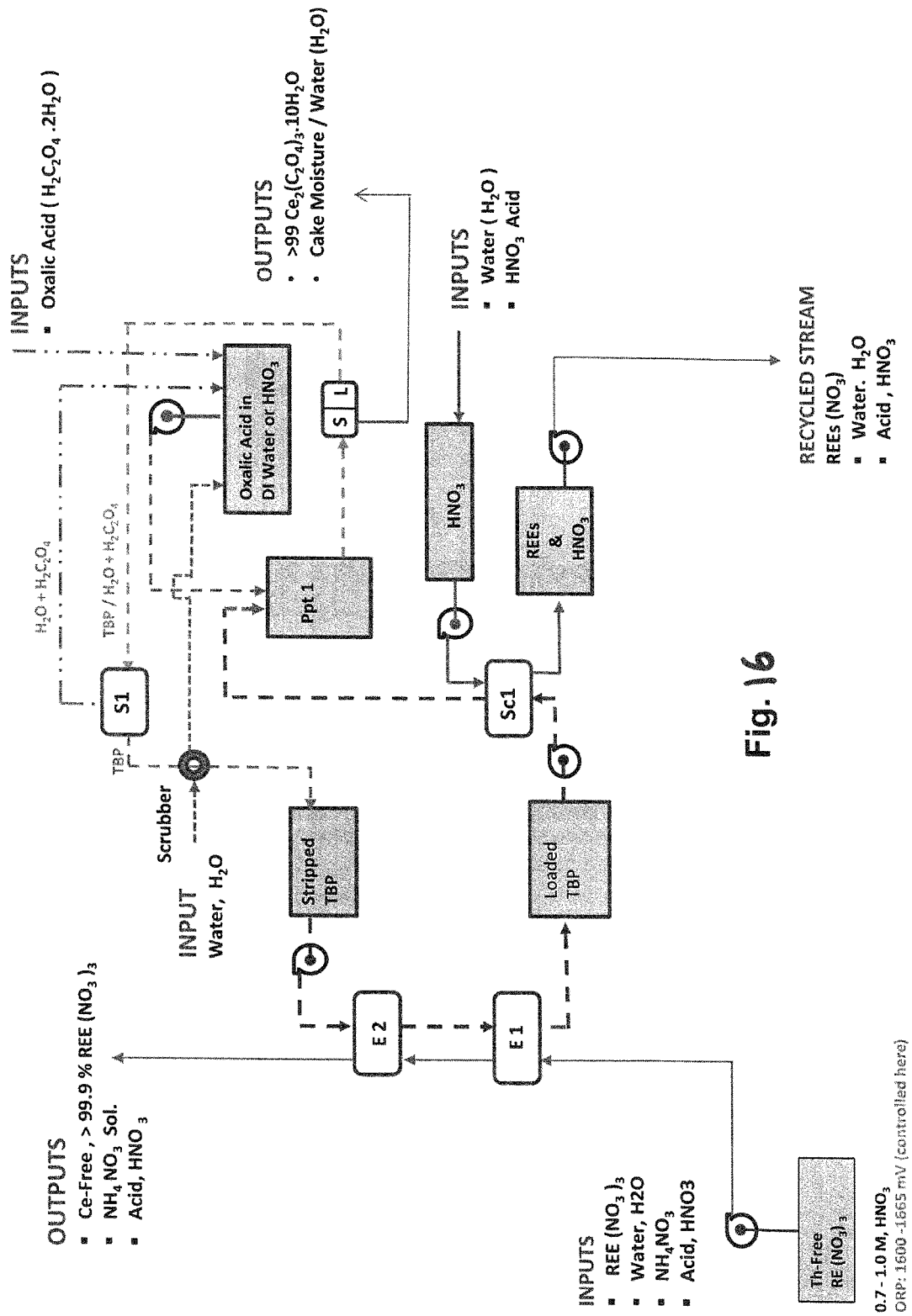
FIG. 16 is a schematic flowsheet illustrating the separation of cerium from an REE-containing product by solvent extraction.

Referring now to FIG. 16, an embodiment of the cerium solvent extraction separation circuit is illustrated where the REE-containing acidic solution that is fed to the cerium separation circuit is the thorium-depleted raffinate from the thorium removal circuit (FIG. 15). As is indicated in FIG. 16, the REE-containing acidic solution is contacted with a cerium selective extractant in at least a first contacting step (E1) to extract cerium from the REE-containing acidic solution. In one characterization, the cerium selective extractant is an organophosphorus compound. For example, the cerium selective extractant may comprise tributyl phosphate ("TBP"). It has been found that under the general conditions described herein, organophosphorus extractant will selectively extract cerium from the REE-containing acidic solution when the cerium is in the $Ce^{4+}$ oxidation state, while a substantial portion of the other REEs (e.g., the CREEs) remain in the (cerium-depleted) raffinate from the contacting step. The cerium selective extractant will typically be dispersed within a diluent, typically a hydrocarbon diluent such as kerosene.

As illustrated in FIG. 16, the cerium selective extractant is contacted with the REE-containing acidic solution in counter-current flow. In another characterization, the cerium selective extractant may be contacted with the REE-containing acidic solution in a mixer-settler apparatus. The total contact time of the acidic solution and the extractant may be at least about 3 minutes and not greater than about 30 minutes total time, for example. In one characterization, the residence time (contact time) in a mixer-settler apparatus may be such that the mixing of the REE-containing acidic solution and the cerium selective extractant is carried out for about 3 minutes and that the total time in the mixer-settler apparatus is about 30 minutes.

As illustrated in FIG. 16, the step of contacting the REE-containing acidic solution with the cerium selective extractant is carried out in two separate contacting steps (E1 and E2). Thus, the step of contacting the REE-containing acidic solution with the cerium selective extractant may include a first contacting step wherein the REE-containing acidic solution is contacted with the cerium selective extractant to extract at least a (first) portion of the cerium from the REE-containing acidic solution, whereby a first cerium-depleted raffinate and a first cerium-loaded extractant phase are formed. The first cerium-depleted raffinate may then be contacted with additional cerium selective extractant in a second contacting step (e.g., in counter-current flow) to extract at least a further portion of the cerium from the first cerium-depleted raffinate. It will be appreciated that additional contacting steps may be utilized, if desired.

However, the extraction of cerium from the REE-containing acidic solution may also be carried out in a single contacting step, e.g., in a single mixer-settler apparatus. It may be an advantage to utilize a single contacting step to reduce capital equipment costs and also to reduce operating costs for the extraction and removal of cerium from the REE-containing acidic solution.

In either case, the cerium-loaded extractant phase (e.g., cerium-loaded TBP) is then conveyed (e.g., pumped) to a circuit for the recovery of the extracted cerium from the cerium-loaded extractant phase, resulting in the formation of a cerium-depleted extractant. In one characterization, the cerium may be removed from the cerium-loaded extractant phase by stripping the cerium from the cerium-loaded extractant phase, e.g., using water.

In another refinement of this process for the recovery of cerium, the cerium may be recovered from the cerium-loaded extractant phase by contacting the cerium loaded extractant phase with a precipitative medium, such as an organic acid, to precipitate the cerium from the cerium-loaded extractant phase and form a cerium-depleted extractant. One particularly useful organic acid that may be utilized for this purpose is oxalic acid ($H_2C_2O_4$). In this embodiment, and as illustrated in FIG. 16, the cerium-loaded extractant phase is contacted with oxalic acid (e.g., in water and/or in nitric acid) to precipitate cerium as cerium oxalate (e.g., $Ce_2(C_2O_4)_3 \cdot 10H_2O$). Advantageously, this reaction to form cerium oxalate may occur very rapidly and may even be characterized as being essentially instantaneous. Thus, upon liquid/solid separation, the cerium is recovered from the circuit as high purity cerium oxalate.

After solid/liquid separation, the now cerium depleted extractant will be dispersed in the organic acid, e.g., in the oxalic acid. It is and advantage that the cerium-depleted extractant may be scrubbed from the oxalic acid so that the oxalic acid and the cerium depleted extractant may be recycled. In this regard, it is noteworthy that the solvent extraction circuit illustrated in FIG. 16 may be considered as a closed circuit, e.g., having no undesirable effluents from the circuit. In this regard, the cerium-depleted extractant dispersed in the oxalic acid may be conveyed from the solid/liquid separation step to a stripping step (S1) where the cerium-depleted extractant (e.g., cerium-depleted TBP) is separated from the oxalic acid. The oxalic acid may then be recycled back to the precipitation step. The extractant may be scrubbed, e.g., with water, and then recycled back to the contacting step.

The cerium-depleted raffinate may advantageously include not greater than about 1 wt. % cerium on a metals basis, such as not greater than about 0.1 wt. % cerium, or even not greater than about 0.05 wt. % cerium on a metals basis. In another characterization, this process enables the separation of at least about 60% of the cerium from the REE-containing acidic solution, such as at least about 85% of the cerium or even at least about 95 wt. % of the cerium from the REE-containing acidic solution. The cerium-depleted raffinate may comprise at least 99 wt. % REEs on a metals basis, such as at least 99.5 wt. % REEs on a metals basis or even at least 99.9 wt. % REEs on a metals basis.

As with the thorium removal circuit disclosed above and in FIG. 15, it is noteworthy to point out the input streams and output streams from the cerium removal circuit illustrated in FIG. 16. Inputs to the process may include an REO product (e.g., the thorium depleted raffinate), fresh acid (e.g., nitric acid), water and ammonium hydroxide. Inputs to the cerium recovery (precipitation) step include oxalic acid and water. The output from the cerium precipitation circuit is high purity cerium oxalate. The output from the solvent extraction step(s) includes an essentially cerium-free raffinate that includes a high concentration of REEs (e.g., greater the 99% REEs on a metals basis) and possibly ammonium nitrate in an acid.

REE Purification Circuit

In another embodiment, a method for the purification of an REE-containing product, such as an REE-containing acidic solution, is disclosed. For example, this method may be applied to the output REE-containing acidic solution from the thorium removal solvent extraction circuit (FIG. 15) and/or the output REE-containing acidic solution from the cerium removal solvent extraction circuit (FIG. 16).

Broadly stated, the method for the purification of an REE-containing acidic solution may be applied to remove non-REE metals (e.g., Th, U and/or base metals) and form a high purity REE-rich product. Broadly speaking, the method may include the step of precipitating non-REEs from the REE-containing acidic solution to form the very high purity REE-rich product. The precipitation may occur in one stage, two stages, three stages or more where the pH (e.g., the acidity) of the REE-containing acidic solution is different at each stage. In one characterization, a first stage precipitation occurs at a first pH at which some non-REE elements (e.g., Th, U, Al, Fe and/or Ba) are precipitated. This may be followed by a second stage precipitation at a second pH that is higher than the first pH to remove (precipitate) cerium (e.g., traces of cerium) from the REE-containing acidic solution. This may be followed by yet a third stage precipitation at a third pH that is higher than the second pH to recover (precipitate) the REE elements while leaving base metals (e.g., Ca, Mg, K, Na, Sr, Zn, Ti and/or Mn) in solution, thereby further purifying the REE-containing product.

Figure 17:
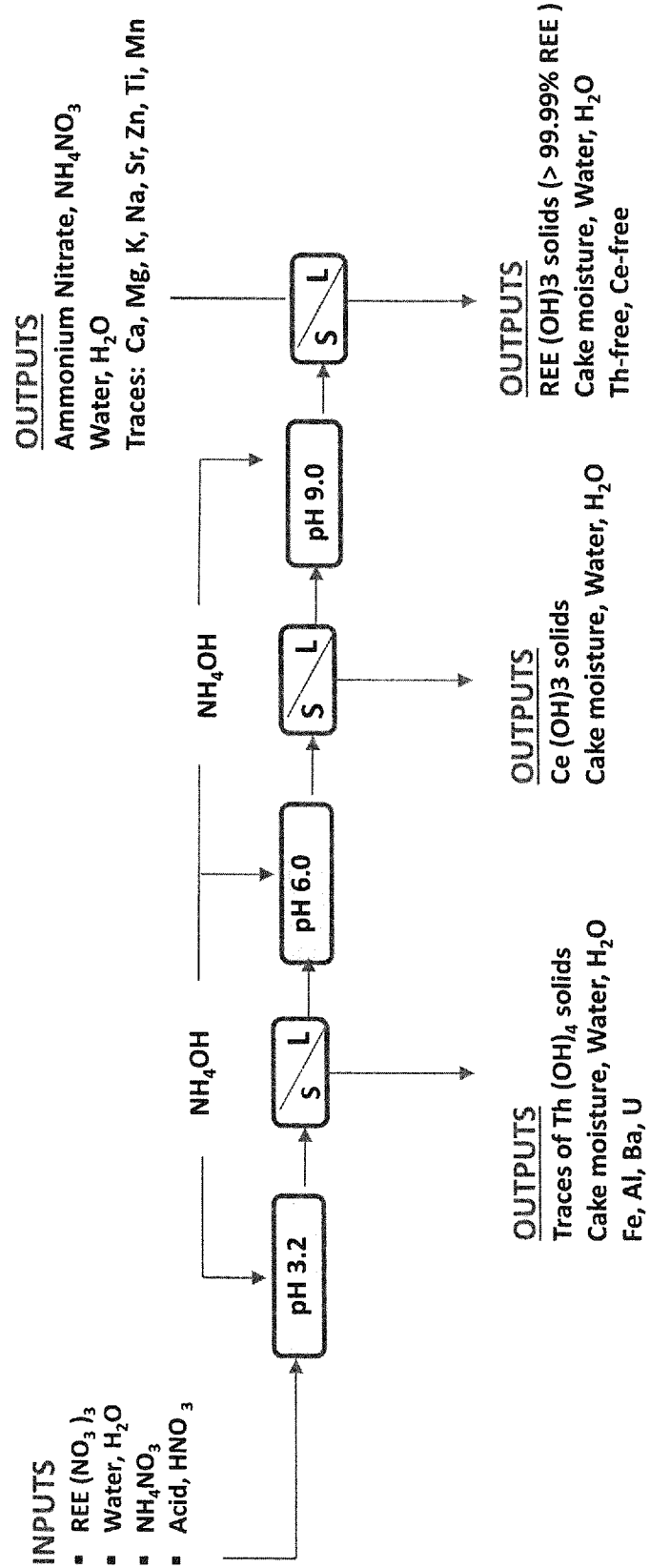
FIG. 17 is a schematic flowsheet illustrating the removal of base metals from an REE-containing product in a purification circuit.

As illustrated in FIG. 17, the step of precipitating non-REEs from the REE-containing acidic solution includes contacting the REE-containing acidic solution with a hydroxide compound, such as ammonium hydroxide, to increase the pH of the REE-containing acidic solution to a first pH and precipitate at least one element selected from the group consisting of thorium, iron, aluminum, barium and uranium and form a first treated REE-containing acidic solution. The first pH may be at least about pH 2.8 and not greater than about pH 3.6. As illustrated in FIG. 17, the first pH is about pH 3.2. In one particular characterization, the REE-containing acidic solution includes uranium (e.g., traces of uranium) and substantially all of the uranium precipitates from the REE-containing acidic solution when contacted with the hydroxide compound in the first precipitation stage.

The method illustrated in FIG. 17 also includes contacting the first treated REE-containing acidic solution (i.e., after the first stage) with a hydroxide compound to further increase the pH of the REE-containing acidic solution and precipitate cerium from the REE-containing acidic solution and form a second treated REE-containing acidic solution. The second pH may be at least about pH 4.5 and may be not greater than about pH 6.0. As illustrated in FIG. 17, the second pH is about pH 6.0.

The purification method may also include the step of contacting the second treated REE-containing acidic solution (i.e., from the second precipitation stage) with a hydroxide compound to further increase the pH of the REE-containing acidic solution to a third pH of at least about pH 8.5 and not greater than about pH 9 to precipitate a high purity REE-rich product and form a raffinate comprising at least one metal selected from the group consisting of calcium, magnesium, potassium, sodium, strontium, zinc, titanium and manganese. It is believed that increasing the pH substantially above about pH 9 will result in the precipitation of some base metals with the REEs, thus reducing the purity of the REE-rich precipitation product. As illustrated in FIG. 17, the third pH is about pH 9.0.

The output from the process illustrated in FIG. 17 includes a very high purity REE-containing product, e.g., REE-hydroxide ($RE(OH)_3$) precipitates. The high purity REE-rich product may comprise at least 99.9 wt. % REEs on metals basis, such as at least 99.95 wt. % REEs, or even at least 99.99 wt. (Y0 REEs or higher on metals basis. In other characterizations, the high purity REE product that is output from this purification process may comprise not substantially no Th, U, Ce and/or base metals. For example, the high purity REE-containing product may comprise not greater than 0.2 wt. % cerium on metals basis, such as not greater than about 0.1 wt. % cerium on a metals basis. This product may serve as a feed for the ultimate separation of one or more REEs from the REE-containing product.

Thus, according to another embodiment of the present disclosure, a method for the separation of lanthanum from an REE-containing acidic solution is disclosed. In one characterization, the REE-containing acidic solution may comprise or be derived from the purification circuit illustrated in FIG. 17 (e.g., from the REE-hydroxide solid precipitates produced by the purification circuit), and/or may be derived from the thorium removal and/or cerium solvent extraction separation circuits illustrated in FIGS. 15 and 16, respectively. Thus, in certain characterizations, the REE-containing acidic solution may comprise not greater than about 0.2 wt. % cerium on a metals basis. In another characterization, the REE-containing acidic solution may comprise not greater than about 0.01 wt. % thorium on a metals basis. In yet another characterization, the REE-containing acidic solution may comprise not greater than about 1 wt. % total base metals on a metals basis, such as not greater than about 0.1 wt. % base metals on a metals basis.

Such low levels of these undesirable elements may be achieved by applying one or more of the processes illustrated above. However, it is to be understood that the method for the separation of lanthanum may be applied to a variety of REE-containing acidic solutions that may or may not comprise thorium, base metals and/or cerium. Thus, in another characterization, the REE-containing acidic solution that is treated in the lanthanum separation circuit may comprise at least about 10 wt. % cerium, and may comprise not greater than about 60 wt. % cerium on a metals basis. The REE-containing acidic solution that is treated in the lanthanum separation circuit may also comprise up to about 2.5 wt. % thorium on a metals basis. In a further characterization, the REE-containing acidic solution that is treated in the lanthanum separation circuit may have a relatively high purity with respect to REEs. Thus, the REE-containing solution may comprise at least 99 weight % REEs on a metals basis, such as at least about 99.8 weight % or even at least 99.99 weight % REEs on a metals basis. Among the REEs, the REE-containing acidic solution may comprise at least about 25 weight % lanthanum on a metals basis, and may even comprise at least about 50 weight % lanthanum on a metals basis. As is noted above with respect to cerium, lanthanum may constitute a relatively large proportion of the REEs, particularly if cerium has been previously removed, and the separation of lanthanum before separation of the other REEs (e.g., the CREEs) may be advantageous with respect to the capital expenditures and/or operating expenses associated with REE separation.

Broadly stated, the method for the separation of lanthanum may include contacting an REE-containing acidic solution with a SEG/HREE selective extractant to selectively extract at least a portion of the other REEs from the REE-containing acidic solution and leave substantially all of the lanthanum in the REE-containing acidic solution. The other REEs may include SEG (samarium, europium and gadolinium) and/or HREEs (terbium, dysprosium, holmium, erbium, thulium, ytterbium, lutetium, and yttrium). The contacting step thus forms a lanthanum-rich raffinate and a SEG/HREE loaded extractant phase. The method may include recovering the extracted other REEs from the SEG/HREE loaded extractant phase to form a SEG/HREE-depleted extractant, and may include recovering lanthanum from the lanthanum-rich raffinate.

Figure 18:
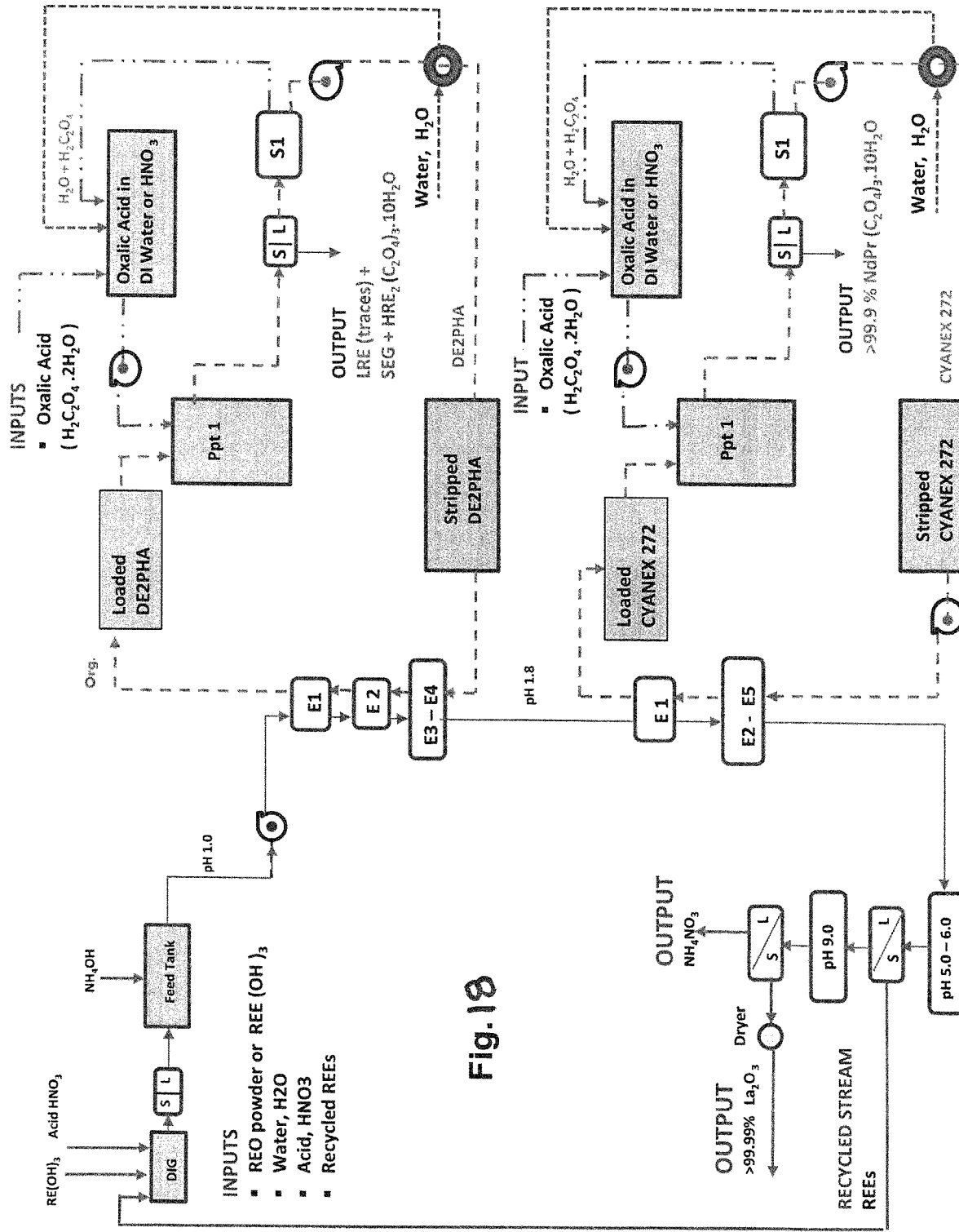
FIG. 18 is a schematic flowsheet illustrating the separation of lanthanum and the separation of Nd/Pr from an REE-containing product by solvent extraction.

Referring now to FIG. 18, a circuit for the separation of lanthanum from other REEs, and also for the separation of Nd/Pr (neodymium and/or praseodymium) is illustrated. As is illustrated in FIG. 18, a REE-containing product, such as REE-hydroxides or REE-oxides, is digested in a digestion step to solubilize the REEs. If necessary, the acidity of the REE-containing acidic solution may be adjusted (e.g., may be decreased), such as by contacting the REE-containing acidic solution with a neutralizing agent, e.g., with ammonium hydroxide ($NH_4OH$). In any event, in one characterization the REE-containing acidic solution that is conveyed (e.g., pumped) to the contacting step may have an acidity of at least about 0.0008M, such as at least about 0.01M. In another characterization, the REE-containing acidic solution that is conveyed to the contacting step may have an acidity of not greater than about 0.15M, such as not greater than about 0.1M. It is believed that these acidity levels are desirable for selectively extracting SEG and HREEs from the REE-containing acidic solution.

As is illustrated in FIG. 18, the REE-containing acidic solution is contacted with the SEG/HREE selective extractant in at least a first contacting step (E1) to extract SEG and/or HREEs from the REE-containing acidic solution. In one characterization, the SEG/HREE selective extractant is phosphoorganic compound. For example, the SEG/HREE selective extractant may comprise Di(2-ethylhexyl) phosphate ("DEHPA" or "$D_2EHPA$"). The SEG/HREE selective extractant will typically be dispersed within a diluent, e.g., a hydrocarbon diluent such as kerosene. It has been found that under the general conditions described herein, a phosphoorganic extractant will selectively extract SEG and HREEs from the REE-containing acidic solution, while a substantial portion of other REEs (e.g., La, Nd and Pr) remain in the (lanthanum-depleted) raffinate exiting the contacting step.

The step of contacting the REE-containing acidic solution with the SEG/HREE selective extractant may be carried out in a single contacting step, e.g., in a single mixer-settler apparatus. As is illustrated in FIG. 18, the step of contacting the REE-containing acidic solution with the SEG/HREE selective extractant includes multiple contacting steps, e.g., using two or more mixer-settlers that are fluidly connected in series (e.g., E1, E2, etc.). For example, a first contacting step may be utilized wherein the REE-containing acidic solution is contacted with the SEG/HREE selective extractant to extract a first portion of the other REEs from the REE-containing acidic solution and leave substantially all of the lanthanum in the acidic solution, whereby a first lanthanum-rich raffinate and a first SEG/HREE loaded extractant phase are formed. A second contacting step (e.g., in a second mixer-settler apparatus) may then be utilized, wherein the first lanthanum-rich raffinate is contacted with the SEG/HREE selective extractant to extract at least a second portion of the other REEs from the first lanthanum-rich raffinate, whereby a second lanthanum-rich raffinate and a second SEG/HREE loaded extractant phase are formed.

While more than two separate contacting steps may be utilized, on one characterization the step of contacting the REE-containing acidic solution with the SEG/HREE selective extractant comprises no more than three separate contacting steps (e.g., employing no more than 3 separate mixer settlers fluidly connected in series).

The step of recovering the extracted SEG and HREEs from the SEG/HREE loaded extractant phase may include stripping the SEG and HREEs from the SEG/HREE loaded extractant phase. For example, the SEG/HREE loaded extractant phase may be contacted with SEG/HREE loaded extractant phase with an acid.

Alternatively, the step of recovering the extracted other REEs from the SEG/HREE loaded extractant phase may comprise contacting the SEG/HREE loaded extractant phase with a precipitative medium to precipitate the other REEs (e.g., SEG and HREEs) from the SEG/HREE loaded extractant phase and form a SEG/HREE depleted extractant. In one characterization, the precipitative medium is an organic acid, and in one particular refinement the precipitative medium comprises oxalic acid ($H_2C_2O_4$). In this manner, the other REEs (e.g., SEGs and HREEs) are precipitated as REE-oxalates. Advantageously, this reaction to form REE-oxalates may occur very rapidly and may even be characterized as being essentially instantaneous. Characterized another way, the SEG and HREEs may be completely precipitated from the SEG/HREE loaded extractant phase in less than about 1 minute, less than about 30 seconds, and even less than about 10 seconds.

After contacting the SEG/HREE loaded extractant phase with the precipitative medium (oxalic acid) to precipitate the other REEs from the SEG/HREE loaded extractant phase, the oxalate precipitates are separated in a liquid/solid separation step. As illustrated in FIG. 18, in addition to SEG and HREEs, the oxalate precipitate may also include small amounts (trace amounts) of LREEs. After separation, the SEG/HREE depleted extractant is dispersed in oxalic acid. The SEG/HREE depleted extractant may then be scrubbed with, e.g., with water. After scrubbing, the SEG/HREE depleted extractant (e.g., stripped DE2PHA) may advantageously be recycled back to the step of contacting the REE-containing acidic solution with a SEG/HREE selective extractant. Further, the oxalic acid may be recycled back to the step of contacting the SEG/HREE loaded extractant phase with the precipitative medium, where it is combined with fresh oxalic acid. Fresh (make-up) oxalic acid is only necessary to replace the oxalic acid that is output with the REE-oxalates.

As is discussed above, the lanthanum-rich raffinate comprises La and may also comprise at least one LREE selected from Nd, Pr and combinations thereof. Typically, the lanthanum-rich raffinate will comprise valuable quantities of both Nd and Pr.

Referring to the lower one-half of FIG. 18, a process for separating neodymium and praseodymium (Nd/Pr) from the La is schematically illustrated. Broadly speaking, the method may include contacting the lanthanum-rich raffinate with a Nd/Pr selective extractant to extract at least a portion of the Nd/Pr from the lanthanum-rich raffinate, whereby a Nd/Pr-depleted raffinate and an Nd/Pr-loaded extractant phase are formed. The extracted Nd/Pr may then be recovered from the Nd/Pr-loaded extractant phase to form a Nd/Pr-depleted extractant.

The Nd/Pr-depleted raffinate will comprise appreciable quantities of lanthanum and will also comprise nitric acid. To recover lanthanum, the Nd/Pr-depleted raffinate may be contacted with a hydroxide precipitant (e.g., ammonium hydroxide) to precipitate a lanthanum product having a high purity. The step of contacting the Nd/Pr-depleted raffinate with a hydroxide precipitant may be a multi-step process where the Nd/Pr-depleted raffinate is first contacted with the hydroxide precipitant to increase the pH of the lanthanum-rich raffinate to a first pH (e.g., at least about pH 5.0 and not greater than about pH 6.0) to selectively precipitate other REEs from the Nd/Pr-depleted raffinate. In this manner, any trace REEs in the Nd/Pr-depleted raffinate may be recovered (e.g., may be recycled to acid digestion), and the purity of the lanthanum end-product may be increased. After separating the other REE precipitates from the Nd/Pr-depleted raffinate, the Nd/Pr depleted raffinate may again be contacted with the hydroxide precipitant to further increase the pH of the Nd/Pr depleted raffinate to a second pH (e.g., at least about pH 8.5 and is not greater than about pH 10), where the second pH is greater than the first pH, to precipitate the lanthanum product of high purity. For example, on a metals basis, the lanthanum product may comprise at least 99 wt. % lanthanum, at least 99.5 wt. % lanthanum, or event at least 99.9 wt. % lanthanum.

Referring back to the Nd/Pr portion of the circuit (i.e., the lower right quadrant of FIG. 18), the Nd/Pr selective extractant may comprise a phosphinic-type acid, such as bis(2,4, 4-trimethylpentyl)phosphinic acid, and the extractant will typically be dispersed in an inert hydrocarbon diluent such as kerosene. During the step of contacting the lanthanum-rich raffinate with the Nd/Pr selective extractant, the acidity of the lanthanum-rich raffinate may be at least about 0.0002M, and is typically not greater than about 0.018M. The contacting of the lanthanum-rich raffinate with the Nd/Pr selective extractant may be carried out in counter-current flow in one or more mixer-settlers. In one characterization, the contacting of the lanthanum-rich raffinate with the Nd/Pr selective extractant is carried out in a single contacting step, e.g., in a single mixer-settler. Alternatively, and as illustrated in FIG. 18, the step of contacting the lanthanum-rich raffinate with the Nd/Pr selective extractant includes a first contacting step wherein the lanthanum-rich raffinate is contacted with the Nd/Pr selective extractant to extract at least a first portion of the Nd/Pr from the lanthanum-rich raffinate, whereby a first Nd/Pr-depleted raffinate and a first Nd/Pr-loaded extractant phase are formed. The method then includes at least a second contacting step, wherein the first Nd/Pr-depleted raffinate is contacted with the Nd/Pr selective extractant to extract at least a second portion of the Nd/Pr from the first Nd/Pr-depleted raffinate, whereby the Nd/Pr-depleted raffinate and a second Nd/Pr loaded extractant phase are formed.

The Nd/Pr may then be recovered from the Nd/Pr loaded extractant phase. In one characterization, the recovering of the extracted Nd/Pr from the Nd/Pr-loaded extractant phase includes the step of stripping the Nd/Pr from the Nd/Pr-loaded extractant phase, e.g., using an acid. In another characterization, the method includes contacting the Nd/Pr-loaded extractant phase with a precipitative medium to precipitate Nd/Pr from the Nd/Pr-loaded extractant phase and form a Nd/Pr-depleted extractant. As with the SEG and HREE circuit illustrated in the top right quadrant of FIG. 18, the precipitative medium may be an organic acid, such as oxalic acid, wherein the Nd/Pr is precipitated as Nd-oxalate and Pr-oxalate. Again, this precipitation step may advantageously occur very rapidly and may even be characterized as being essentially instantaneous. Characterized another way, the Nd/Pr may be completely precipitated from the Nd/Pr loaded extractant phase in less than about 1 minute, less than about 30 seconds, and even less than about 10 seconds.

The Nd/Pr-depleted extractant will be dispersed in oxalic acid. The method may therefore include separating the Nd/Pr depleted extractant from the oxalic acid and recycling the Nd/Pr depleted extractant to the step of contacting the lanthanum-rich raffinate with the Nd/Pr selective extractant. The oxalic acid may be recycled, e.g., to the step of precipitating Nd/Pr from the Nd/Pr-loaded extractant phase. Again, it is noteworthy that these reagents remain in a closed loop circuit and the only input required to the circuit is additional oxalic acid to replace the oxalic acid that is lost with the precipitation of the Nd/Pr as oxalates.

In accordance with the foregoing method, at least about 95% of the Nd/Pr in the lanthanum-rich raffinate may be separated from the lanthanum-rich raffinate. For example, at least about 99% of the Nd/Pr, or even at least about 99.5% of the Nd/Pr in the lanthanum-rich raffinate may be separated from the lanthanum-rich raffinate. Further, the Nd/Pr may advantageously be of very high purity. In one particular characterization, the REE-containing acidic solution that is contacted with the SEG/HREE selective extractant comprises or is derived from the high purity REE-rich product produced by the circuit illustrated in FIGS. 15-17, either alone or in any or sub-combination.

The circuit illustrated in FIG. 18 produces SEG and HREEs (possibly with some traces of LREEs such as Nd/Pr) as an output from the circuit, e.g., as a mixed powder of REE-oxalates. See the upper right quadrant of FIG. 18. In accordance with another embodiment of the present disclosure, the SEG and the HREES may be refined to remove traces of LREEs and may be separated from each other in a further separation circuit.

Figure 19:
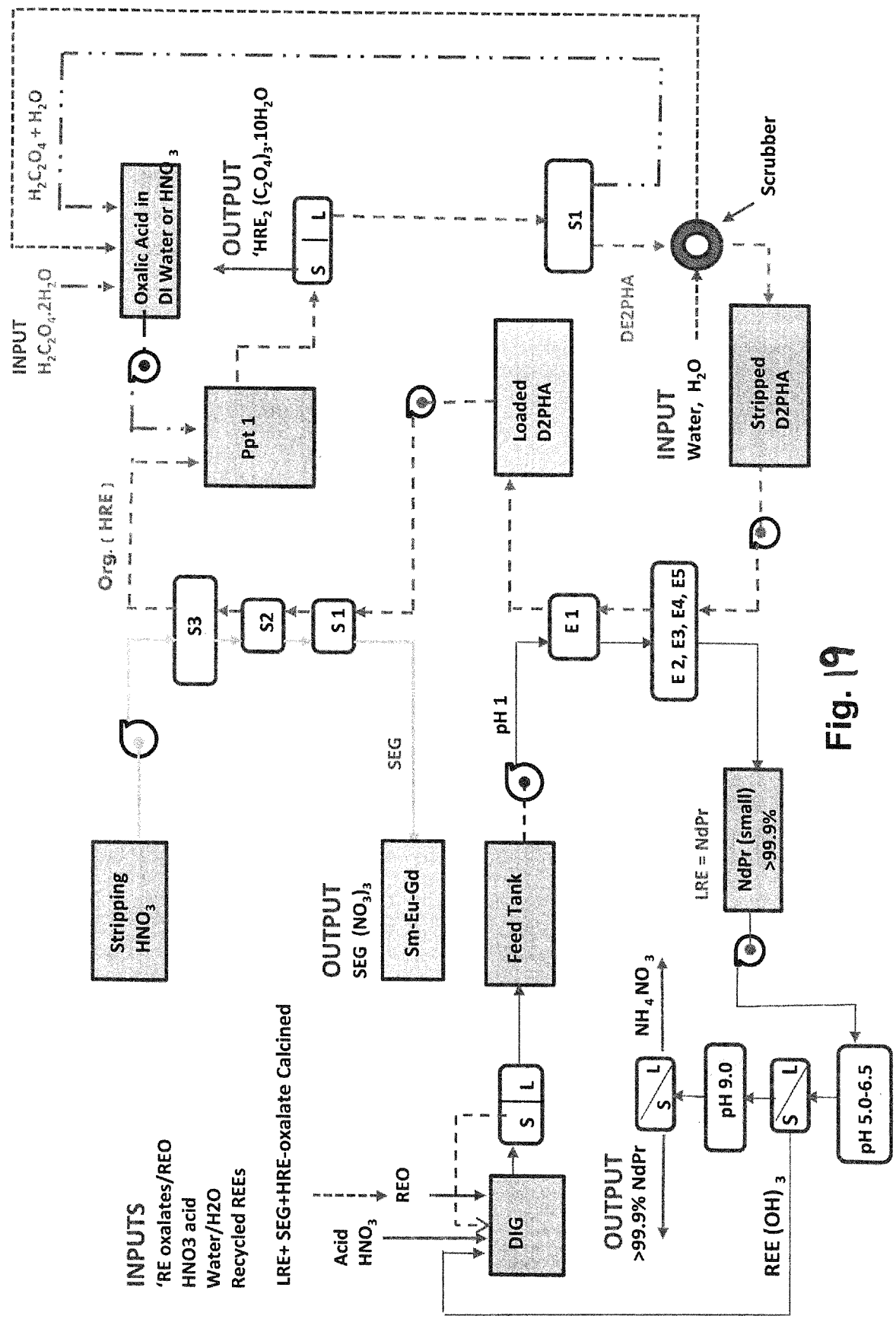
FIG. 19 is a schematic flowsheet illustrating the separation of HREEs and SEG from an REE-containing product by solvent extraction.

FIG. 19 illustrates a circuit for the separation of Nd/Pr (e.g., traces) from SEGs and HREEs contained in an REE-containing acidic solution. Referring generally to the lower left quadrant of FIG. 19, the process may include an optional first step of contacting the REE-containing acidic solution with a SEG/HREE selective extractant to extract at least a portion of the SEGs and HREEs from the REE-containing acidic solution and leave substantially all Nd/Pr in the REE-containing acidic solution, whereby a Nd/Pr raffinate and a SEG/HREE loaded extractant phase are formed. The Nd/Pr may be recovered from the Nd/Pr raffinate. At least a portion of the SEGs and HREEs may be recovered from the SEG/HREE loaded extractant phase.

In one characterization, the SEG/HREE selective extractant comprises a phosphoorgranic compound, such as Di(2-ethylhexyl) phosphate (D2PHA), which is typically dispersed in an inert hydrocarbon diluent such as kerosene. The REE-containing acidic solution may comprise nitric acid and may have an acidity of at least about 0.0008M (about pH 3.1), such as at least about 0.01M (about pH 2) to facilitate the selective extraction of the SEG/HREEs from the LREEs. Further, the acidic solution may have an acidity of not greater than about 0.15M (about pH 0.82), such as not greater than about 0.1M (about pH 1). The REE-containing acidic solution may comprise or be derived from circuits illustrated in FIGS. 15-18, and in one example is derived from the mixture of SEG-oxalates and HREE-oxalates formed as an output from FIG. 18. Thus, the REE-containing acidic solution may have a very high purity with respect to REEs. In certain characterizations, the REE-containing acidic solution comprises at least 99 wt. % REEs on a metals basis, such as at least 99.8 wt. % REEs on a metals basis, or even at least about 99.99 wt. % REEs on a metals basis.

The step of contacting the REE-containing acidic solution with the SEG/HREE selective extractant may be carried out in counter-current flow, such as in one or more mixer-settlers. Contacting of the REE-containing acidic solution with the SEG/HREE selective extractant may be carried out in a single contacting step (e.g., in a single mixer-settler apparatus), or may be carried out in multiple contacting steps (e.g., in two or more mixer-settlers that are fluidly connected in series). For example, the REE-containing acidic solution may be first contacted with the SEG/HREE selective extractant to extract a first portion of the SEG/HREEs from the REE-containing acidic solution and leave substantially all of the Nd/Pr in the acidic solution, whereby a first Nd/Pr raffinate and a first SEG/HREE loaded extractant phase are formed. The first Nd/Pr-rich raffinate may then be contacted with the SEG/HREE selective extractant to extract at least a second portion of the SEG/HREEs from the first Nd/Pr raffinate, whereby a second Nd/Pr raffinate and a second SEG/HREE loaded extractant phase are formed.

As is noted above, the solvent extraction circuit may also include recovering the SEG/HREEs from the SEG/HREE loaded extractant phase, and may include separating the SEG and the HREEs. Separating the SEGs and the HREEs may comprise stripping the SEG/HREE loaded extractant phase, e.g., with an acid, to selectively strip the SEG from the SEG/HREE loaded extractant phase.

After the step of stripping the SEG/HREE loaded extractant phase to extract SEG, the resulting HREE loaded extractant phase may be contacted with a precipitative medium to precipitate the HREEs from the HREE loaded extractant phase and form an SEG/HREE depleted extractant. The precipitative medium may be an organic acid, such as oxalic acid. When the organic acid is oxalic acid, the HREEs are precipitated as HREE-oxalates. The resulting SEG/HREE depleted extractant will be dispersed in oxalic acid and the two phases may be separated for recycling within the circuit. For example, the SEG/HREE depleted extractant may be recycled to the step of contacting the REE-containing acidic solution with the SEG/HREE selective extractant, and the oxalic acid may be recycled back to the step of contacting the SEG/HREE loaded extractant phase with the precipitative medium.

Again, it is noteworthy that the foregoing solvent extraction circuits may operate as essentially closed circuits, wherein the only required inputs are fresh oxalic acid (e.g., to replace oxalic acid lost with REE-oxalate precipitates) and water. The outputs from the system include a "basket" of very high purity HREES and a "basket" of very high purity SEG. Further, trace amounts of Nd/Pr of very high purity may also be recovered.

Another embodiment of the present disclosure is directed to a "scavenger" circuit (e.g., a process) for the removal/extraction of trace metals from a bulk metal. That is, the scavenger method is useful for recovering the small amounts of valuable elements from a different bulk metal, and/or for purifying the bulk metal by the removal of the trace metal.

Figure 20:
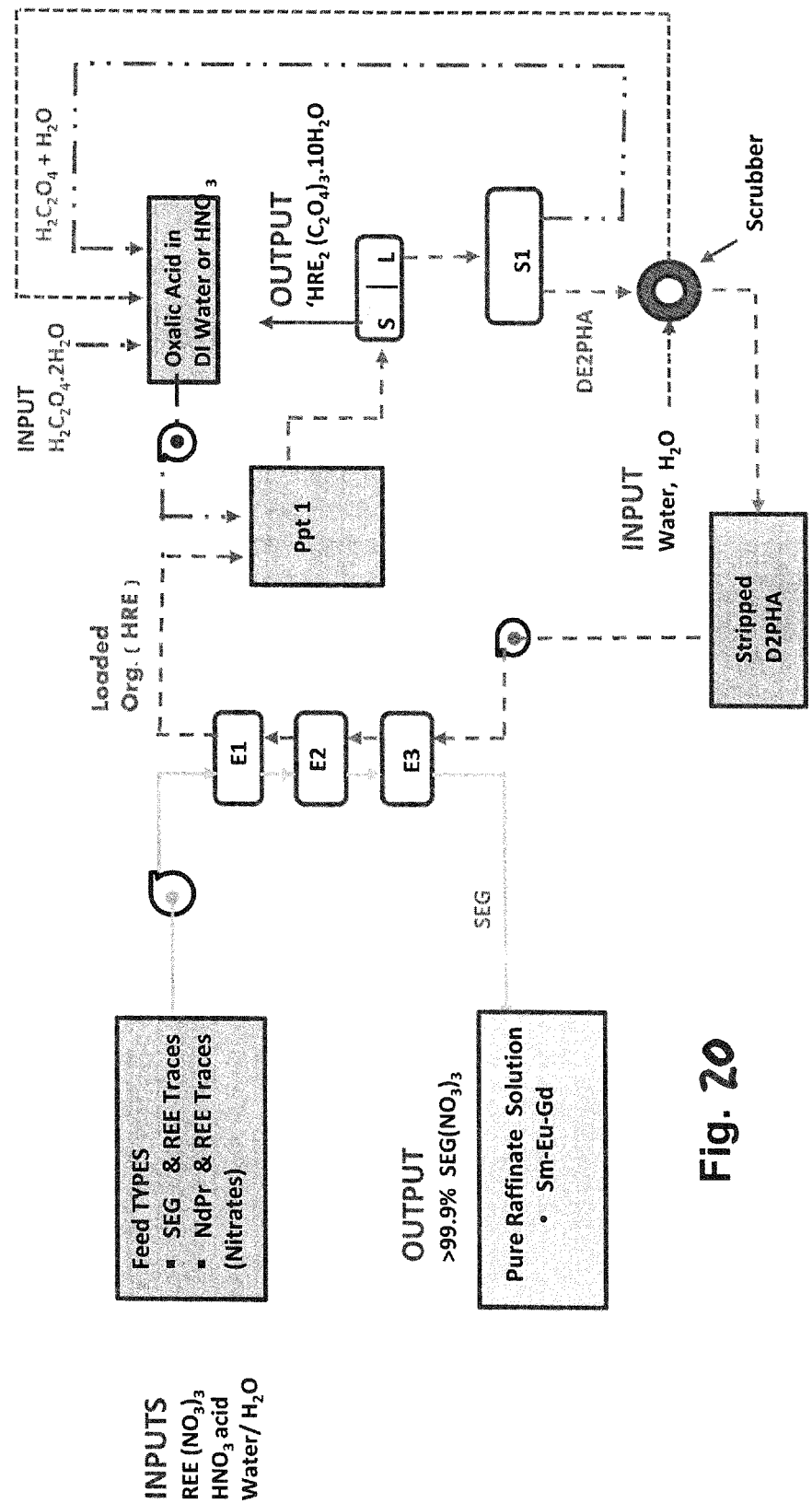
FIG. 20 is a schematic flowsheet illustrating a scavenger circuit to recover traces of REEs from other bulk REEs by selective precipitation.

As illustrated in FIG. 20, a method for the separation of at least one trace metal from at least one bulk metal is schematically illustrated. The method includes contacting an REE-containing acidic solution that that includes at least one trace metal and at least one bulk metal with a trace metal selective extractant to extract at least a portion of the at least one trace metal from the REE-containing acidic solution and form a trace metal loaded extractant phase. This leaves substantially all of the bulk metal in the REE-containing acidic solution in the form of a bulk metal rich raffinate. The trace metal may then be recovered from the trace metal loaded extractant phase, and the at least one bulk metal may be recovered from the bulk metal rich raffinate.

In one characterization, the bulk metal is selected from the group consisting of samarium, europium, gadolinium and mixtures thereof. In another characterization, the bulk metal is selected from the group consisting of neodymium, praseodymium and mixtures thereof. In yet another characterization, the trace metals comprise one or more HREEs, e.g., terbium, dysprosium, holmium, erbium, thulium, ytterbium, lutetium, yttrium and combinations thereof.

Although it may be possible to utilize various extractants (e.g., organic extractants), the trace metal selective extractant may comprise a phosphoorgranic compound, such as Di(2-ethylhexyl) phosphate. The trace metal selective extractant will typically be dispersed in an inert hydrocarbon diluent such as kerosene for solvent extraction.

In certain characterizations, the REE-containing acidic solution comprises nitric acid. For example, the REE-containing acidic solution may have an acidity of at least about 0.0008M (about pH 3.1), such as at least about 0.01M (about pH 2). The acidity may also be not greater than about 0.15M (about pH 0.82), such as not greater than about 0.1M (about pH 1). The REE-containing acidic solution may be of high purity with respect to REEs and in one characterization may comprise at least 99 wt. % REEs on a metals basis, such as at least 99.9 wt. % REEs, or even at least 99.99 wt. % REEs on a metals basis.

The step of contacting the REE-containing acidic solution with the trace metal selective extractant may be carried out in counter-current flow in a mixer-settler apparatus, and advantageously may be carried out in a single contacting step, although the contacting step may also be carried out in multiple steps (e.g., using multiple mixer-settlers that are fluidly connected in series). In one characterization, the contacting step may include a first contacting step wherein the REE-containing acidic solution is contacted with the trace metal selective extractant to extract a first portion of the trace metals from the REE-containing acidic solution and leave substantially all of the bulk metals in the acidic solution, whereby a first bulk metal rich raffinate and a first trace metal loaded extractant phase are formed. The first bulk metal rich raffinate may then be contacted with the trace metal selective extractant in a second step (e.g., in a second mixer-settler) to extract at least a second portion of the trace metals from the first bulk metal rich raffinate, whereby a second bulk metal rich raffinate and a second trace metal loaded extractant phase are formed.

The recovery of the trace metals from the trace metal loaded extractant phase may advantageously include contacting the trace metal loaded extractant phase with a precipitative medium to precipitate the trace metals from the trace metal loaded extractant phase and form a trace metal depleted extractant. The precipitative medium may be an organic acid such as oxalic acid, whereby the trace metals are precipitated as oxalate compounds. This method may further include separating the trace metal depleted extractant from the oxalic acid, such that the trace metal depleted extractant may be recycled to the step of contacting the REE-containing acidic solution with the trace metal selective extractant, and the oxalic acid may be recycled back to the step of contacting the trace metal loaded extractant phase with the precipitative medium. Thus, the recovery of such trace metals can be achieved in an essentially closed-loop circuit where the only reagent inputs beyond the startup phase are water and relatively small amounts of oxalic acid to replace the oxalic acid that is lost with the trace metal oxalates.

Another process according to the present disclosure may be applied to certain products to increase the purity of the products and/or to recover traces of valuable metals from the products. In one embodiment, a method for the purification of an acidic REE-rich acidic solution is disclosed. The method may include three distinct precipitation steps, namely:

first contacting an REE-rich acidic solution (e.g., comprising solubilized metals in a nitric acid solution) with a precipitant to increase the pH to at least about pH 2.8 and to not greater than about pH 3.1 to precipitate at least a first metal from the REE-rich acidic solution, the first metal being selected from the group consisting of Th, Fe, Al, Ba, U and mixtures thereof;

second contacting, after the first contacting, the REE-rich acidic solution with a precipitant to further increase the pH to at least about pH 4.8 and to not greater than about pH 6.5 to precipitate at least a second metal from the REE-rich acidic solution, the second metal being selected from the group consisting of cerium, terbium, dysprosium, holmium, erbium, thulium, ytterbium, lutetium, yttrium and mixtures thereof; and third contacting, after the second contacting, the REE-rich acidic solution with a precipitant to further increase the pH to at least about pH 8.5 and to not greater than about pH 9 to precipitate at least a third metal from the REE-rich acidic solution, the third metal being selected from the group consisting of calcium, magnesium, potassium, sodium, strontium, zinc, titanium, manganese and mixtures thereof.

In one characterization, the REE-rich acidic solution comprises at least about 98 wt. lanthanum on a metals basis. In another characterization, the REE-rich acidic solution comprises at least about 98 wt. % Nd/Pr on a metals basis.

In accordance with the foregoing disclosure, the various methods and circuits may be implemented as stand-alone processes, or may be integrated into a complete process for the separation of REEs and the removal of non-REEs (e.g., Th, U and/or base metals). In this integrated process, the products which are produced as high purity oxalates are Ce-oxalate, Th-oxalate and HREE-oxalates. The products that are recovered as hydroxides are high purity $REE(OH)_3$, $La(OH)_3$, $Nd(OH)_3$ and $Pr(OH)_3$. It can be seen that the portion of oxalic acid that is constantly being lost is due to cerium (e.g., about 38% to 43% of the feed REO product), thorium (e.g., up to about 2.4% of the feed REO product) and HREEs (e.g., up to about 3% of the feed REO product). This represents almost 50% of total feed REO product solids being removed as oxalates. If the consumption of oxalates becomes a cost concern, a metathesis reaction such as $Na_2CO_3+REE\text{-oxalates}\rightarrow Na\text{-oxalates}+REECO_3$ may be utilized to store Na-oxalates and consume the less expensive sodium carbonate. The Na-oxalate powder may be stored as it has ~2.5 times the value of $Na_2CO_3$ and can be sold to offset the cost of oxalic acid. Thus, the only consumed reagent in the extraction plant would be sodium carbonate, a diluent (e.g., kerosene) and extractants plus ammonium hydroxide and $HNO_3$.

EXAMPLES

Low Temperature Leach

Figure 21:
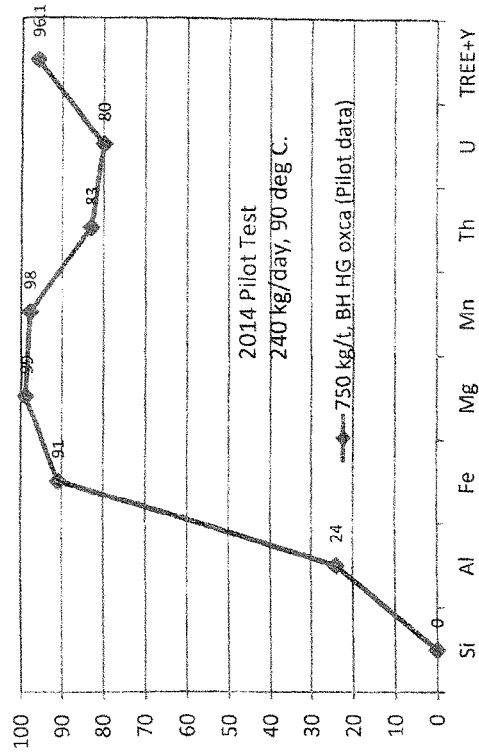
FIG. 21 illustrates acid leach results for leaching a high-grade (HG) bastnaesite-based mineral ore where the rare earth elements are predominately in the form of rare earth oxides.

FIG. 21 illustrates the acid leach results for leaching a high-grade (HG) bastnaesite-based mineral ore where the rare earth elements are predominately in the form of rare earth oxides. In this comparative example, the leaching is carried out with a 22% HCl solution at 90° C. In one test, 788 kg of acid per tonne of ore (kg/t) is utilized and in another test 654 kg/t of the acid is used. As can be seen in FIG. 21, the recovery of total rare earth elements (TREEs) is high (83% to 87%), however the selectivity is poor and substantial quantities of Al, Fe, Mg and Mn also report to the PLS. Further, 60% to 71% of the thorium also reports to the PLS.

Figure 22:
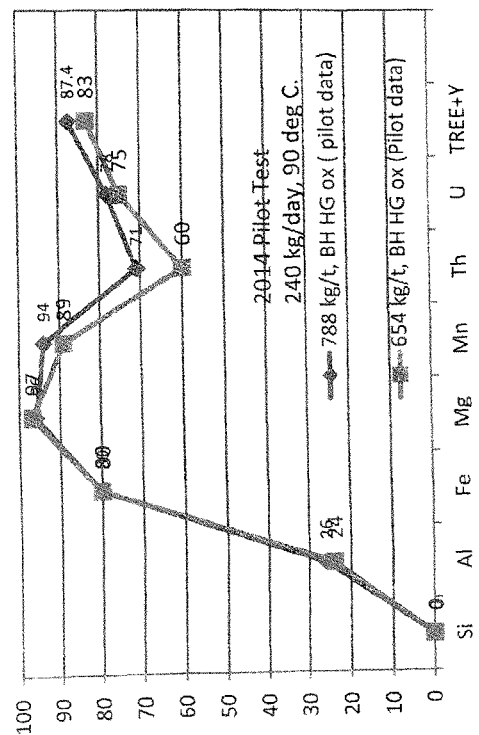
FIG. 22 illustrates acid leach results for leaching a high-grade (HG) bastnaesite-based mineral ore where the rare earth elements are predominately in the form of rare earth carbonates.

FIG. 22 illustrates the acid leach results for leaching a high-grade (HG) bastnaesite-based mineral ore where the rare earth elements are in the form of rare earth carbonates. In this comparative example, the leaching is carried out with a 22% HCl solution at 90° C. and 750 kg/t of acid is utilized. As can be seen in FIG. 22, the recovery of TREEs is high (~96%), however the selectivity is poor and substantial quantities of Al, Fe, Mg and Mn also report to the PLS. Further, 83% of the thorium also reports to the PLS.

Figure 23:
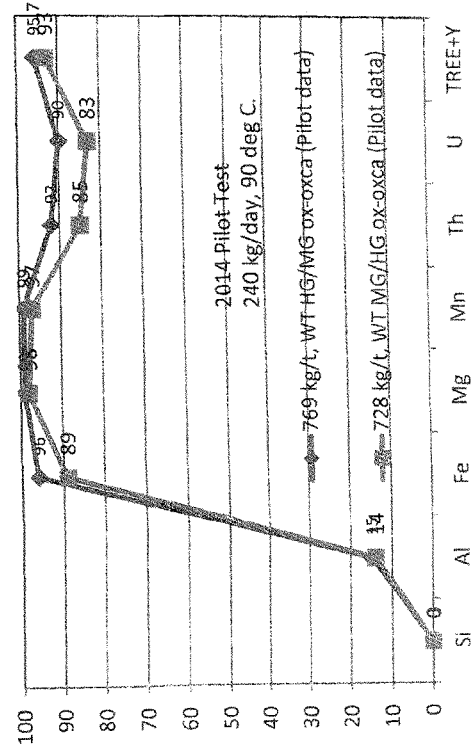
FIG. 23 illustrates the acid leach results for leaching a high-grade (HG) bastnaesite-based mineral ore where the rare earth elements are in the form of rare earth carbonates and rare earth oxides.

FIG. 23 illustrates the acid leach results for leaching a high-grade (HG) bastnaesite-based mineral ore where the rare earth elements are in the form of rare earth carbonates and rare earth oxides. In this comparative example, the leaching is carried out with a 22% HCl solution at 90° C. In one test, 769 kg/t of acid is utilized and in another test 728 kg/t of the acid is used. As can be seen in FIG. 23, the recovery of TREEs is high (93% to 95.7%), however selectivity is poor and substantial quantities of Al, Fe, Mg and Mn also report to the PLS. Further, 85% to 92% of the thorium also reports to the PLS.

Figure 24:
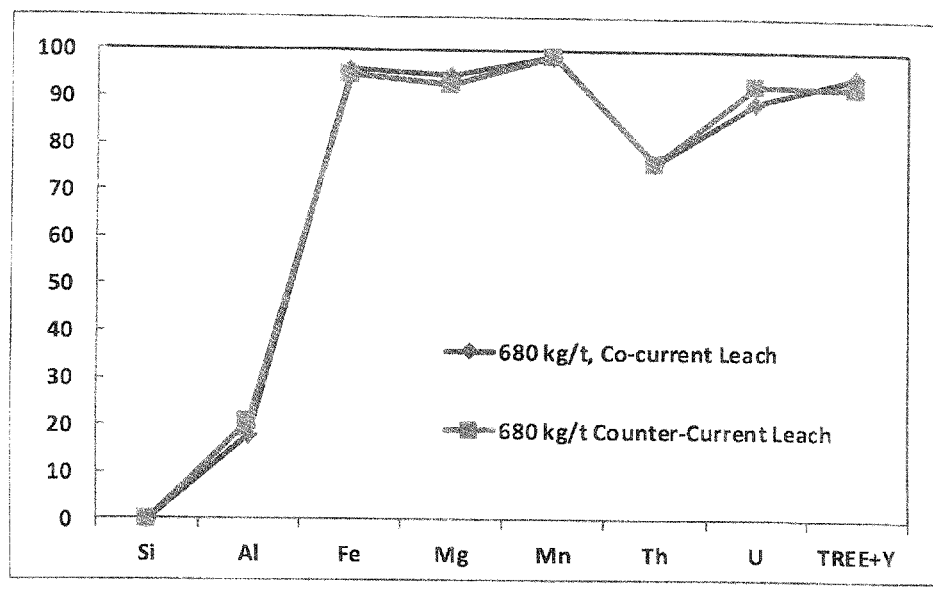

FIG. 24 illustrates the acid leach results for leaching a mid-grade bastnaesite-based mineral ore where the rare earth elements are in the form of rare earth carbonates and rare earth oxides. In this comparative example, the leaching is carried out with a 22% HCl solution at 90° C. and in each test 680 kg/t of acid is utilized. In one test, a co-current leach configuration is utilized and in a second test a counter-current leach configuration is used. As can be seen in FIG. 24, digestion of REEs and gangue minerals in HCl is relatively high irrespective of the leach configuration.

FIGS. 25-30 illustrate the results of various leaching tests in accordance with the low temperature leaching step of the present disclosure. FIG. 25 illustrates the results from leaching a mid-grade bastnaesite mineral ore body (Composition B) comprising REEs in the form of oxides and carbonates. In this example, the leaching is carried out with a 22% HCl solution at 20° C. 112 kg/t of the acid is utilized. As can be seen in FIG. 25, the recovery of TREEs is relatively high (80%), and the selectivity is good. Notably, less than 10% of the Fe reports to the PLS and reduced quantities of other elements such as Mg and Mn also report to the PLS. Further, the amount of thorium reporting to the PLS is only about 55%.

FIG. 26 illustrates the results from leaching the mid-grade bastnaesite mineral ore body (Composition B) comprising REEs in the form of oxides and carbonates. In this example, the leaching is carried out with a 22% HCl solution at 35° C. 126 kg/t of the acid is utilized. As can be seen in FIG. 26, the recovery of TREEs is relatively high (~85%), and the selectivity is good. Notably, only about 10% of the Fe reports to the PLS and reduced quantities of other elements such as Mg and Mn also report to the PLS. Further, the amount of thorium reporting to the PLS is only about 51%.

FIG. 27 illustrates the results from leaching a mid-grade bastnaesite mineral ore body (Composition B) comprising REEs in the form of oxides and carbonates. In this example, the leaching is carried out with a 22% HCl solution at 20° C. 155 kg/t of the acid is utilized. As can be seen in FIG. 27, the results are similar to those obtained at 112 kg/t acid (FIG. 25).

FIG. 28 illustrates the results from leaching a mid-grade bastnaesite mineral ore body (Composition B) comprising REEs in the form of oxides and carbonates. In this example, the leaching is carried out with a 22% HCl solution at 20° C. 178 kg/t of the acid is utilized. As can be seen in FIG. 28, the results are similar to those obtained at 112 kg/t acid (FIG. 26).

Figure 29:
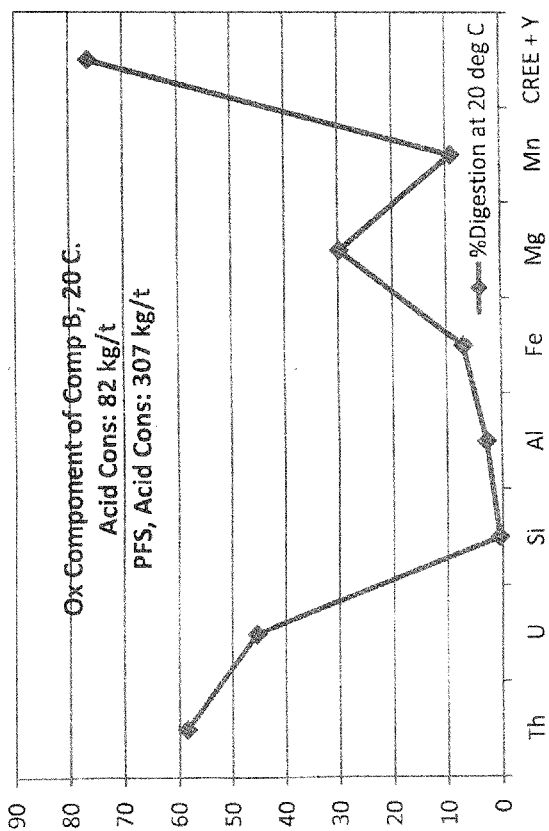

FIG. 29 illustrates the results from leaching a mid-grade bastnaesite mineral ore body (Composition B) comprising REEs in the form of oxides and carbonates. In this example, the leaching is carried out with a 22% HCl solution at 20° C. The acid was reduced to 82 kg/t. As can be seen in FIG. 29, even at these low acid levels, a substantial quantity of TREEs (~76%) are solubilized in the PLS. Less than 10% of the Fe reports to the PLS and reduced quantities of other elements such as Mg and Mn also report to the PLS. Further, the amount of thorium reporting to the PLS is only about 59%.

Figure 30:
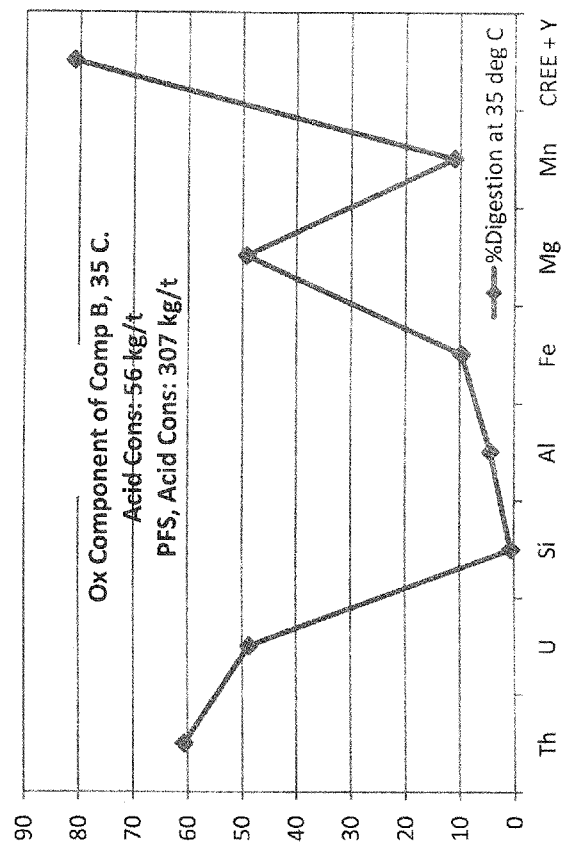

FIG. 30 illustrates the results from leaching a mid-grade bastnaesite mineral ore body (Composition B) comprising REEs in the form of oxides and carbonates. In this example, the leaching is carried out with a 22% HCl solution at 20° C. Only 56 kg/t of the acid is utilized. As can be seen in FIG. 30, over 80% of the critical REEs are recovered in the PLS and less than about 10% of the Fe reports to the PLS. Further, only about 60% of the thorium reports to the PLS.

The foregoing examples demonstrate the ability of the leaching method of the present disclosure to produce a high grade PLS containing a high percentage of the available TREEs while reducing the solubilization of undesirable metals (e.g., base metals) such as Fe.

Oxalate Formation

A PLS containing REEs is contacted with oxalic acid to precipitate metal oxalates. The precipitation temperature is about 70° C. No sulfite was added to the PLS, and therefore $Fe^{3+}$ was present. No recycle was performed. The concentration of oxalic acid is varied from 90 g/l to 115 g/l to 140 g/l to assess the effect of oxalic acid concentration on the purity of the precipitate product (i.e., the metal oxalates). Results are shown in Table IX.

TABLE IX

| Element | Oxalate @ 90 g/l $H_2C_2O_4$ (wt. %) | Oxalate @ 115 g/l $H_2C_2O_4$ (wt. %) | Oxalate @ 140 g/l $H_2C_2O_4$ (wt. %) |
| --- | --- | --- | --- |
| REEs[1] | | | |
| Ce | 16.511467 | 16.61625 | 16.36584 |
| La | 8.549287 | 8.323717 | 7.840823 |
| Nd | 5.490483 | 5.67714 | 5.908091 |
| Pr | 1.594311 | 1.635.82 | 1.66676 |
| Y | 0.075021 | 0.075069 | 0.7525 |
| TOTAL REEs | 32.220569 | 30.6922 | 32.534 |
| Impurity Elements | | | |
| Th | | 0.193692 | 0.218965 |
| U | 0.001687 | 0.001574 | 0.001865 |
| Si | 0.491763 | 0.46509 | 0.470356 |
| Au | < LOD | < LOD | 0.002628 |
| As | 0.002351 | 0.0011.58 | 0.002418 |
| Se | < LOD | < LOD | < LOD |
| Pb | < LOD | < LOD | < LOD |
| Zn | < LOD | < LOD | < LOD |
| Cu | 0.012393 | 0.012785 | 0.013937 |
| Ni | 0.032589 | 0.034371 | 0.03619 |
| Co | 0.071752 | 0.070868 | 0.070785 |
| Fe | 0.513656 | 0.530995 | 0.564361 |
| Mn | < LOD | < LOD | < LOD |
| Cr | < LOD | < LOD | < LOD |
| V | < LOD | < LOD | < LOD |
| Ti | < LOD | < LOD | < LOD |
| Ca | < LOD | < LOD | < LOD |
| K | < LOD | < LOD | < LOD |
| Zr | < LOD | < LOD | < LOD |
| Mo | 0.000372 | 0.000516 | 0.000781 |
| Nb | 0.000466 | 0.000678 | < LOD |
| Sr | 0.00376 | < LOD | < LOD |
| Mn | < LOD | < LOD | < LOD |
| Cr | < LOD | < LOD | < LOD |
| V | < LOD | < LOD | < LOD |
| Ti | < LOD | < LOD | < LOD |
| Ca | < LOD | < LOD | < LOD |
| K | < LOD | < LOD | < LOD |
| Al | < LOD | < LOD | < LOD |
| Mg | < LOD | < LOD | < LOD |
| Zr | < LOD | < LOD | < LOD |

[1]other REEs not analyzed
< LOD = below the limits of detection

As illustrated by Table IX, REE-oxalates with a high proportion of REEs and a relatively low proportion of non-REEs can be obtained by oxalate precipitation over a range of oxalic acid concentrations, even at a precipitation temperature of about 70° C. In particular, it is noteworthy that in comparison the foregoing, many prior processes for separation of REEs from a PLS also precipitate many non-REE elements with the REEs, for example U, Si, As, Pb, Zn, Fe, Mn, Mo, Nb, Cr, Ti, Ca, K, Al and Zr.

Hydroxylation

In the following Example, thorium is precipitated from an acidic solution using a hydroxide precipitant at various pH levels to observe the effect of pH on the precipitation of thorium and of REEs.

For these tests, 400 grams (326 ml) of a nitric acid solution having a free acid content of about 5 g/l and a specific gravity of 1.227 is added to a one liter vessel having a mixer. A 1M solution of ammonium hydroxide (NH$_4$OH) is added dropwise to the vessel until the target pH level is reached, and the target pH is maintained for one hour. A temperature of about 25° C. is maintained during the precipitation step. After 60 minutes, the vessel contents are filtered and the weight, specific gravity and free acid content of the filtrate are measured. The retentate is washed with deionized water and dried. The results are illustrated in Table X.

TABLE X

| Element | Acidic Solution Assay (mg/l or g/tonne) | % Precipitated @ pH 1.0 | % Precipitated @ pH 2.0 | % Precipitated @ pH 2.5 | % Precipitated @ pH 3.0 | % Precipitated @ pH 3.5 |
|---|---|---|---|---|---|---|
| La | 20000 | 7 | 5 | 4 | 0 | 2 |
| Ce | 13500 | 7 | 5 | 3 | 0 | 2 |
| Pr | 3150 | 3 | 0 | 7 | 0 | 19 |
| Nd | 11000 | 4 | 1 | 3 | 0 | 3 |
| Sm | 1580 | 4 | 0 | 8 | 0 | 19 |
| Eu | 352 | 3 | 0 | 7 | 0 | 19 |
| Gd | 814 | 2 | 0 | 5 | 0 | 15 |
| Tb | 62 | 3 | 0 | 8 | 4 | 22 |
| Dy | 204 | 2 | 0 | 5 | 0 | 17 |
| Ho | 24 | 2 | 0 | 4 | 1 | 19 |
| Y | 494 | 5 | 0 | 7 | 0 | 18 |
| Er | 40 | 3 | 0 | 7 | 0 | 15 |
| Tm | 4 | 4 | 4 | 3 | 0 | 18 |
| Yb | 19 | 7 | 6 | 5 | 2 | 21 |
| Lu | 3 | 5 | 5 | 5 | 2 | 21 |
| Sc | <5 | 0 | 0 | 3 | 22 | 70 |
| Th | 734 | 4 | 1 | 8 | 62 | 95 |
| U | 1 | 0 | 0 | 0 | 0 | 24 |

Figure 31:
FIGS. 31 and 32 illustrate the effect of pH on selective thorium precipitation when using a hydroxide precipitant to precipitate thorium as thorium hydroxide.

The foregoing data is graphically illustrated in FIG. 31. This data demonstrates that at pH 3.0, 62% of the thorium in the acidic solution may be precipitated as thorium hydroxide. When the pH is increased to pH 3.5, 95% of thorium is precipitated; however increasing amounts of REEs also begin to precipitate from the solution.

Figure 32:
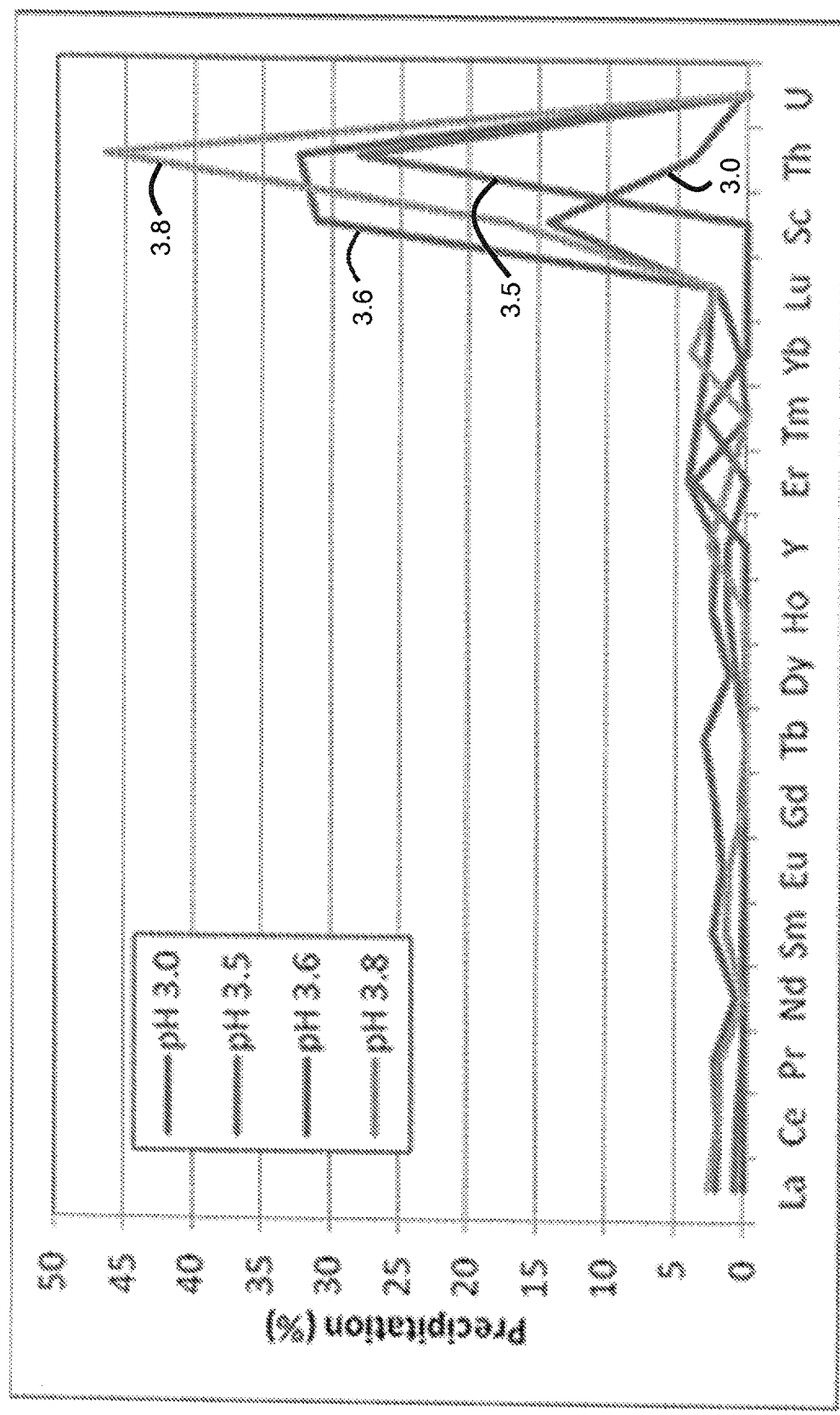

However, if thorium concentration in the solution is decreased, it is found that the pH can be increased without precipitating significant quantities of REEs from the solution. FIG. 32 illustrates the results of increasing the pH of a solution over a range from pH 3.0 to pH 3.8, where the initial thorium concentration is decreased to 117 mg/l. As is illustrated in FIG. 32, pH levels at least as high as pH 3.8 can be utilized to extract a high percentage of the thorium without precipitating significant amounts of the REEs. The results for the tests at pH 3.5, pH 3.6 and pH 3.8 for a solution containing 117 mg/l thorium are given in Table XI.

TABLE XI

| Element | Feed Assay (mg/l or g/tonne) | Final Solution Assay @ pH 3.5 (mg/l or g/tonne) | Percent Removed @ pH 3.5 | Final Solution Assay @ pH 3.6 (mg/l or g/tonne) | Percent Removed @ pH 3.6 | Final Solution Assay @ pH 3.8 (mg/l or g/tonne) | Percent Removed @ pH 3.8 |
|---|---|---|---|---|---|---|---|
| La | 2710 | 2200 | 1 | 2220 | 0 | 2160 | 2 |
| Ce | 1870 | 1520 | 1 | 1540 | 0 | 1500 | 2 |
| Pr | 473 | 386 | 0 | 390 | 0 | 380 | 2 |
| Nd | 1630 | 1344 | 0 | 1364 | 0 | 1332 | 0 |
| Sm | 232 | 189 | 0 | 191 | 0 | 187 | 1 |
| Eu | 51.0 | 42 | 0 | 42 | 0 | 41 | 1 |
| Gd | 122 | 99 | 0 | 102 | 0 | 100 | 0 |
| Tb | 9.8 | 8 | 0 | 8 | 0 | 8 | 0 |
| Dy | 30.8 | 23 | 1 | 25 | 0 | 25 | 0 |
| Ho | 3.52 | 5 | 1 | 3 | 0 | 3 | 0 |
| Y | 74.4 | 60 | 1 | 61 | 0 | 59 | 3 |

TABLE XI-continued

| Element | Feed Assay (mg/l or g/tonne) | Final Solution Assay @ pH 3.5 (mg/l or g/tonne) | Percent Removed @ pH 3.5 | Final Solution Assay @ pH 3.6 (mg/l or g/tonne) | Percent Removed @ pH 3.6 | Final Solution Assay @ pH 3.8 (mg/l or g/tonne) | Percent Removed @ pH 3.8 |
|---|---|---|---|---|---|---|---|
| Er | 6.15 | 5.06 | 0 | 4.84 | 4 | 4.96 | 1 |
| Tm | 0.58 | 0.46 | 3 | 0.5 | 0 | 0.48 | 0 |
| Yb | 2.83 | 2.32 | 0 | 2.30 | 1 | 2.22 | 4 |
| Lu | 0.35 | 0.30 | 0 | 0.28 | 2 | 0.28 | 2 |
| Sc | 0.71 | 0.62 | 0 | 0.40 | 31 | 0.48 | 17 |
| Th | 117 | 69 | 28 | 65 | 32 | 51 | 46 |
| U | 0.22 | 0.18 | 0 | 0.18 | 0 | 0.18 | 0 |

As is illustrated in this Example, high levels of thorium can be extracted from a relatively dilute solution at increased pH levels, without extracting high levels of REEs from the solution.

In another Example, the co-precipitation of cerium and thorium from a cerium-containing product is demonstrated. The cerium containing REE-product may contain a very high proportion of lower value cerium as compared to other REEs. In this example, to precipitate cerium, cerium-containing acidic solutions (e.g., nitric acid liquors) containing dissolved cerium and other REEs, as well as thorium, are subjected to a two-step precipitation process where the pH of the two precipitation steps is varied to assess the effect of pH on the selectivity for Ce and Th. The parameters for the first stage precipitation at 3 different pH values are given in Table XII below. In each instance, the cerium-containing acidic solution comprised from about 18% to about 20% $HNO_3$ and the total contact time was about 1 hour at ambient temperature.

TABLE XII

| | 1st Stage Precipitation | | |
|---|---|---|---|
| Parameter | Example 3A | Example 3B | Example 3C |
| Cerium-containing solution (g) | 4,210 | 4,710 | 3,720 |
| Free $HNO_3$ (wt. %) | 20.7 | 18.3 | 18.3 |
| $NH_4OH$ Added (g $NH_4OH$/g solution) | 0.080 | 0.065 | 0.087 |
| 1st stage final pH | 3.7 | 3.3 | 4.0 |
| Precipitated Elements | wt. % | wt. % | wt. % |
| Ce | 60.2 | 61.3 | 62.4 |
| Nd | 4.2 | 6.16 | 3.62 |
| Gd | 5.9 | 7.55 | 5.47 |
| Y | 5.9 | 8.87 | 5.62 |
| Th | 98.5 | 77.1 | 99.9 |

Figure 33:
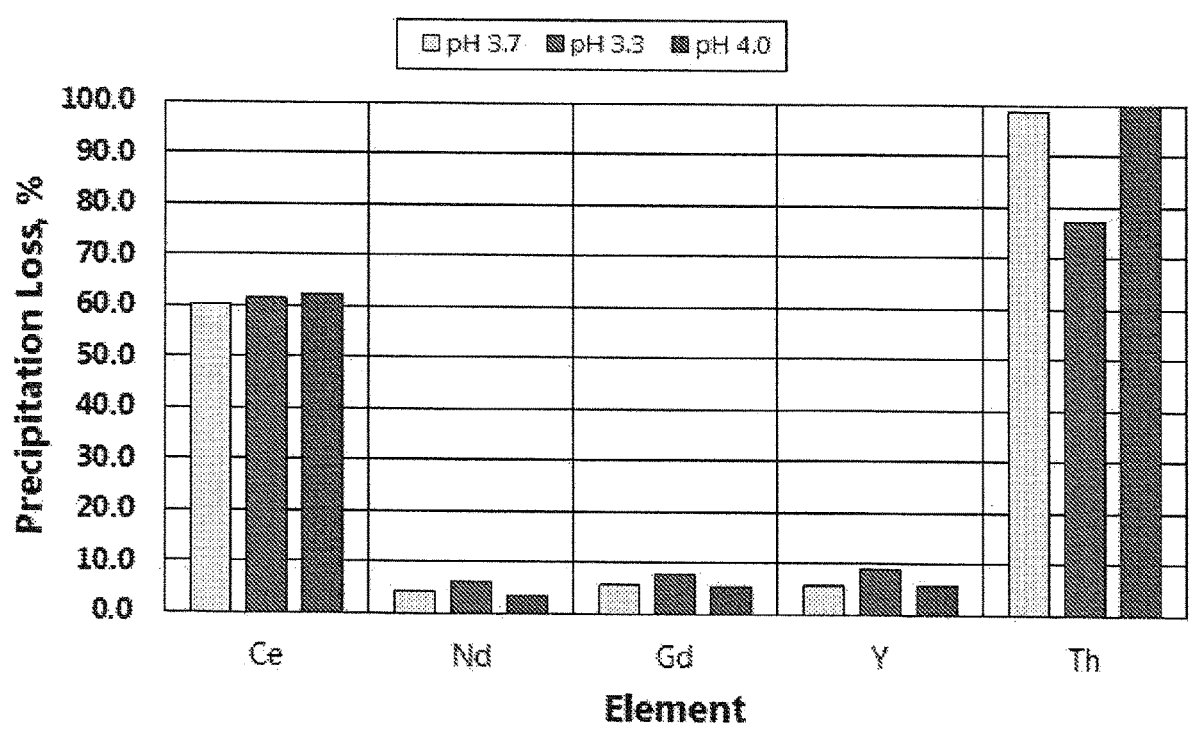
FIG. 33 illustrates the selective precipitation of cerium and thorium from a cerium-containing acidic solution in the first stage of a cerium extraction method according to one embodiment.

These results are also illustrated in FIG. 33. As illustrated by this data, the precipitation process is highly selective for the precipitation of Ce and Th, to the exclusion of other REEs such as Nd, Gd and Y, particularly at pH values approaching pH 4.

However, the data also illustrates that significant amounts (e.g., about 37% or more) of the cerium remains in the Ce-depleted acidic solution under these conditions. Therefore, a second precipitation step is performed on the Ce-depleted solution from the first precipitation step to extract additional cerium, and possibly thorium, from the first Ce-depleted solution. This second precipitation step is also performed by contacting the (first) Ce-depleted solution with additional ammonium hydroxide to precipitate a (second) portion of Ce from the nitric acid liquor.

Table XIII illustrates the data for the second stage precipitation.

TABLE XIII

| | 2nd Stage Precipitation | | |
|---|---|---|---|
| Parameter | Example 3A | Example 3B | Example 3C |
| 1st stage Filtrate (g) | 6620 | 5112 | 6308 |
| Initial pH | 3.7 | 3.3 | 4.0 |
| $NH_4OH$ added 1M-$NH_4OH$ solution (g) | 8 | 46 | 6 |
| Target pH | 4.83 | 4.30 | 5.02 |
| Elements Precipitated | wt. % | wt. % | wt. % |
| Ce | 6.26 | 46.5 | 0.82 |
| Nd | <0 | 1.92 | 0 |
| Gd | <0 | 2.68 | 0 |
| Y | <0 | 2.66 | 0.00 |
| Th | 96.6 | 99.5 | 0 |

Figure 34:
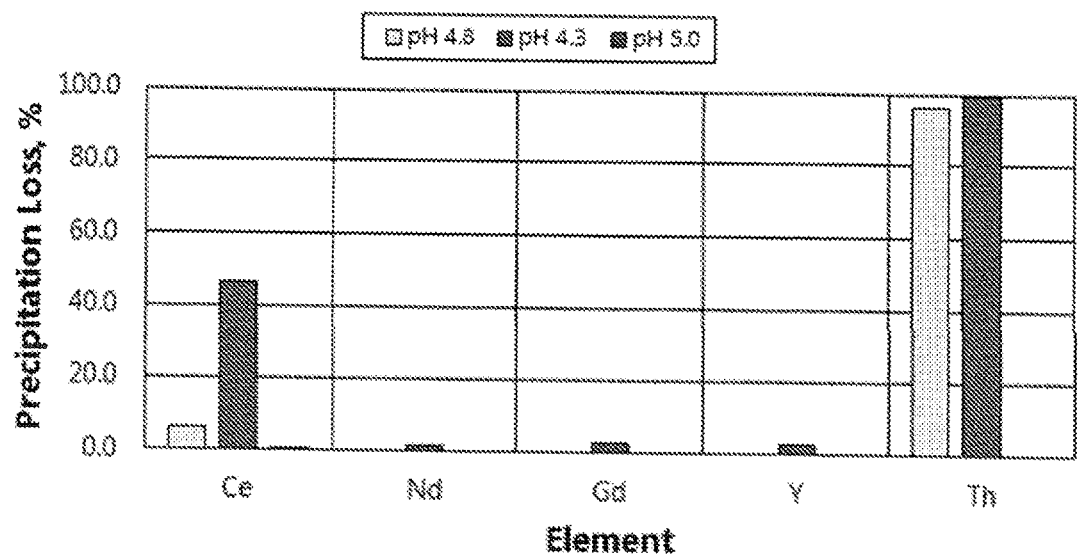
FIG. 34 illustrates the selective precipitation of cerium and thorium from a cerium depleted solution in the second stage of a cerium extraction method according to one embodiment.

The data for the second precipitation step is also illustrated in FIG. 34. By adjusting the pH of the precipitation steps (e.g., by controlling the addition of $NH_4OH$), the filtrate (e.g., the cerium depleted solution from the second precipitation step) may be substantially free of cerium and thorium.

Table IXX illustrates the combined results of the two-stage precipitation process.

TABLE IXX

| | Overall Precipitation | | |
|---|---|---|---|
| Parameter Elements Precipitated | Example 3A pH 3.7 & pH 4.8 wt. % | Example 3B pH 3.3 & pH 4.3 wt. % | Example 3C pH 4.0 & pH 5.0 wt. % |
| Ce | 63 | 80.0 | 63 |
| Nd | 4.18 | 7.96 | 5.47 |
| Gd | 8.38 | 9.48 | 5.37 |
| Y | 8.38 | 9.73 | 5.62 |
| Th | 99.95 | 99.89 | 99.91 |

Figure 35:
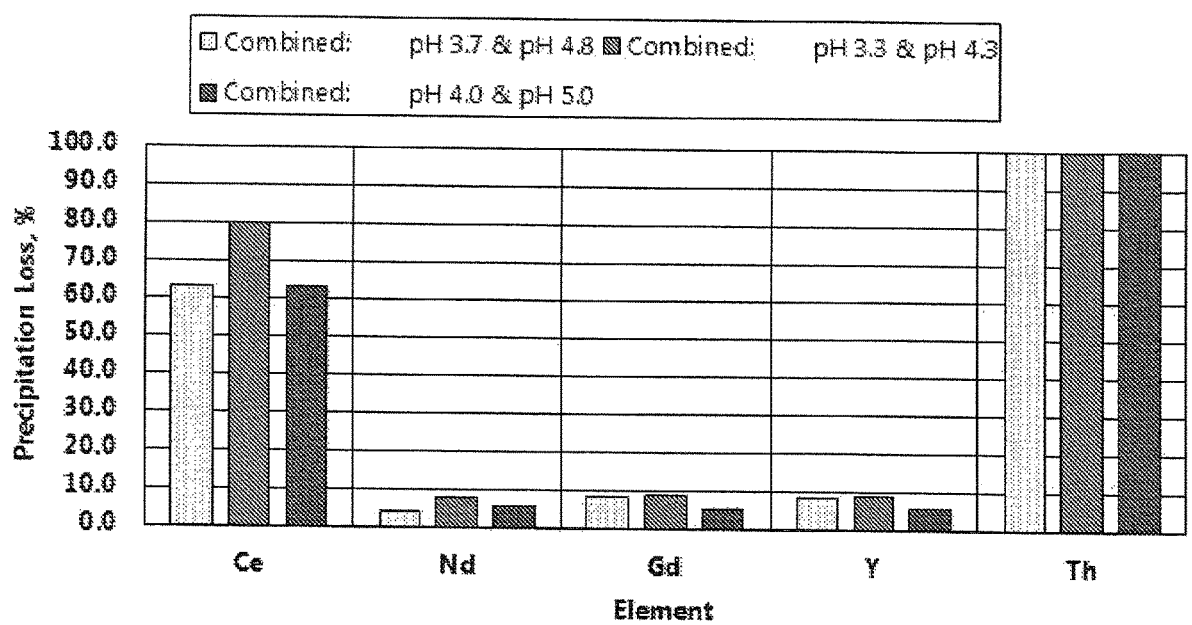
FIG. 35 illustrates the net precipitation of cerium and thorium from a cerium-containing acidic solution in a two-stage cerium extraction method according to one embodiment.

This data is also graphically illustrated in FIG. 35. It can be seen that the two-stage process may result in the removal of one filtrate (solution) that is 80% cerium free and essentially 100% thorium free. A majority of the Ce and essentially all of the Th report to the solid residue.

As can be understood from the above description, the methods disclosed herein also encompass the utilization of chemical precipitation to separate rare earth elements from each other and from thorium and/or uranium. This separation can advantageously be utilized to simplify the subsequent solvent extraction steps that are necessary to separate one or more of the rare earth elements and/or thorium and uranium from each other. In one particular embodiment, chemical precipitation can be utilized to form a plurality of "baskets," where each basket of REEs includes a group of metallic elements that may be efficiently separated by solvent extraction.

Throughout the following examples, the percentage (%) refers to percentage by mass, unless otherwise indicated. Further, the mass percentage of the REEs is given relative to the total REEs, whereas the percentage of non-REEs (notably Th and U) is given relative to the total metals mass (REEs plus non-REEs) of a particular product.

Preparation of a First Precipitation Product

A rare earth oxide product (e.g., powder) is obtained. The rare earth oxide product is produced from a rare earth containing ore (e.g., bastnaesite ore) The rare earth oxide product is a rare earth oxide powder having the approximate composition listed in Table XX.

TABLE XX

| Element(s) | Wt. % of the Metals in the Rare Earth Oxide Product |
| --- | --- |
| La | 21.674 |
| Ce | 40.866 |
| Pr | 5.283 |
| Nd | 19.662 |
| Sm | 3.221 |
| Eu | 2.759 |
| Gd | 2.018 |
| Tb | 0.174 |
| Dy | 0.513 |
| Ho | 0.198 |
| Er | 0.084 |
| Tm | 0.008 |
| Yb | 0.039 |
| Lu | 0.006 |
| Y | 3.495 |
| Total REEs | 100.00 |
| Th | 2.124 |
| U | 0.003 |
| REE Groups | |
| LREEs | 90.706 |
| HREEs | 9.294 |
| CREEs | 31.886 |

As listed in Table XX, and noted above, the term Critical Rare Earth Elements ("CREEs") includes neodymium (Nd), europium (Eu), terbium (Tb), dysprosium (Dy), praseodymium (Pr) and yttrium (Y). The term Heavy Rare Earth Elements ("HREEs") includes europium (Eu), gadolinium (Gd), terbium (Tb), dysprosium (Dy), holmium (Ho), erbium (Er), thulium (Tm), ytterbium (Yb), lutetium (Lu) and yttrium (Y). The term Light Rare Earth Elements ("LREEs") refers to lanthanum (La), cerium (Ce), praseodymium (Pr), neodymium (Nd) and samarium (Sm). It is notable that the rare earth oxide product advantageously has a total rare earth element content of over 97%, namely 97.873%. That is, 97.873% of the metals in the rare earth oxide product are rare earth elements, with the non-REEs being Th and a trace of U. The rare earth oxide product is substantially free of base metals.

The rare earth oxide product is digested in nitric acid at 80° C. to 90° C. to form a first rare earth solution. A sufficient amount of a 70% $HNO_3$ acidic solution is added to the rare earth oxide product to solubilize substantially all of the metals in the rare earth oxide product, wherein the first rare earth solution has a metals composition that is substantially identical to the metals composition of Table XX. After dissolution of substantially all of the metals, the first rare earth solution has a free acid content of about 22% $HNO_3$ (about 5M $HNO_3$).

To selectively precipitate certain metals from the first rare earth solution, the solution is then contacted with ammonium hydroxide ($NH_4OH$) in the form an aqueous solution of 58% ammonium hydroxide. Sufficient ammonium hydroxide is added to the first rare earth solution to increase the pH to about pH 4.8. During the addition of the ammonium hydroxide, a first precipitation product forms. The first precipitation product comprises hydroxide precipitates having the metals composition given in Table XXI. Table XXI also lists the percentage of the elements from the rare earth oxide product that precipitate in the first precipitation product, and the metals composition of the solution (i.e., the second rare earth solution) that is separated from the first precipitation product.

TABLE XXI

| Element(s) | Wt. % of the Metals in the First Precipitation Product | Wt. % of the Element from the Rare Earth Oxide Powder Reporting to the First Precipitation Product | Wt. % of the Total Metals in the Second Rare Earth Solution |
| --- | --- | --- | --- |
| La | 1.251 | 0.807 | 24.993 |
| Ce | 66.409 | 21.379 | 39.693 |
| Pr | 1.769 | 4.681 | 5.855 |
| Nd | 7.236 | 5.145 | 21.682 |
| Sm | 2.621 | 11.376 | 3.319 |
| Eu | 0.741 | 13.738 | 0.757 |
| Gd | 1.656 | 11.474 | 2.077 |
| Tb | 0.283 | 22.804 | 0.156 |
| Dy | 1.145 | 31.202 | 0.410 |
| Ho | 0.133 | 34.305 | 0.041 |
| Er | 0.264 | 43.766 | 0.055 |
| Tm | 0.034 | 62.283 | 0.003 |
| Yb | 0.206 | 73.826 | 0.012 |
| Lu | 0.026 | 58.640 | 0.003 |
| Y | 1.063 | 15.551 | 0.938 |
| Th | 15.147 | 99.721 | 0.007 |
| U | 0.017 | 96.550 | 0.000 |
| REE Grouping Content | | | |
| REEs | Wt. % of the Total Metals in the First Precipitation Product | Wt. % of the Elements from the Rare Earth Oxide Powder Reporting to the First Precipitation Product | Wt. % of the Total Metals in the Second Rare Earth Solution |
| TREEs | 84.837 | 12.119 | 99.993 |
| LREEs | 79.286 | 11.885 | 95.542 |
| HREEs | 5.551 | 16.85 | 4.452 |
| CREEs | 12.237 | 6.257 | 29.798 |

A number of observations can be made from the data in Table XXI. First, it is notable that substantially all of the thorium from the rare earth oxide product reports to the first precipitation product. Specifically, 99.721% of the thorium from the rare earth oxide product reports to the first precipitation product. Thus, substantially all of the thorium is separated from the rare earth elements by this single precipitation step. A substantial amount (96.550%) of the uranium, which was only present in trace amounts to begin with, also reports to the first precipitation product.

As a result, the second rare earth solution that is separated from the first precipitation product has a very high purity with respect to rare earth elements. Specifically, rare earth metals advantageously constitute 99.993% of the total metals in the second rare earth solution, and the mass % of thorium and uranium is only 0.007%.

It is also notable that only about 13.981% of the total metal elements from the rare earth oxide product precipitate in the first precipitation product. Thus, not only does the first precipitation product effectively separate substantially all of the thorium and the trace uranium from the rare earth oxide product, but the mass of the first precipitation product is small as compared to the mass of the rare earth oxide product that is input. Because substantially all of the thorium is extracted in a relatively small mass, the plant for subsequently treating the first precipitation product (e.g., to dispose of thorium and uranium) can be relatively small.

Preparation of a Second Precipitation Product

The second rare earth solution that is separated from the first precipitation product is then treated to precipitate the remaining metal elements from the solution. Specifically, the second rare earth solution is contacted with additional ammonium hydroxide to increase the pH of the second rare earth solution to about pH 9. At this pH, substantially all of the metal elements in the second rare earth solution will precipitate from the second rare earth solution to form a first intermediate feed, e.g., comprising metal hydroxides having substantially the same metals composition as the second rare earth solution. The first intermediate feed is separated from the remaining barren acidic solution, and the barren acidic solution may be recycled to conserve water and OH⁻ values.

The first intermediate feed precipitated from the second rare earth solution is then digested in nitric acid, in a manner similar to that described above for the rare earth oxide product, to re-digest substantially all of the metal elements into an acidic solution. After dissolution of substantially all of the metals, the solution has a free acid content of about 8M $HNO_3$. In a manner similar to that described above, the acidic solution is contacted with ammonium hydroxide in the form an aqueous solution of 58% ammonium hydroxide. Sufficient ammonium hydroxide is again added to increase the pH to about pH 4.8. During the addition of the ammonium hydroxide, a second precipitation product forms. The second precipitation product comprises rare earth element hydroxide precipitates, and has the composition given in Table XXII. Table XXII also lists the percentage of the elements from the rare earth oxide product that precipitate in the second precipitation product, and the composition of the solution (the third rare earth solution) that is separated from the second precipitation product.

TABLE XXII

| Element(s) | Wt. % of the Metals in the Second Precipitation Product | Wt. % of Element from the Rare Earth Oxide Powder Reporting to the Second Precipitation Product |
| --- | --- | --- |
| La | 2.262 | 2.892 |
| Ce | 86.455 | 55.170 |
| Pr | 1.640 | 8.604 |
| Nd | 5.630 | 7.935 |
| Sm | 1.491 | 12.829 |
| Eu | 0.382 | 14.033 |
| Gd | 0.799 | 10.975 |
| Tb | 0.127 | 20.231 |
| Dy | 0.474 | 25.616 |

TABLE XXII-continued

| | Wt. % of the Metals in the Second Precipitation Product | Wt. % of Element from the Rare Earth Oxide Powder Reporting to the Second Precipitation Product |
| --- | --- | --- |
| Ho | 0.052 | 26.881 |
| Er | 0.093 | 30.701 |
| Tm | 0.008 | 31.150 |
| Yb | 0.031 | 22.277 |
| Lu | 0.006 | 26.820 |
| Y | 0.526 | 15.258 |
| Th | 0.022 | 0.282 |
| U | 0.000 | 0.900 |
| REE Grouping Content | | |
| REEs | | |
| TREEs | 99.976 | 28.309 |
| LREEs | 97.478 | 28.964 |
| HREEs | 2.498 | 25.025 |
| CREEs | 8.779 | 8.898 |

As can be seen from Table XXII, the second precipitation product is a rich in Ce and is predominately comprised of the LREEs. Further, the mass of the metals in the second precipitation product is about 27.713 mass % of the metals in the rare earth oxide powder. Thus, a majority of the Ce (55.170%) from the rare earth oxide product is sequestered in a relatively low mass second precipitation product.

Preparation of a Third Precipitation Product

The fourth rare earth solution that is separated from the second precipitation product has a pH of about 4.8 and is comprised primarily of solubilized rare earth elements. The composition of the fourth rare earth solution is shown in Table XXIII.

TABLE XXIII

| Element | Wt. % of the Metals in the Fourth Rare Earth Solution |
| --- | --- |
| La | 35.797 |
| Ce | 17.466 |
| Pr | 7.858 |
| Nd | 29.311 |
| Sm | 4.188 |
| Eu | 0.935 |
| Gd | 2.684 |
| Tb | 0.170 |
| Dy | 0.380 |
| Ho | 0.036 |
| Er | 0.037 |
| Tm | 0.001 |
| Yb | 0.003 |
| Lu | 0.002 |
| Y | 1.134 |
| TREEs | 100.002 |
| Th | 0.0006 |
| U | 0.0006 |
| REE Grouping Content | |
| REEs | |
| LREEs | 94.620 |
| HREEs | 5.382 |
| CREEs | 39.788 |

The fourth rare earth solution has a pH of about 4.8 and is a salable product that has an extremely high purity with respect to rare earth elements. Here, the fourth rare earth solution is treated to convert the rare earth elements in the solution to a solid product (e.g., a third precipitation product) having substantially the same metals composition as the fourth rare earth solution. In this regard, the third precipitation product is formed by increasing the pH of the fourth rare earth solution (e.g., to about pH 9) through the addition of ammonium hydroxide to precipitate the rare earth elements as a hydroxide precipitate. As with the fourth rare earth solution, this third precipitation product has an extremely high purity with respect to rare earth metals. Further, the cerium content of the third precipitation product is relatively low (17.466%), the concentration of critical rare earth elements is relatively high (39.787%) and the lanthanum content is relatively high (35.797%).

Solvent Extraction

The three "baskets" described above (the first, second and third precipitation products) are further treated in various solvent extraction steps to further separate rare earth elements and/or thorium and uranium. The creation of the three precipitation products advantageously enables the number and/or complexity of the solvent extraction steps to be greatly reduced.

Solvent Extraction of the Third Precipitation Product

As is noted above, the third precipitation product comprises a relatively small percent mass fraction of thorium, cerium (17%) and heavy rare earth elements (1.67%). However, the third precipitation product is rich in critical rare earths (39.787%), praseodymium and neodymium (37.169% combined), and samarium and gadolinium (7.052% total) It is desirable to remove the thorium and cerium from the product to upgrade the critical rare earth elements, and it is further desirable to separate the thorium from the cerium downstream in a dedicated facility for radioactive element separation.

The third rare earth precipitation product is dissolved in nitric acid at a temperature of 80° C. to 90° C., where the final acidity after substantially all of the metals have been solubilized is about 8M $HNO_3$. Ammonium hydroxide is then added to the acidic solution such that the mass ratio of ammonium hydroxide to the nitrate solution is about 1:6.75 and the water added (through the 58% $NH_4OH$ solution) is about 1:6.47 in relation to the nitric acid solution. This procedure effectively adjusts the pH of the solution downward to about 3.8% $HNO_3$ (0.9M). Further, while not wishing to be bound by any theory, it is believed that elevating the acidity after the digestion of the metal elements from the first precipitation product puts the cerium and the thorium into the 4+ oxidation, i.e., $Ce^{4+}$ and $Th^{4+}$. Upon addition of the ammonium hydroxide (58% $NH_4OH$ in water), the $Ce^{4+}$ and $Th^{4+}$ each form a complex with the $NH_4^+$ in solution. These ammonium complexes are believed to remain stable down to the lower pH values such as down to about 0.9M or lower.

As a result, the cerium and all traces of thorium can be selectively extracted from the solution. Table XXIV illustrates these results for a sample of the third precipitation product having a metals mass of 465.03 grams, where the solvent extraction was carried out at a nitric acid concentration of about 1M with 15% TBP (tributyl phosphate) in kerosene at ambient temperature (about 20° C.) for about 7.5 minutes.

TABLE XXIV

| Element | Third Precipitation Product (grams) | Amount Extracted from Aqueous with TBP Organic (grams) | Percentage Extracted from Aqueous with TBP Organic | Amount Remaining in Aqueous Phase (grams) |
| --- | --- | --- | --- | --- |
| La | 166.76 | 1.688 | 1.01 | 165.07 |
| Ce | 81.55 | 75.165 | 92.17 | 6.39 |
| Pr | 36.44 | 0.579 | 1.59 | 35.86 |
| Nd | 135.92 | 2.683 | 1.97 | 133.24 |
| Sm | 19.42 | 0.607 | 3.13 | 18.81 |
| Eu | 4.33 | 0.154 | 3.56 | 4.17 |
| Gd | 12.45 | 0.408 | 3.28 | 12.04 |
| Tb | 0.78 | 0.033 | 4.23 | 0.75 |
| Dy | 1.76 | 0.071 | 4.03 | 1.69 |
| Ho | 0.17 | 0.000 | 0 | 0.17 |
| Er | 5.25 | 0.125 | 2.38 | 5.13 |
| Tm | 0.18 | 0.000 | 0 | 0.18 |
| Yb | 0.0072 | 0.000 | 0 | 0.0072 |
| Lu | 0.0123 | 0.000 | 0 | 0.0123 |
| Y | 0.0024 | 0.000 | 0 | 0.0024 |
| Th | 0.0037 | 0.0029 | 78.38 | 0.0001 |
| U | 0.0006 | 0.0006 | 100 | 0.0000 |

As can be seen from Table XXIV, this single solvent extraction step advantageously separates cerium and thorium from the rare earth elements. By removing almost 92% of cerium and 78% of thorium, the purity of the product increases to 99.9998% total rare earth elements, and the critical rare earths content is upgraded from 39.6% to 47.2%. Praseodymium and neodymium are the dominant elements in the critical rare earth group, and their concentration increases from 37.1% to 44.1%. The organic extractant extracts about 92.2% of total cerium and greater than 78% of total thorium, and the aqueous phase contained about 99.9998% rare earth elements with a very low concentration of cerium and almost undetectable thorium (<0.3 ppm Th).

FIG. 36A illustrates the effect of acidity levels of 1M $HNO_3$ (E1 as reported in Table XXIV), 3M $HNO_3$ (E2) and 6M $HNO_3$ on the selectivity of Ce extraction. As is illustrated in FIG. 36A, as the acidity increases, the selectivity for Ce decreases, and the amount of other REEs begins to increase. As a result, it is desirable to conduct the solvent extraction at a relatively low acidity, such as around 1M $HNO_3$ or slightly less, such as from about 0.7M to about 1M $HNO_3$. FIG. 36B illustrates the selective extraction of Th at 1M and 3M during the same test that is illustrated in FIG. 36A. It can be seen that Th is also selectively extracted with the Ce.

The extracted composition that predominately contains cerium and thorium can be further processed to separate the cerium from the thorium. In this regard, it has been found that cerium can be selectively separated from thorium by the methodology described above.

Figure 37:
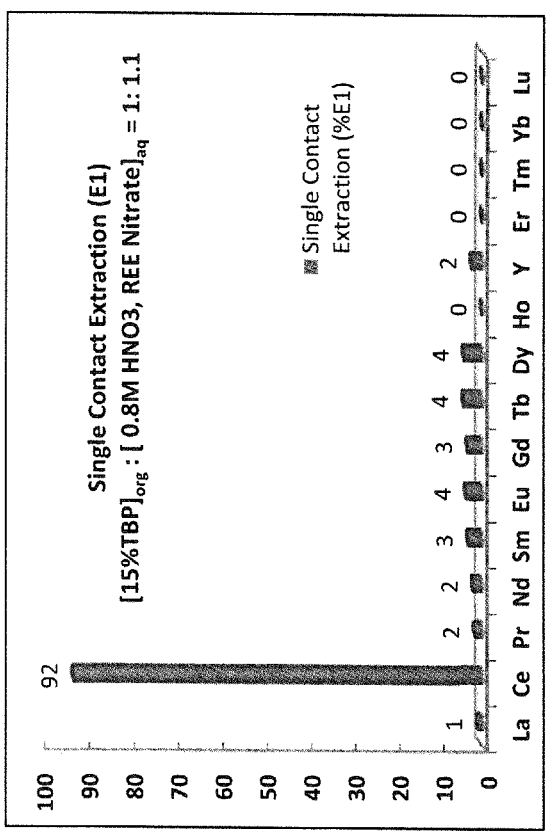
FIG. 37 illustrates the effect of tributyl phosphate (TBP) dosage on selectivity for Ce in a single contact solvent extraction process.
Figure 37:
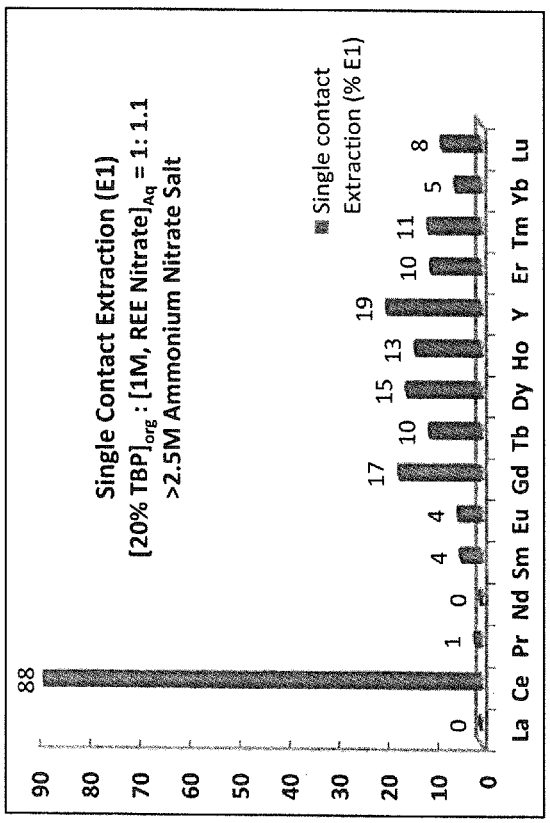
Figure 37:
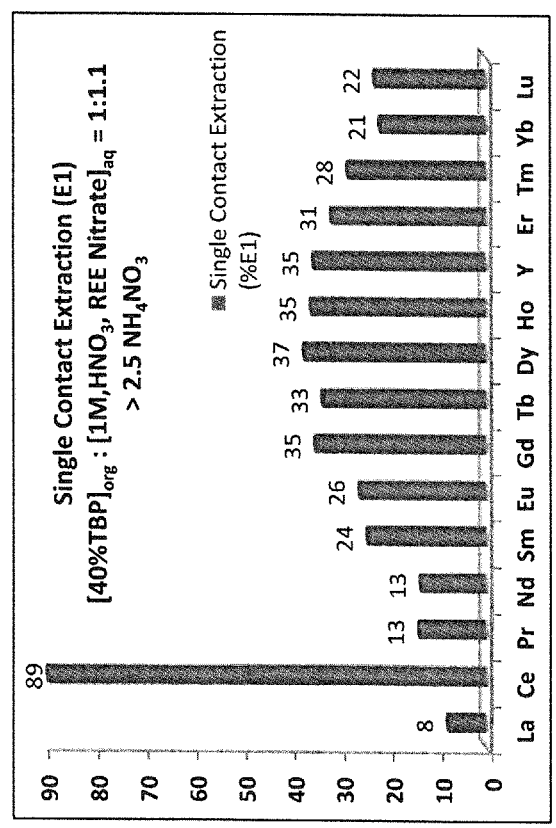

FIG. 37 illustrates the effect of solvent extraction variables, such as TBP dosage, on the selectivity for Ce during solvent extraction. As is illustrated in FIG. 37, very high selectivity for Ce can be achieved at relatively low TBP concentrations (% in kerosene) such as 15% TBP and in an acid concentration of 0.8M $HNO_3$ in a single contact solvent extraction step.

Figure 38:
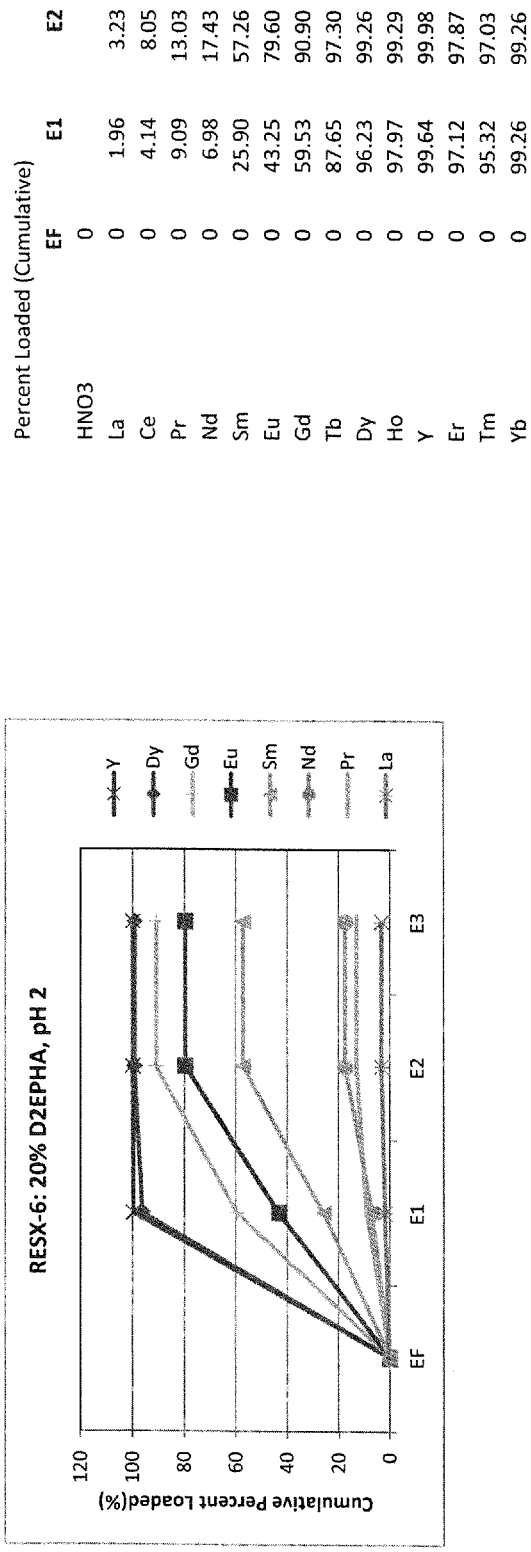
FIG. 38 illustrates the separation of LREEs and HREEs in a two contact solvent extraction process.
Figure 39C:
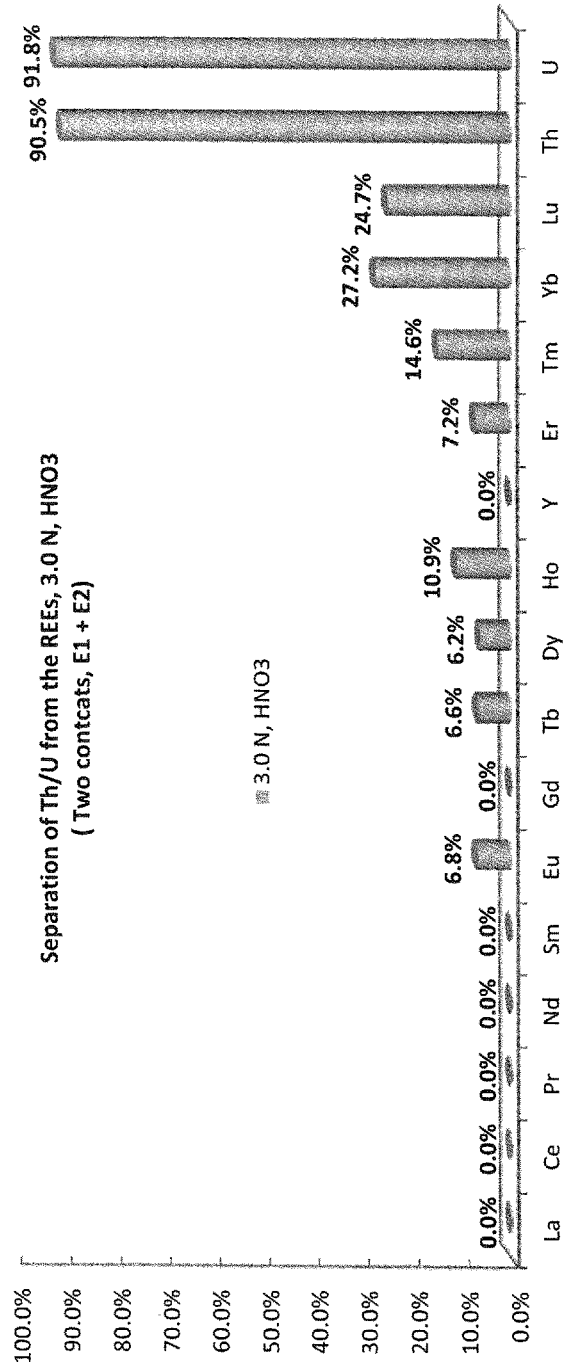
Figure 39D:
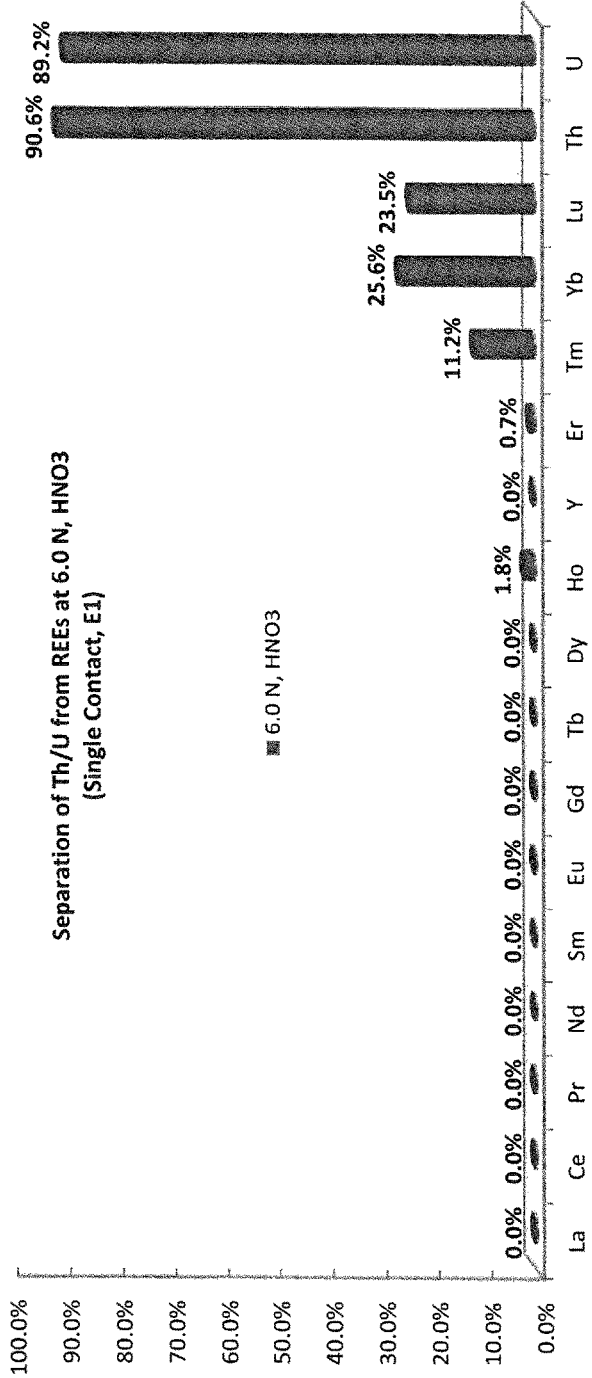

FIG. 38 illustrates the separation of LREEs and HREEs using solvent extraction at a pH of pH 2, using 20% D2EPHA. For the data illustrated in FIG. 38, the solvent extraction is carried out at ambient temperature (about 20° C.) and an organic:aqueous ration of 1.1:1. The feed was an acidic $HNO_3$ solution comprising the REEs, and before solvent extraction the acidity of the $HNO_3$ was increased to pH 2 through the addition of $NH_4OH$.

FIGS. 39A to 39E illustrate the conditions under which the actinides Th and U can be selectively separated from REEs. In each case, the NH$_4$OH is at 2M. This set of solvent extraction data at 0.5N, 1.0N, 3.0N, 6.0 and 6.8 N HNO$_3$ illustrates that Ce extraction is very low and above 3N HNO$_3$ no or substantially no Ce is extracted. This is believed to be due to the Ce being in the +3 oxidation state and not forming a cerium III ammonium nitrate complex in solution. This means that evaporating 68% of liquor at 80° C. and concentrating NH$_4$NO$_3$ up to about 2M had no effect on the Ce III species. Hence reaction with 20% TBP is very limited as seen by the low recoveries at <3.0N HNO$_3$.

Thus, as is illustrated in FIGS. 39A to 39E, at relatively high acid concentrations (e.g., about 6M or higher), Th and U can be selectively separated from REEs, including from Ce. This methodology may be particularly effective for separating Th and U from Ce, such as in the first precipitation product (Basket1) and/or the second precipitation product (Basket2).

Figure 40:
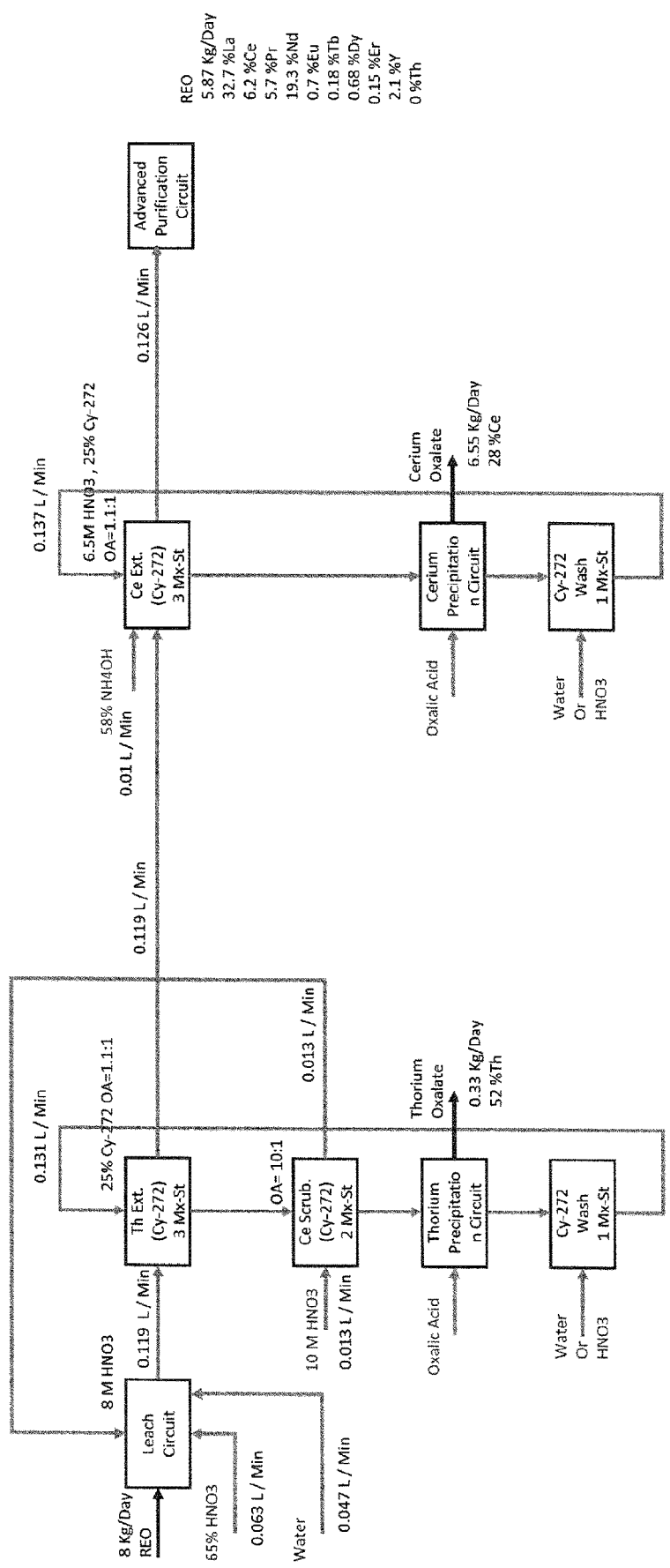

A comprehensive flowsheet illustrating a process for the processing of rare earth containing products to obtain very high purity REEs is illustrated in FIG. 40.

While various embodiments of a processing technique for the extraction of rare earth elements have been described in detail, it is apparent that modifications and adaptations of those embodiments will occur to those skilled in the art. However, is to be expressly understood that such modifications and adaptations are within the spirit and scope of the present disclosure, including the appended claims.

What is claimed is:

1. A method for the removal of thorium from an REE-containing acidic solution, the REE-containing acidic solution comprising thorium and at least one rare earth element, the method comprising the steps of:

contacting the REE-containing acidic solution with a phosphinic acid-type extractant to extract at least a portion of the thorium from the REE-containing acidic solution, whereby a thorium-depleted raffinate and a thorium-loaded extractant are formed; and contacting the thorium-loaded extractant with oxalic acid to strip thorium from the thorium-loaded extractant and form a thorium-depleted extractant.

2. The method recited in claim 1, wherein the phosphinic acid-type extractant comprises bis(2,4,4-trimethylpentyl) phosphinic acid.

3. The method recited in claim 1, wherein the phosphinic acid-type extractant is dispersed in an inert hydrocarbon diluent.

4. The method recited in claim 1, wherein the REE-containing acidic solution comprises nitric acid.

5. The method recited in claim 1, wherein, during the step of contacting the REE-containing acidic solution with a thorium selective phosphinic acid-type extractant, the REE-containing acidic solution has an acidity of at least about 0.001 M.

6. The method recited in claim 1, wherein, during the step of contacting the REE-containing acidic solution with a thorium selective phosphinic acid-type extractant, the REE-containing acidic solution has an acidity of at least about 0.5M.

7. The method recited in claim 1, wherein, during the step of contacting the REE-containing acidic solution with a thorium selective phosphinic acid-type extractant, the REE-containing acidic solution has an acidity of not greater than about 8.0M.

8. The method recited in claim 1, wherein, during the step of contacting the REE-containing acidic solution with a thorium selective phosphinic acid-type extractant, the REE-containing acidic solution has an acidity of not greater than about 1.0M.

9. The method recited in claim 1, wherein, during the step of contacting the REE-containing acidic solution with a thorium selective phosphinic acid-type extractant, the REE-containing acidic solution has an oxidation-reduction potential of at least about 1500 mV.

10. The method recited in claim 1, wherein the acidic solution is formed by digesting a rare earth oxide product in an acid.

11. The method recited in claim 1, further comprising the step of separating the thorium-depleted extractant from the oxalic acid and recycling the thorium-depleted extractant back to step of contacting the REE-containing acidic solution with the thorium selective phosphinic acid-type extractant.

12. The method recited in claim 1, wherein substantially all of the thorium in the acidic solution is in the +4 oxidation state.

13. The method recited in claim 12, further comprising the steps of:

calcining a thorium-containing compound at a temperature of at least about 710° C. in an oxidizing environment to form a rare earth oxide product; and forming the REE-containing acidic solution by digesting the rare earth oxide product in an acid.

* * * * *